US012477599B2

(12) United States Patent
Luo et al.

(10) Patent No.: US 12,477,599 B2
(45) Date of Patent: Nov. 18, 2025

(54) MOBILE EDGE COMPUTING PROCESSING METHOD AND RELATED DEVICE

(71) Applicant: Huawei Technologies Co., Ltd., Shenzhen (CN)

(72) Inventors: Haiyan Luo, Shenzhen (CN); Fei Sun, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 18/148,282

(22) Filed: Dec. 29, 2022

(65) Prior Publication Data

US 2023/0141231 A1 May 11, 2023

Related U.S. Application Data

(63) Continuation of application No. PCT/CN2021/101392, filed on Jun. 22, 2021.

(30) Foreign Application Priority Data

Jun. 30, 2020 (CN) .......................... 202010617594.6

(51) Int. Cl.
*H04W 36/00* (2009.01)
*H04W 28/02* (2009.01)
(Continued)

(52) U.S. Cl.
CPC ....... *H04W 76/12* (2018.02); *H04W 28/0268* (2013.01); *H04W 36/0011* (2013.01); *H04W 36/304* (2023.05)

(58) Field of Classification Search
CPC ......... H04W 28/0268; H04W 36/0011; H04W 36/0033; H04W 36/304; H04W 76/11;
(Continued)

(56) References Cited

U.S. PATENT DOCUMENTS 10,448,239 B2 * 10/2019 Faccin ................ H04L 65/1073
10,484,451 B2 * 11/2019 Rao ........................ H04W 40/20
(Continued)

FOREIGN PATENT DOCUMENTS

CN 106231607 A 12/2016
CN 108463805 A 8/2018
(Continued)

OTHER PUBLICATIONS

"3rd Generation Partnership Project; Technical Specification Group Services and System Aspects; System architecture for the 5G System (5GS); Stage 2 (Release 16)," 3GPP TS 23.501 V16.4.0, Mar. 2020, 430 pages.
(Continued)

*Primary Examiner* — Nathan S Taylor
(74) *Attorney, Agent, or Firm* — Slater Matsil, LLP

(57) ABSTRACT

Embodiments of this application disclose a mobile edge computing processing method and a related device, which may be applied to a scenario in which a local computing device (MEC) provides a computing service. A radio access network device determines a matched local computing device based on a PDU session setup request message of a terminal device UE and local computing capability information of a local computing device. Then, the radio access network device sets up a PDU session between the local computing device and the terminal device. A network device (including the radio access network device and a core network device) uses the local computing device as a computing resource of a network, and the network device controls communication and interaction between the UE and the local computing device.

20 Claims, 20 Drawing Sheets

(51) Int. Cl.
*H04W 76/12* (2018.01)
*H04W 36/30* (2009.01)

(58) Field of Classification Search
CPC ... H04W 76/12; H04W 84/047; H04W 24/02; H04W 36/0058; H04W 28/02; H04W 36/00; H04W 36/30; H04W 84/04
USPC .......................................................... 455/328
See application file for complete search history.

(56) References Cited

U.S. PATENT DOCUMENTS

| | | | |
|---|---|---|---|
| 10,887,801 B2* | 1/2021 | Hong | H04W 36/0022 |
| 11,089,650 B2* | 8/2021 | Liu | G06F 9/5044 |
| 11,159,408 B2* | 10/2021 | Svennebring | H04L 41/147 |
| 11,617,109 B2* | 3/2023 | Ke | H04W 28/0263 370/331 |
| 2018/0192471 A1* | 7/2018 | Li | H04W 72/53 |
| 2018/0317134 A1* | 11/2018 | Leroux | H04W 28/26 |
| 2019/0191330 A1* | 6/2019 | Dao | H04L 12/4633 |
| 2019/0191467 A1* | 6/2019 | Dao | H04W 76/11 |
| 2020/0314955 A1* | 10/2020 | Velev | H04W 76/11 |
| 2021/0073022 A1* | 3/2021 | Li | G06F 9/45558 |
| 2021/0076250 A1* | 3/2021 | Wang | H04W 28/0221 |
| 2021/0084121 A1* | 3/2021 | Park | H04W 36/0088 |
| 2021/0127271 A1* | 4/2021 | Wu | H04W 12/0471 |
| 2021/0266999 A1* | 8/2021 | Laselva | H04W 48/16 |
| 2021/0306844 A1* | 9/2021 | Xue | H04W 92/20 |
| 2022/0030475 A1* | 1/2022 | Yao | H04W 36/0085 |
| 2022/0159090 A1* | 5/2022 | Ding | H04L 67/60 |
| 2022/0377541 A1* | 11/2022 | Luo | H04L 63/0272 |
| 2023/0008647 A1* | 1/2023 | Yao | H04W 76/10 |
| 2023/0034349 A1* | 2/2023 | Mladin | H04W 4/40 |
| 2023/0043261 A1* | 2/2023 | Zhu | H04L 47/28 |
| 2023/0180117 A1* | 6/2023 | Lee | H04L 67/289 370/329 |
| 2023/0353455 A1* | 11/2023 | Zhu | G06F 9/45558 |

FOREIGN PATENT DOCUMENTS

| | | | |
|---|---|---|---|
| CN | 108990112 A | 12/2018 | |
| CN | 109451793 A | 3/2019 | |
| CN | 109600802 A | 4/2019 | |
| CN | 109644199 A | 4/2019 | |
| CN | 109800027 A | 5/2019 | |
| CN | 110087257 A | 8/2019 | |
| CN | 110301154 A | 10/2019 | |
| CN | 110505073 A | 11/2019 | |
| CN | 110557785 A | 12/2019 | |
| CN | 111083737 A | 4/2020 | |
| WO | 2019126931 A1 | 7/2019 | |
| WO | WO-2019137987 A1 * | 7/2019 | H04W 4/50 |
| WO | 2019182573 A1 | 9/2019 | |
| WO | WO-2021032907 A1 * | 2/2021 | H04W 4/02 |

OTHER PUBLICATIONS

"Pseudo-CR on supporting MEC for V2X," Source: Huawei, Hisilicon, Spec: 3GPP TR 23.795 v0.4.0, Agenda item: 10.1, Document for: Approval, Contact: Cuili Ge—gecuili@huawei.com, 3GPP TSG-SA WG6 Meeting #25, S6-181075 (revision of S6-18xxxx), Sophia Antipolis, France, Jul. 23-27, 2018, 3 pages.

* cited by examiner

MOBILE EDGE COMPUTING PROCESSING METHOD AND RELATED DEVICE

CROSS-REFERENCE TO RELATED APPLICATIONS

This application is a continuation of International Application No. PCT/CN2021/101392, filed on Jun. 22, 2021, which claims priority to Chinese Patent Application No. 202010617594.6, filed on Jun. 30, 2020. The disclosures of the aforementioned applications are hereby incorporated by reference in their entireties.

TECHNICAL FIELD

This application relates to the field of communication technologies, and in particular, to a mobile edge computing processing method and a related device.

BACKGROUND

As a quantity of mobile intelligent devices keeps increasing and various new service types emerge, conventional cloud computing technologies cannot meet increasing service requirements. Therefore, the European Telecommunications Standards Institute (ETSI) proposes the concept of mobile edge computing, which is also referred to as multi-access edge computing. Mobile edge computing enables computing capabilities to be extended to, for example, core network gateways, edge aggregation points, or distributed base stations, and provides similar cloud computing, storage, and processing capabilities at the edge of a mobile network. As a key technology for evolution of a 5th-generation (5-generation, 5G) mobile communication network architecture, mobile edge computing can meet various requirements of a system on a throughput, a delay, network scalability, intelligence, and the like.

FIG. 1a is a schematic diagram of a network architecture of mobile edge computing. Refer to FIG. 1a. In an application layer architecture, a mobile edge computing terminal device, which is also referred to as user equipment (UE), is enabled to include an application client (AC) and an edge enabler client (EEC). An edge data network (EDN) includes an edge application server (EAS) and an edge enabler server (EES). An edge configuration server (ECS) enables the edge enabler client (EEC) located at a UE side, so that the EEC can find the edge enabler server (EES) in the edge data network (EDN). The edge enabler server (EES) enables the application client (AC) located at the UE side, so that the AC can find the edge application server (EAS) in the edge data network (EDN).

The foregoing mobile edge computing architecture is strongly coupled to an application layer, and has a complex structure. Therefore, flexible deployment and enabling of mobile edge computing cannot be implemented. As a result, it is difficult for an operator to effectively control a mobile edge computing service, and network efficiency is reduced.

SUMMARY

Embodiments of this application provide a mobile edge computing processing method, to improve network efficiency.

According to a first aspect, an embodiment of this application provides a mobile edge computing processing method, including:

A radio access network device receives a radio resource control (RRC) message sent by a terminal device UE, where the RRC message carries a protocol data unit (PDU) session setup request message, and the PDU session setup request message is a non-access stratum NAS message.

The radio access network device sends a first interface message to a core network device, where the first interface message carries the PDU session setup request message.

The core network device sends a second interface message to the radio access network device, where the second interface message carries an identifier of a PDU session and local computing request information, and the local computing request information includes at least one of the following information: a local computing function, a local computing algorithm, microservice information, or a local computing time budget.

The radio access network device sets up the PDU session between the local computing device and the UE.

Specifically, the first interface message may be an NG interface message, for example, an NG uplink NAS transport message. After receiving the RRC message from the terminal device, the radio access network device first extracts the NAS message (namely, the PDU session setup request message) in the RRC message. Then, the radio access network device encapsulates the non-access stratum (NAS) message in an NG interface message, and sends the NG interface message to the core network device (for example, an access and mobility management function (AMF)).

Specifically, the core network device (for example, the AMF) determines the local computing request information corresponding to the PDU session. The core network device (for example, the AMF) sends the identifier of the PDU session and the local computing request information to the radio access network device in an NG interface message. The NG interface message may be an NG application protocol (NGAP) message, for example, a PDU session resource setup request message. The PDU session resource setup request message carries the identifier of the PDU session and local computing request information corresponding to the PDU session. Optionally, local computing capability information of a local computing device that is reported by the radio access network device carries an identifier of the local computing device. The second interface information may carry an identifier of a local computing device that is found by the core network device for the PDU session through matching.

In this embodiment of this application, the radio access network device determines the matched local computing device based on the PDU session setup request message (the second interface message) sent by the core network device (for example, the AMF) for the terminal device and the local computing capability information of the local computing device. Then, the radio access network device sets up the PDU session between the local computing device and the terminal device. A network device (the radio access network device and the core network device) uses the local computing device as a computing resource of a network, and the network device controls communication and interaction between the UE and the local computing device. A complex architecture between the UE and the MEC is simplified, and MEC deployment is simplified. In this way, a local computing device can be flexibly deployed and enabled, a capability of an operator to control a local computing service is improved, and network performance is improved.

With reference to the first aspect, in a possible implementation of the first aspect, the second interface message further includes: a flow identifier of a first quality of service (QOS) flow, where the local computing request information corresponds to the first QoS flow.

Specifically, after receiving the first interface message, the core network device (for example, the AMF) determines, based on the PDU session setup request message carried in the first interface message, whether the PDU session corresponding to the PDU session setup request message requires a local computing service. Optionally, the PDU session setup request message carries a local computing service request indication. The core network device (for example, the AMF) determines, based on the local computing service request indication and other information, that the PDU session (all or a part of QoS flows) requires a local computing service.

When a part of QoS flows (one QoS flow or a plurality of QoS flows) in the PDU session require a local computing service, the QoS flows that require the local computing service are referred to as a first QoS flow set, and the first QoS flow set includes one or more first QoS flows. The core network device (for example, the AMF) determines, based on the PDU session setup request message, local computing request information corresponding to each QoS flow in the first QoS flow set in the PDU session.

Specifically, the core network device (for example, the AMF) determines the local computing request information corresponding to the PDU session or the local computing request information corresponding to each QoS flow in the first QoS flow set. The core network device (for example, the AMF) sends the identifier of the PDU session and the local computing request information to the radio access network device in the second interface message. The second interface message may be an NG application protocol (NGAP) message, for example, a PDU session resource setup request message. The PDU session resource setup request message carries the identifier of the PDU session, a QoS flow identifier, and local computing request information corresponding to the QoS flow identifier.

Optionally, local computing capability information of a local computing device that is reported by the radio access network device carries an identifier of the local computing device. The second interface information may carry an identifier of a local computing device that is found by the core network device for the PDU session through matching or an identifier of a local computing device that is found for a QoS flow in the PDU session through matching.

In this embodiment of this application, the local computing device may process a part of (or all) QoS flows in a PDU session, to improve a capability of an operator to control a local computing service, and improve network performance.

With reference to the first aspect, in a possible implementation of the first aspect, the PDU session includes a first data radio bearer (DRB) and a second DRB, where the first DRB is a DRB between the local computing device and the radio access network device, and the second DRB is a DRB between the UE and the radio access network device.

Specifically, after determining the local computing device, the radio access network device determines a mapping relationship between each QoS flow in the PDU session and a DRB, that is, determines a specific QoS flow forming a specific DRB. The DRB includes a DRB between the local computing device and the radio access network device and a DRB between the terminal device and the radio access network device. In this embodiment of this application, the first DRB is a DRB that is between the local computing device and the radio access network device and to which a QoS flow requiring a local computing service in the PDU session is mapped, and the second DRB is a DRB that is between the terminal device and the radio access network device and to which a QoS flow requiring a local computing service in the PDU session is mapped. The first DRB may be one DRB, or may be a plurality of DRBs. The second DRB may be one DRB, or may be a plurality of DRBs. One DRB may include one or more QoS flows. Specifically, the radio access network device determines a mapping relationship between a QoS flow and a DRB based on a QoS flow parameter of the QoS flow. For example, several QoS flows with similar QoS flow parameters form one DRB.

In an optional implementation, the DRB between the radio access network device and the local computing device may be a DRB that has been set up between the radio access network device and the local computing device.

In another optional implementation, the DRB between the radio access network device and the local computing device may be a new DRB configured by the radio network device for the local computing device.

In this embodiment of this application, DRBs forming the PDU session between the terminal device and the local computing device may have a plurality of possibilities, to improve implementation flexibility of the method. This improves a capability of an operator to control a local computing service, and improves network performance.

With reference to the first aspect, in a possible implementation of the first aspect, before the radio access network device receives the PDU session setup request message sent by the core network device, the method further includes:

The radio access network device receives local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

Specifically, the local computing device may periodically send the local computing capability information to the radio access network device, the local computing device may report the local computing capability information to the radio access network device when accessing the radio access network device, or the local computing device may report the local computing capability information to the radio access network device according to a capability request instruction of the radio access network device. This is not limited herein. Specifically, the local computing device may include the local computing capability information in an uplink RRC message sent to the radio access network device, where the uplink RRC message may be terminal device capability information (UE Capability Information).

For example, the local computing function is a video decoding function, an image processing function, and an image recognition function. An identifier of the local computing algorithm is "CNN", "H.265-HEVC", or "Dijkstra". An identifier of the microservice information is "photo album", "video", or "map". The average processing delay is: 5 milliseconds for "CNN", 6 milliseconds for "H.265-HEVC", and 7 milliseconds for "Dijkstra"; or 5 milliseconds for the video decoding function, 10 milliseconds for the image processing function, and 15 milliseconds for the image recognition function. The current processing load is 13%.

Optionally, after the radio access network device receives the local computing capability information, the radio access network device reports the local computing capability information to the core network device. In an optional implementation, each time after receiving local computing capability information reported by a local computing device, the radio access network device sends the local computing capability information and an identifier of the local computing device to the core network device (for example, the AMF).

The identifier of the local computing device may be "RAN UE-MEC NGAP ID (radio access network device—local computing device next-generation application protocol identifier)" or "AMF UE-MEC NGAP ID (access and mobility management function—local computing device next-generation application protocol identifier)". The "RAN UE-MEC NGAP ID" is allocated by the radio access network device to the local computing device, and uniquely identifies a local computing device on an NG interface on the radio access network device side. The identifier may alternatively be another identifier, for example, a media access control (media access control, MAC) address. This is not limited herein.

In another optional implementation, after receiving the local computing capability information reported by the local computing device, the radio access network device does not directly send the local computing capability information to the core network device (for example, the AMF). The radio access network device collects statistics on local computing capability information reported by the local computing device in a period of time, and sends a statistical result to the core network device (for example, the AMF).

In this embodiment of this application, a local computing device may report local computing capability information of the local computing device to the radio access network device, to subsequently determine a local computing device that provides a local computing service for the terminal device.

With reference to the first aspect, in a possible implementation of the first aspect, after receiving the second interface message, the radio access network device determines a local computing device that provides a local computing service for the PDU session.

In an optional implementation, the radio access network device determines, based on the local computing capability information reported by the local computing device and the local computing request information in the second interface message, the local computing device that provides the local computing service for the PDU session (or each QoS flow in the first QoS flow set in the PDU session). Specifically, one or more local computing devices that have a highest matching degree with the local computing request information among local computing devices that report local computing capability information are determined based on the local computing request information.

In another optional implementation, the second interface message carries the identifier of the local computing device that is found by the core network device (for example, the AMF) for the PDU session (or each QoS flow in the first QoS flow set in the PDU session) through matching. In this case, the radio access network device determines, based on the identifier of the local computing device, a local computing device that provides a local computing service for the PDU session (or each QoS flow in the first QoS flow set in the PDU session).

In this embodiment of this application, the radio access network device may determine, in a plurality of manners, the local computing device that provides the local computing service for the terminal device (the PDU session), to improve implementation flexibility of the method.

According to a second aspect, an embodiment of this application provides a mobile edge computing processing method, including:

At least one local computing device sends local computing capability information to a radio access network device, where the at least one local computing device includes a local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

The local computing device sets up a PDU session with a terminal device UE, where the PDU session corresponds to a PDU session setup request message sent by the UE to the radio access network device.

Specifically, the local computing device may periodically send the local computing capability information to the radio access network device, the local computing device may report the local computing capability information to the radio access network device when accessing the radio access network device, or the local computing device may report the local computing capability information to the radio access network device according to a capability request instruction of the radio access network device. This is not limited herein. Specifically, the local computing device may include the local computing capability information in an uplink RRC message sent to the radio access network device, where the uplink RRC message may be UE capability information.

For example, the local computing function is a video decoding function, an image processing function, and an image recognition function. An identifier of the local computing algorithm is "CNN", "H.265-HEVC", or "Dijkstra". An identifier of the microservice information is "photo album", "video", or "map". The average processing delay is: 5 milliseconds for "CNN", 6 milliseconds for "H.265-HEVC", and 7 milliseconds for "Dijkstra"; or 5 milliseconds for the video decoding function, 10 milliseconds for the image processing function, and 15 milliseconds for the image recognition function. The current processing load is 13%.

In this embodiment of this application, a local computing device may report local computing capability information of the local computing device to the radio access network device, to subsequently determine a local computing device that provides a local computing service for the terminal device. The radio access network device determines a matched local computing device based on the PDU session setup request message (a second interface message) sent by a core network device (for example, an AMF) for the terminal device and the local computing capability information of the local computing device. Then, the radio access network device sets up the PDU session between the local computing device and the terminal device. A network device (the radio access network device and the core network device) uses the local computing device as a computing resource of a network, and the network device controls communication and interaction between the UE and the local computing device. A complex architecture between the UE and the MEC is simplified, and MEC deployment is simplified. In this way, a local computing device can be flexibly deployed and enabled, a capability of an operator to control a local computing service is improved, and network performance is improved.

With reference to the second aspect, in a possible implementation of the second aspect, before the local computing device sets up the PDU session with the terminal device UE, the method further includes:

The local computing device receives configuration information of a first data radio bearer DRB that is sent by the radio access network device; and the local computing device sets up the first DRB.

The PDU session includes the first DRB and a second DRB, where the first DRB is a DRB between the local computing device and the radio access network device, and the second DRB is a DRB between the UE and the radio access network device.

With reference to the second aspect, in a possible implementation of the second aspect, the PDU session carries a first quality of service QoS flow, where the first QoS flow is determined by the core network device based on the PDU session setup request message forwarded by the radio access network device.

According to a third aspect, an embodiment of this application provides a mobile edge computing processing method, including:

A first radio access network device sends first context migration information to a local computing device; and the local computing device sends a first PDU session setup request message to a core network device, where the first PDU session setup request message is a non-access stratum NAS message, the first PDU session setup request message is for triggering setup of a first PDU session, the first PDU session is for migrating a context of a second PDU session, and the second PDU session is a PDU session set up by the local computing device and a terminal device UE; and the local computing device sets up the first PDU session with the core network device.

Specifically, when the first radio access network device determines that the local computing device cannot continue to provide a local computing service for the terminal device, the first radio access network device sends the first context migration information to the local computing device. When the local computing device provides a local computing service for a plurality of terminal devices, the first context migration information may further include an identifier of the terminal device. Specifically, the first radio access network device sends the first context migration information to the local computing device in an RRC reconfiguration message. In an optional implementation, the first context migration information further includes a context migration indication, and the context migration indication indicates that the first context migration information is for performing context migration through the local computing device. The context migration indication is referred to as an "MEC context migration indication (local computing device context migration indication)".

In this embodiment of this application, after the local computing device sets up the second PDU session with the terminal device, when the local computing device cannot continue to provide a local computing service for the terminal device, the local computing device sets up the first PDU session with the core network device through the first radio access network device, where the first PDU session is for transmitting the context related to the second PDU session. The core network device (for example, an AMF) may continue to allocate a processing device to the context of the second PDU session, for example, the first radio access network device, another local computing device, or a local processing device in a core network, without affecting normal connection between the terminal device and the first radio access network device. For the terminal device, the foregoing procedure is transparent, and normal running of the terminal device can be effectively ensured.

With reference to the third aspect, in a possible implementation of the third aspect, the first context migration information includes an identifier of a third data radio bearer DRB, where the second PDU session includes the third DRB, and the third DRB is a DRB between the local computing device and the radio access network device.

For example, the first context migration information may be:
">DRB list (DRB list)>
  >DRB ID (DRB ID): DRB-3
    >>MEC context migration indication (context migration indication)"

In this embodiment of this application, the local computing device may migrate a part of DRBs (the third DRB) in the second PDU session, to improve implementation flexibility of the method. For some local computing services that are obtained through fine division, it can be ensured that the local computing services are successfully migrated, and normal work of the terminal device is ensured.

With reference to the third aspect, in a possible implementation of the third aspect, the first context migration information further includes at least one of the following information: an identifier of the UE or an identifier of the second PDU session.

When one DRB in the local computing device is mapped to a plurality of DRBs of a plurality of terminal devices (or one DRB in the local computing device is mapped to a plurality of DRBs of one terminal device), for example, the first context migration information may be:
">DRB list (DRB list)>
  >DRB ID (DRB ID): DRB-3
    >>UE ID list (terminal device identifier list)>
      >>UE ID (terminal device identifier): UE-1
      >>>PDU session ID (identifier of the second PDU session): PDU-2
      >>>MEC context migration indication (context migration indication)"

In another optional implementation, the first context migration information includes only an identifier of a third DRB. An identifier of the second PDU session and an identifier of the terminal device are independent of the first context migration information, and are sent to the local computing device in RRC reconfiguration messages different from that for sending the first context migration information.

In this embodiment of this application, the local computing device may migrate a part of DRBs (the third DRB) in the second PDU session, to improve implementation flexibility of the method. For some local computing services that are obtained through fine division, it can be ensured that the local computing services are successfully migrated, and normal work of the terminal device is ensured.

With reference to the third aspect, in a possible implementation of the third aspect, the first PDU session setup request message includes second context migration information, and the second context migration information includes at least one of the following information: an identifier of the UE, an identifier of the second PDU session, or a context migration indication. The second context migration information is similar to the first context migration information. For example, the second context migration information may include the identifier of the terminal device, the identifier of the second PDU session, or the context migration indication. Details are not described herein again.

In an optional implementation, an uplink RRC message in which the NAS message (the first PDU session setup request message) is encapsulated further carries the second context migration information. The second context migration information and the first PDU session setup request message are independent of each other. For example, the uplink RRC message may be "UL RRC message (uplink RRC message) (NAS message (NAS message)), UE ID (terminal device identifier), PDU session ID (PDU session identifier), or MEC context migration indication (local computing device context migration indication)".

In another optional implementation, the first PDU session setup request message further includes the second context migration information, that is, the second context migration information is encapsulated in the NAS message, namely, the first PDU session setup request message.

In another optional implementation, the first PDU session setup request message and the second context migration information are independent of each other, and the local computing device separately sends the first PDU session setup request message and the second context migration information to the first radio access network device in different messages. For example, different uplink RRC messages may be for sending.

In this embodiment of this application, the second context migration information may be implemented in a plurality of manners, to improve implementation flexibility of the method.

According to a fourth aspect, an embodiment of this application provides a mobile edge computing processing method, including:

A radio access network device sends first context migration information to a local computing device; a core network device receives a first PDU session setup request message sent by the local computing device, where the first PDU session setup request message is a non-access stratum NAS message, the first PDU session setup request message is for setting up a first PDU session between the local computing device and the core network device, the first PDU session is for migrating a context of a second PDU session, and the second PDU session is a PDU session set up between the local computing device and a terminal device UE; and the core network device sets up the first PDU session with the local computing device.

In this embodiment of this application, after the local computing device sets up the second PDU session with the terminal device, when the local computing device cannot continue to provide a local computing service for the terminal device, the local computing device sets up the first PDU session with the core network device through a first radio access network device, where the first PDU session is for transmitting the context related to the second PDU session. The core network device (for example, an AMF) may continue to allocate a processing device to the context of the second PDU session, for example, the first radio access network device, another local computing device, or a local processing device in a core network, without affecting normal connection between the terminal device and the first radio access network device. For the terminal device, the foregoing procedure is transparent, and normal running of the terminal device can be effectively ensured.

With reference to the fourth aspect, in a possible implementation of the fourth aspect, the first context migration information includes an identifier of a third data radio bearer DRB, where the second PDU session includes the third DRB, and the third DRB is a DRB between the local computing device and the radio access network device.

For example, the first context migration information may be:
">DRB list (DRB list)>
>DRB ID (DRB ID): DRB-3
>>MEC context migration indication (context migration indication)"

In this embodiment of this application, the local computing device may migrate a part of DRBs (the third DRB) in the second PDU session, to improve implementation flexibility of the method. For some local computing services that are obtained through fine division, it can be ensured that the local computing services are successfully migrated, and normal work of the terminal device is ensured.

With reference to the fourth aspect, in a possible implementation of the fourth aspect, the first context migration information further includes at least one of the following information: an identifier of the UE or an identifier of the second PDU session.

When one DRB in the local computing device is mapped to a plurality of DRBs of a plurality of terminal devices (or one DRB in the local computing device is mapped to a plurality of DRBs of one terminal device), for example, the first context migration information may be:
">DRB list (DRB list)>
>DRB ID (DRB ID): DRB-3
>>UE ID list (terminal device identifier list)>
>>UE ID (terminal device identifier): UE-1
>>>PDU session ID (identifier of the second PDU session): PDU-2
>>>MEC context migration indication (context migration indication)"

In another optional implementation, the first context migration information includes only an identifier of a third DRB. An identifier of the second PDU session and an identifier of the terminal device are independent of the first context migration information, and are sent to the local computing device in RRC reconfiguration messages different from that for sending the first context migration information.

In this embodiment of this application, the local computing device may migrate a part of DRBs (the third DRB) in the second PDU session, to improve implementation flexibility of the method. For some local computing services that are obtained through fine division, it can be ensured that the local computing services are successfully migrated, and normal work of the terminal device is ensured.

With reference to the fourth aspect, in a possible implementation of the fourth aspect, that a core network device receives a first PDU session setup request message sent by the local computing device includes:

Specifically, after the first radio access network device receives the first PDU session setup request message and second context migration information from the local computing device, the first radio access network device forwards the first PDU session setup request message and the second context migration information to the core network device (for example, an AMF) in an interface message. The interface message is, for example, an NG interface message.

In an optional implementation, the first radio access network device forwards the first PDU session setup request message and the second context migration information from the local computing device in an NG interface message. For example, the first PDU session setup request message and the second context migration information included in the NG interface message are consistent with a first PDU session setup request message and second context migration information included in an uplink RRC message from the local computing device.

Optionally, the NG interface message includes a NAS message, the NAS message is the first PDU session setup request message, and the first PDU session setup request message includes the second context migration information.

Optionally, the NG interface message includes a NAS message and the second context migration information, and the NAS message is the first PDU session setup request message.

In another optional implementation, after processing the first PDU session setup request message and the second context migration information that are from the local computing device, the first radio access network device sends processed information to the core network device in an NG interface message. Specifically, an identifier, for example, a cell radio network temporary identifier (cell-radio network temporary identifier, C-RNTI), of the terminal device in the first PDU session setup request message and the second context migration information from the local computing device is replaced with an identifier of the terminal device on a radio access network device side, for example, "gNB UE NGAP ID (base station-terminal device next-generation application protocol identifier)" or "AMF UE NGAP ID (access and mobility management function-terminal device next-generation application protocol identifier)".

It should be noted that the first radio access network device may send the first PDU session setup request message and the second context migration information to the core network device (for example, the AMF) in a same interface message or in different interface messages. This is not limited herein.

In this embodiment of this application, the second context migration information may be implemented in a plurality of manners, to improve implementation flexibility of the method.

With reference to the fourth aspect, in a possible implementation of the fourth aspect, the method further includes:

The core network device (for example, the AMF) sends first uplink transport network layer (TNL) information for the UE to the radio access network device, where the first uplink transport layer information includes an Internet Protocol (IP) address of a core network device UPF and a tunnel endpoint address TEID of the core network device.

In an optional implementation, the core network device (for example, the AMF) sends, to the radio access network device in an independent message, the first uplink TNL information and a terminal device identifier corresponding to the first uplink TNL information.

In another optional implementation, the core network device (for example, the AMF) sends a PDU session resource modification request message to the first radio access network device. The message includes a terminal device identifier, a PDU session identifier, and the corresponding first uplink TNL information.

After receiving the first uplink TNL information from the core network device (for example, the AMF), the first radio access network device determines the terminal device based on the terminal device identifier corresponding to the first uplink TNL information, and sends first downlink TNL information for the terminal device to the core network device (for example, the AMF). The first downlink TNL information includes an IP address on the first radio access network device side and a TEID on the first radio access network device side.

In an optional implementation, the first radio access network device sends the first downlink TNL information to the core network device (for example, the AMF) in a PDU session resource modification response message.

After the core network device (for example, the AMF) receives the first downlink TNL information from the first radio access network device, because the first radio access network device has received the first uplink TNL information from the core network device, the terminal device establishes a first user plane tunnel with the core network device based on the first uplink TNL information and the first downlink TNL information. The first user plane tunnel is for bearing communication between the terminal device and the core network device.

In another optional implementation, before the local computing device sets up the first PDU session with the core network device, the core network device (for example, the AMF) has sent second uplink TNL information to the first radio access network device, and the first radio access network device has sent second downlink TNL information to the core network device (for example, the AMF). For example, the core network device sends uplink TNL information (the second uplink TNL information) to a radio access network device (the first radio access network device) in a second interface message; and the radio access network device (the first radio access network device) sends downlink TNL information (the second downlink TNL information) to the core network device in a third interface message. In this case, the first radio access network device establishes a user plane tunnel with the core network device based on the second uplink TNL information and the second downlink TNL information. For ease of differentiation, the user plane tunnel is referred to as a second user plane tunnel.

In this embodiment of this application, a user plane tunnel may be further established between the terminal device and the core network device for bearing communication between the terminal device and the core network device, to ensure normal running of the terminal device.

According to a fifth aspect, an embodiment of this application provides a network device, including:
- a transceiver, configured to receive a radio resource control RRC message sent by a terminal device UE, where the RRC message carries a protocol data unit PDU session setup request message, and the PDU session setup request message is a non-access stratum NAS message, where
- the transceiver is further configured to send a first interface message to a core network device, where the first interface message carries the PDU session setup request message; and
- the transceiver is further configured to send a second interface message to a radio access network device, where the second interface message carries an identifier of a PDU session and local computing request information, and the local computing request information includes at least one of the following information: a local computing function, a local computing algorithm, microservice information, or a local computing time budget; and
- a processor, configured to set up the PDU session between a local computing device and the UE.

With reference to the fifth aspect, in a possible implementation of the fifth aspect, the second interface message further includes:

a flow identifier of a first quality of service QoS flow, where the local computing request information corresponds to the first QoS flow.

With reference to the fifth aspect, in a possible implementation of the fifth aspect, the PDU session includes a first data radio bearer DRB and a second DRB, where the first DRB is a DRB between the local computing device and the radio access network device, and the second DRB is a DRB between the UE and the radio access network device.

With reference to the fifth aspect, in a possible implementation of the fifth aspect, the transceiver is further configured to receive local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

The radio access network device reports the local computing capability information to the core network device.

With reference to the fifth aspect, in a possible implementation of the fifth aspect, the local computing device is determined by the radio access network device based on the local computing request information and the local computing capability information.

According to a sixth aspect, an embodiment of this application provides a local computing device, including: a transceiver, configured to send local computing capability information to a radio access network device, where the local computing capability information includes at least one of the following information: a local computing function supported by the local computing device, a local computing algorithm supported by the local computing device, microservice information supported by the local computing device, an average processing delay of the local computing device, or current processing load of the local computing device; and a processor, configured to set up a PDU session with a terminal device UE, where the PDU session corresponds to a PDU session setup request message sent by the UE to the radio access network device.

With reference to the sixth aspect, in a possible implementation of the sixth aspect, the transceiver is further configured to receive configuration information of a first data radio bearer DRB that is sent by the radio access network device; and the processor is further configured to set up the first DRB. The PDU session includes the first DRB and a second DRB, where the first DRB is a DRB between the local computing device and the radio access network device, and the second DRB is a DRB between the UE and the radio access network device.

With reference to the sixth aspect, in a possible implementation of the sixth aspect, the PDU session carries a first quality of service QoS flow, where the first QoS flow is determined by a core network device based on the PDU session setup request message forwarded by the radio access network device.

According to a seventh aspect, an embodiment of this application provides a local computing device, including:
a transceiver, configured to receive first context migration information sent by a radio access network device, where
the transceiver is further configured to send a first PDU session setup request message to a core network device, where the first PDU session setup request message is a non-access stratum NAS message;
the first PDU session setup request message is for triggering setup of a first PDU session, and the first PDU session is for migrating a context of a second PDU session; and
the second PDU session is a PDU session set up between the local computing device and a terminal device UE; and
a processor, configured to set up the first PDU session with the core network device.

With reference to the seventh aspect, in a possible implementation of the seventh aspect, the first context migration information includes an identifier of a third data radio bearer DRB, where the second PDU session includes the third DRB, and the third DRB is a DRB between the local computing device and the radio access network device.

With reference to the seventh aspect, in a possible implementation of the seventh aspect, the first context migration information further includes at least one of the following information: an identifier of the UE or an identifier of the second PDU session.

With reference to the seventh aspect, in a possible implementation of the seventh aspect, the first PDU session setup request message includes second context migration information; and the second context migration information includes at least one of the following information: the identifier of the UE, the identifier of the second PDU session, or a context migration indication.

According to an eighth aspect, an embodiment of this application provides a network device, including:
a transceiver, configured to send first context migration information to a local computing device, where
the transceiver is further configured to receive a first PDU session setup request message sent by the local computing device, where the first PDU session setup request message is a non-access stratum NAS message, the first PDU session setup request message is for setting up a first PDU session between the local computing device and a core network device, and the first PDU session is for migrating a context of a second PDU session; and
the second PDU session is a PDU session set up between the local computing device and a terminal device UE; and
a processor, configured to set up the first PDU session with the local computing device.

With reference to the eighth aspect, in a possible implementation of the eighth aspect, the first context migration information includes an identifier of a third data radio bearer DRB, where the second PDU session includes the third DRB, and the third DRB is a DRB between the local computing device and the radio access network device.

With reference to the eighth aspect, in a possible implementation of the eighth aspect, the first context migration information further includes at least one of the following information: an identifier of the UE or an identifier of the second PDU session.

With reference to the eighth aspect, in a possible implementation of the eighth aspect, the transceiver is further configured to receive the first PDU session setup request message sent by the local computing device; and the transceiver is further configured to forward the first PDU session setup request message and second context migration information to the core network device, where the second context migration information includes at least one of the following information: the identifier of the UE, the identifier of the second PDU session, or a context migration indication.

With reference to the eighth aspect, in a possible implementation of the eighth aspect, the first PDU session setup request message includes second context migration information; and the second context migration information includes at least one of the following information: the identifier of the UE, the identifier of the second PDU session, or a context migration indication.

With reference to the eighth aspect, in a possible implementation of the eighth aspect, the transceiver is further configured to send first uplink transport layer TNL information for the UE to the radio access network device, where the first uplink transport layer information includes an Internet Protocol IP address of the core network device and a tunnel endpoint address TEID of the core network device; and the transceiver is further configured to send first downlink TNL information to the core network device, where the first downlink TNL information includes an IP address of the radio access network device and a TEID of the radio access network device.

The first uplink TNL information and the first downlink TNL information are for establishing a first user plane tunnel, and the first user plane tunnel is for bearing communication between the UE and the core network device.

According to a ninth aspect, an embodiment of this application provides a network device, including:
  a transceiver module, configured to receive a radio resource control RRC message sent by a terminal device UE, where the RRC message carries a protocol data unit PDU session setup request message, and the PDU session setup request message is a non-access stratum NAS message, where
  the transceiver module is further configured to send a first interface message to a core network device, where the first interface message carries the PDU session setup request message; and
  the transceiver module is further configured to send a second interface message to a radio access network device, where the second interface message carries an identifier of a PDU session and local computing request information, and the local computing request information includes at least one of the following information: a local computing function, a local computing algorithm, microservice information, or a local computing time budget; and
  a processing module, configured to set up the PDU session between a local computing device and the UE.

With reference to the ninth aspect, in a possible implementation of the ninth aspect, the second interface message further includes: a flow identifier of a first quality of service QoS flow, where the local computing request information corresponds to the first QoS flow.

With reference to the ninth aspect, in a possible implementation of the ninth aspect, the PDU session includes a first data radio bearer DRB and a second DRB, where the first DRB is a DRB between the local computing device and the radio access network device, and the second DRB is a DRB between the UE and the radio access network device.

With reference to the ninth aspect, in a possible implementation of the ninth aspect, the transceiver module is further configured to receive local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

The radio access network device reports the local computing capability information to the core network device.

With reference to the ninth aspect, in a possible implementation of the ninth aspect, the local computing device is determined by the radio access network device based on the local computing request information and local computing capability information.

According to a tenth aspect, an embodiment of this application provides a local computing device, including:
  a transceiver module, configured to send local computing capability information to a radio access network device, where the local computing capability information includes at least one of the following information: a local computing function supported by the local computing device, a local computing algorithm supported by the local computing device, microservice information supported by the local computing device, an average processing delay of the local computing device, or current processing load of the local computing device; and
  a processing module, configured to set up a PDU session with a terminal device UE, where the PDU session corresponds to a PDU session setup request message sent by the UE to the radio access network device.

With reference to the tenth aspect, in a possible implementation of the tenth aspect, the transceiver module is further configured to receive configuration information of a first data radio bearer DRB that is sent by the radio access network device; and the processing module is further configured to set up the first DRB. The PDU session includes the first DRB and a second DRB, where the first DRB is a DRB between the local computing device and the radio access network device, and the second DRB is a DRB between the UE and the radio access network device.

With reference to the tenth aspect, in a possible implementation of the tenth aspect, the PDU session carries a first quality of service QoS flow, where the first QoS flow is determined by a core network device based on the PDU session setup request message forwarded by the radio access network device.

According to an eleventh aspect, an embodiment of this application provides a local computing device, including:
  a transceiver module, configured to receive first context migration information sent by a radio access network device, where
  the transceiver module is further configured to send a first PDU session setup request message to a core network device, where the first PDU session setup request message is a non-access stratum NAS message;
  the first PDU session setup request message is for triggering setup of a first PDU session, and the first PDU session is for migrating a context of a second PDU session; and
  the second PDU session is a PDU session set up between the local computing device and a terminal device UE; and
  a processing module, configured to set up the first PDU session with the core network device.

With reference to the eleventh aspect, in a possible implementation of the eleventh aspect, the first context migration information includes an identifier of a third data radio bearer DRB, where the second PDU session includes the third DRB, and the third DRB is a DRB between the local computing device and the radio access network device.

With reference to the eleventh aspect, in a possible implementation of the eleventh aspect, the first context migration information further includes at least one of the following information: an identifier of the UE or an identifier of the second PDU session.

With reference to the eleventh aspect, in a possible implementation of the eleventh aspect, the first PDU session setup request message includes second context migration information; and the second context migration information includes at least one of the following information: the identifier of the UE, the identifier of the second PDU session, or a context migration indication.

According to a twelfth aspect, an embodiment of this application provides a network device, including:
- a transceiver module, configured to send first context migration information to a local computing device, where
- the transceiver module is further configured to receive a first PDU session setup request message sent by the local computing device, where the first PDU session setup request message is a non-access stratum NAS message, the first PDU session setup request message is for setting up a first PDU session between the local computing device and a core network device, and the first PDU session is for migrating a context of a second PDU session; and
- the second PDU session is a PDU session set up between the local computing device and a terminal device UE; and
- a processing module, configured to set up the first PDU session with the local computing device.

With reference to the twelfth aspect, in a possible implementation of the twelfth aspect, the first context migration information includes an identifier of a third data radio bearer DRB, where the second PDU session includes the third DRB, and the third DRB is a DRB between the local computing device and the radio access network device.

With reference to the twelfth aspect, in a possible implementation of the twelfth aspect, the first context migration information further includes at least one of the following information: an identifier of the UE or an identifier of the second PDU session.

With reference to the twelfth aspect, in a possible implementation of the twelfth aspect, the transceiver module is further configured to receive the first PDU session setup request message sent by the local computing device; and the transceiver module is further configured to forward the first PDU session setup request message and second context migration information to the core network device, where the second context migration information includes at least one of the following information: the identifier of the UE, the identifier of the second PDU session, or a context migration indication.

With reference to the twelfth aspect, in a possible implementation of the twelfth aspect, the first PDU session setup request message includes second context migration information; and the second context migration information includes at least one of the following information: the identifier of the UE, the identifier of the second PDU session, or a context migration indication.

With reference to the twelfth aspect, in a possible implementation of the twelfth aspect, the transceiver module is further configured to send first uplink transport layer TNL information for the UE to the radio access network device, where the first uplink transport layer information includes an Internet Protocol IP address of the core network device and a tunnel endpoint address TEID of the core network device; and the transceiver module is further configured to send first downlink TNL information to the core network device, where the first downlink TNL information includes an IP address of the radio access network device and a TEID of the radio access network device.

The first uplink TNL information and the first downlink TNL information are for establishing a first user plane tunnel, and the first user plane tunnel is for bearing communication between the UE and the core network device.

According to a thirteenth aspect, an embodiment of this application provides a communication apparatus. The communication apparatus may implement functions performed by the core network device, the radio access network device, or the local computing device in the method in the first aspect, the second aspect, the third aspect, or the fourth aspect. The communication apparatus includes a processor, a memory, and a transceiver connected to the processor. The memory is configured to store program code, and transmit the program code to the processor. The processor is configured to drive, based on instructions in the program code, the transceiver to perform the method in the first aspect, the second aspect, the third aspect, or the fourth aspect. A receiver and a transmitter are separately connected to the processor, to perform operations of the core network device, the radio access network device, or the local computing device in the methods in the foregoing aspects. Specifically, the transceiver may be a radio frequency circuit, and the radio frequency circuit receives and sends a message by using an antenna. Alternatively, the transceiver may be a communication interface, the processor is connected to the communication interface by using a bus, and the processor receives or sends a message through the communication interface.

According to a fourteenth aspect, an embodiment of this application provides a communication apparatus. The communication apparatus may include an entity such as a network device, a local computing device, or a chip. The communication apparatus includes a processor and a memory. The memory is configured to store instructions. The processor is configured to execute the instructions in the memory, so that the communication apparatus performs the method according to any possible implementation of the first aspect, the second aspect, the third aspect, or the fourth aspect.

According to a fifteenth aspect, an embodiment of this application provides a computer-readable storage medium storing one or more computer-executable instructions. When the computer-executable instructions are executed by a processor, the processor performs any possible implementation of the first aspect, the second aspect, the third aspect, or the fourth aspect.

According to a sixteenth aspect, an embodiment of this application provides a computer program product (or referred to as a computer program) storing one or more computer-executable instructions. When the computer-executable instructions are executed by a processor, the processor performs the method according to any one possible implementation of the first aspect, the second aspect, the third aspect, or the fourth aspect.

According to a seventeenth aspect, this application provides a chip system. The chip system includes a processor, configured to support a computer device in implementing functions in the foregoing aspects. In a possible design, the chip system further includes a memory. The memory is configured to store program instructions and data that are necessary for the computer device. The chip system may include a chip, or may include a chip and another discrete component.

According to an eighteenth aspect, this application provides a communication system. The communication system includes the network device in the fifth aspect or the eighth aspect and/or the local computing device in the sixth aspect or the seventh aspect.

BRIEF DESCRIPTION OF THE DRAWINGS

FIG. 7c-1 and FIG. 7c-2 are a schematic diagram of an embodiment of another mobile edge computing processing method according to an embodiment of this application;

DETAILED DESCRIPTION OF ILLUSTRATIVE EMBODIMENTS

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following clearly describes the technical solutions in embodiments of this application with reference to the accompanying drawings in embodiments of this application. In descriptions of this application, "/" means "or" unless otherwise specified. For example, A/B may represent A or B. In this application, "and/or" describes only a correspondence relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c; where a, b, and c may be singular or plural.

In this application, that a network function (for example, an access and mobility management function) or a terminal device (including a local computing device for mobile edge computing and another terminal device corresponding to the local computing device) generates B based on A may indicate that the network function generates B after receiving A or the network function generates B by using A as a parameter. That the network function generates B after receiving A may be that the network function generates B at any moment after receiving A. When the network function generates B by using A as a parameter, it means that parameters used by the network function to generate B include A, and may include another parameter different from A. In this application, that the network function generates B based on A means that parameters used by the network function to generate B include A, and may include another parameter different from A.

Figure 1A:
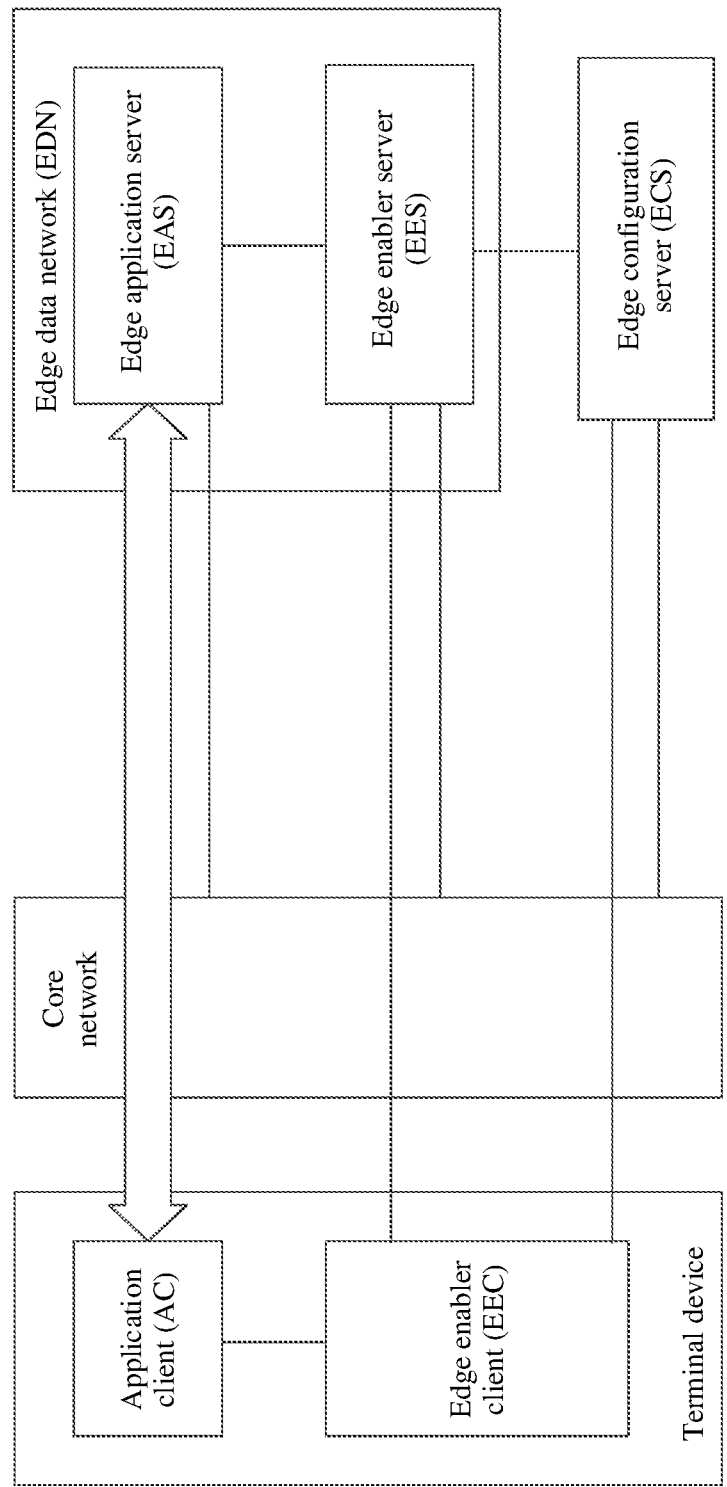
FIG. 1a is a schematic diagram of a network architecture of mobile edge computing.
Figure 1B:
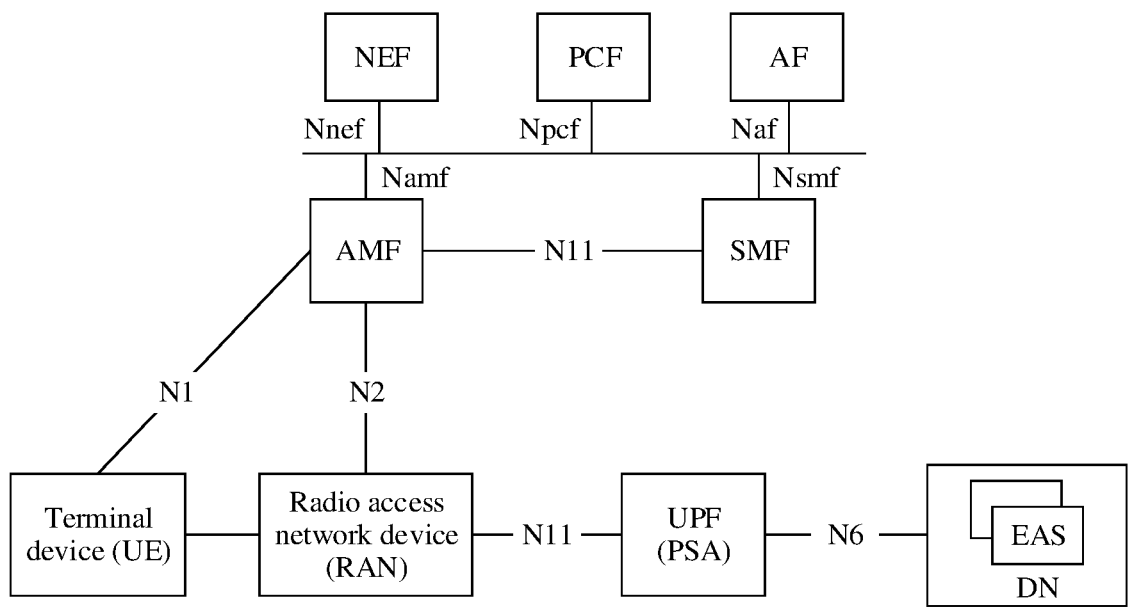
FIG. 1b is a schematic diagram of a 5G communication system according to an embodiment of this application.

FIG. 1b is a schematic diagram of a 5G communication system according to an embodiment of this application. In a 5G mobile network architecture, a control plane function and a forwarding plane function of a mobile gateway are decoupled, and the control plane function obtained after the separation, a conventional 3rd generation partnership project (third generation partnership project, 3GPP) control network element such as a mobility management entity (MME) are combined into a unified control plane function A user plane function (UPF) can implement user plane functions (SGW-U and PGW-U) of a serving gateway (SGW) and a packet data network gateway (PGW). Further, the unified control plane function may be decomposed into an access and mobility management function (AMF) and a session management function (SMF).

As shown in FIG. 1b, the communication system includes at least a terminal device, also referred to as user equipment (UE), a radio access network (RAN) device, an access and mobility management function, a session management function (SMF), a network exposure function (NEF), a policy control function (PCF), an application function (AF), a user plane function (UPF), and a data network (DN). An edge application server (EAS) is a part of the data network (DN). A protocol data unit session anchor (PSA) is located in the user plane function.

The terminal device in FIG. 1b includes a local computing device for mobile edge computing, and another terminal device corresponding to the local computing device. The local computing device may also be referred to as a UE-type local computing device (UE-MEC). The local computing device is also referred to as MEC.

It should be noted that information is exchanged between the UE and the AMF through the RAN. To be specific, in this embodiment of this application, that the UE sends a message (for example, a non-access stratum (NAS) message) to the AMF means that the UE sends the message to the RAN and the RAN sends the message to the AMF. That the AMF sends a message to the UE means that the AMF sends the message to the RAN and the RAN sends the message to the UE.

Specifically, the AMF has functions such as mobility management, registration management, connection management, lawful interception, supporting transmission of session management (SM) information between the UE and the SMF, access authentication, and access authorization of the UE. The SMF has functions such as session management and roaming. The session management function includes, for example, session setup, modification, and release. The roaming function may include charging data collection and supporting of signaling transmission for authentication/authorization with an external data network (DN).

The PCF includes a user subscription information management function, a policy control function, a charging policy control function, quality of service (QOS) control, and the like.

The UPF is a functional network element on a user plane, and is mainly responsible for connecting to an external network and processing, such as forwarding, charging, and lawful interception, of a user packet. Optionally, the UPF may further receive data.

The DN is a network that provides a service for UE. For example, some DNs provide an Internet access function for the UE, and other DNs provide a short message function for the UE.

The AF may interact with a 3GPP core network. The AF may be specifically an application server, and may be configured to interact with the PCF to customize a policy for an application.

The NEF may provide network functions such as externally providing a service or a capability of a network element, an application function, and edge computing. Optionally, the NEF further provides an application function of providing information to the 3GPP core network, for example, in a mobility mode and a communication mode. In this case, the NEF may further provide a network function of authenticating, authorizing, and limiting the foregoing application function.

Optionally, the network shown in FIG. 1b may further include another network function. For example, a unified data management (UDM) has functions such as certificate authentication processing, user identification processing, access authorization, registration and mobility management, subscription management, and SMS message management.

A network repository function (NRF) is configured to store and maintain logic of information of a network function (NF). When receiving a service request from a subscriber, the NF can query the NRF for another NF that can provide a requested network service, to determine a next-hop route.

A network slice selection function (NSSF) is responsible for selecting a network slice for UE based on S-NSSAI. When the NSSF obtains the single network slice selection assistance information (S-NSSAI) sent by the UE, the NSSF selects, based on the S-NSSAI, a network slice instance (NSI) and/or a network slice subnet instance (NSSI) serving the UE.

The UE communicates with the AMF through an N1 interface, the RAN communicates with the AMF through an N2 interface, the RAN communicates with the UPF through an N3 interface, the UPF communicates with the SMF through an N4 interface, the UPF accesses the data network through an N6 interface, and different UPFs communicate with each other through an N9 interface. The AF provides services for other functions (for example, the UDM and the PCF) through an Naf interface. The UDM provides services for other functions (for example, the AF and the PCF) through an Nudm interface. The PCF provides services for other functions (for example, the UDM and the NRF) through an Npcf interface. The NRF provides services for other functions (for example, the NEF and the PCF) through an Nnrf interface. The NEF provides services for other functions (for example, the NRF and the NSSF) through an Nnef interface. The NSSF provides services for other functions (for example, the NEF and the NRF) through an Nnssf interface. The AUSF provides services for other functions (for example, the AMF and the NEF) through an Nausf interface. The AMF provides services for other functions (for example, the AUSF and the SMF) through an Namf interface. The SMF provides services for other functions (for example, the AUSF and the AMF) through an Nsmf interface.

It should be noted that, in the network shown in FIG. 1b, the core network device may include the NEF, the PCF, the AF, the AMF, the SMF, or the like, and may further include a network function that is not shown in the figure, such as the NRF.

The terminal device in the system is not limited to a 5G network, and includes a mobile phone, an internet-of-things device, a smart household device, an industrial control device, a vehicle device, an uncrewed aerial vehicle device, and the like. In embodiments of this application, the terminal device is various terminal devices or apparatuses that have a wireless communication function, for example, a mobile phone (or referred to as a "cellular" phone) and a computer having a mobile terminal, or may be a portable, pocket-sized, handheld, computer built-in, or vehicle-mounted mobile apparatus, which exchanges voice and/or data with a radio access network. For example, the terminal device is a device such as a personal communications service (PCS) phone, a cordless phone, a session initiation protocol (SIP) phone, a wireless local loop (WLL) station, or a personal digital assistant (PDA). The terminal device may also be referred to as a system, a subscriber unit, a subscriber station, a mobile station, a mobile, a remote station, an access point, a remote terminal, an access terminal, a user terminal, a user agent, a user device, or user equipment. The terminal device is, for example, a vehicle, a vehicle-mounted device, a vehicle-mounted module or unit, a flight device (including but not limited to an uncrewed aerial vehicle), an airborne device, an airborne module or unit, a drive test infrastructure device, a handheld device, a wearable device, a computing device, or another processing device connected to a wireless modem, such as vehicle user equipment (VUE) or air conditioner user equipment.

A main function of the radio access network (RAN) device is to control a user to access a mobile communication network through a wireless network. The RAN is a part of the mobile communication system. The RAN implements a radio access technology. Conceptually, the RAN resides on a device (for example, a mobile phone, a computer, or any remotely controlled machine) and provides a connection to a core network of the RAN. The RAN device includes but is not limited to: a gNodeB (g NodeB, gNB) in 5G, an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (Base Band Unit, BBU), a transmitting and receiving point (TRP), a transmitting point (TP), a mobile switching center, and the like, and may further include a wireless fidelity (Wi-Fi) access point (AP), and the like.

The foregoing network functions may be network elements that are implemented on dedicated hardware, may be software instances that are run on dedicated hardware, or may be instances that implement a virtualization function on an appropriate platform. For example, the foregoing virtualization platform may be a cloud platform.

In addition, embodiments of this application are also applicable to another future-oriented communication technology, for example, 6G. Network architectures and service scenarios described in this application are intended to describe the technical solutions in this application more clearly, and do not constitute a limitation on the technical solutions provided in this application. Persons of ordinary skill in the art may know that: With evolution of network architectures and emergence of new service scenarios, the technical solutions provided in this application are also applicable to similar technical problems.

The following describes some concepts related to embodiments of this application.

(1) Local Computing Device

In embodiments of this application, the local computing device is configured to perform multi-access edge computing or mobile edge computing. The local computing device is similar to the foregoing terminal device, and includes but is not limited to a mobile phone, an Internet of Things device, a smart home device, an industrial control device, a vehicle device, an uncrewed aerial vehicle device, or the like.

The local computing device may also be referred to as a terminal-type mobile edge computing device (UE-MEC).

(2) Local Computing Function

The local computing function in embodiments of this application is a function that can be provided by a local computing device for a terminal device. The local computing function includes but is not limited to a video decoding function, an image processing function, an image recognition function, a voice recognition function, a machine translation function, a gesture recognition function, an uncrewed driving function, a route planning function, or the like.

(3) Local Computing Algorithm (MEC Algorithm)

The local computing algorithm in embodiments of this application is an algorithm supported by a local computing device when the local computing device is configured to implement a local computing function. The local computing algorithm includes but is not limited to an artificial intelligence (AI) algorithm. For example, when a local computing function supported by a local computing device is a gesture recognition function, a local computing algorithm supported by the local computing device may include a recurrent neural network (RNN).

When a local computing function supported by a local computing device is an image processing function, local computing algorithms supported by the local computing device may include a convolutional neural network (CNN) and a generative adversarial network (GAN).

When a local computing function supported by a local computing device is a video decoding function, a local computing algorithm supported by the local computing device may include a video encoding algorithm, for example, a high efficiency video coding (H.265-HEVC) algorithm.

When a local computing function supported by a local computing device is a route planning function, a local computing algorithm supported by the local computing device may include a Dijkstra algorithm and the like.

(4) Microservice (Microserver) Information

Microservices are obtained by extracting and isolating a service unit based on independent deployment and release standards. A large, comprehensive, and complex application can be split into several small independent microservices. The microservice information in embodiments of this application is information about a microservice supported by a local computing device. For example, the local computing device supports an "image processing" microservice of an application program "photo album".

(5) Local Computing Time Budget

The local computing time budget is a time requirement of a task publisher, for example, a terminal device UE for performing local computing processing on a task. For example, if the terminal device UE expects to complete an image processing function within 0.1 s, 0.1 s is a local computing time budget of an image processing task.

(7) Average Processing Delay

The average processing delay is an average processing delay of processing a task by a local computing device. The average processing delay may be an average processing delay of processing all tasks by a local computing device, or may be an average processing delay for a specific function, for example, an average processing delay for image processing, an average processing delay for image recognition, and an average processing delay for gesture recognition.

(8) Current Processing Load

A current processing load of a local computing device is, for example, a current central processing unit occupation status or a memory occupation status of the local computing device.

(9) Protocol Data Unit Session and Quality of Service Flow

In a fifth generation mobile communication technology, there is a PDU session for providing a protocol data unit (PDU) connection service between UE and a core network.

However, quality of service (QOS) is managed based on a flow. One PDU session may include one or more QoS flows.

Each QoS flow corresponds to one or more QoS rules. A core network device provides the UE with a QoS rule corresponding to each QoS flow. The QoS rule provides an association relationship between uplink data and a QoS flow, so that the UE maps the uplink data to the corresponding QoS flow. The QoS rules reflect, to some extent, a quantity of data flows or a quantity of applications mapped to the QoS flows. The data flow is a set of sequential bytes that have a start point and an end point.

Different QoS flows have different QoS parameters. The QoS parameter includes but is not limited to a 5G QoS identifier (5QI), an allocation and retention priority (ARP), a guaranteed flow bit rate (GFBR), a maximum flow bit rate (MFBR), notification control, reflective QoS attribute (RQA), a maximum packet loss rate-uplink and downlink, and the like.

After a core network device receives a PDU session setup request of a terminal device, the core network device indicates a radio access network device to set up a corresponding PDU session for the terminal device. The core network device provides, for the radio access network device, a QoS parameter corresponding to each QoS flow included in the PDU session, and the radio access network device completes mapping between a QoS flow and a DRB and configuration of a data radio bearer (DRB) based on the QoS parameter. For example, at least one QoS flow with a similar QoS parameter is mapped to a same DRB. Data of one or more QoS flows associated with a DRB is transmitted through the DRB.

Figure 2:
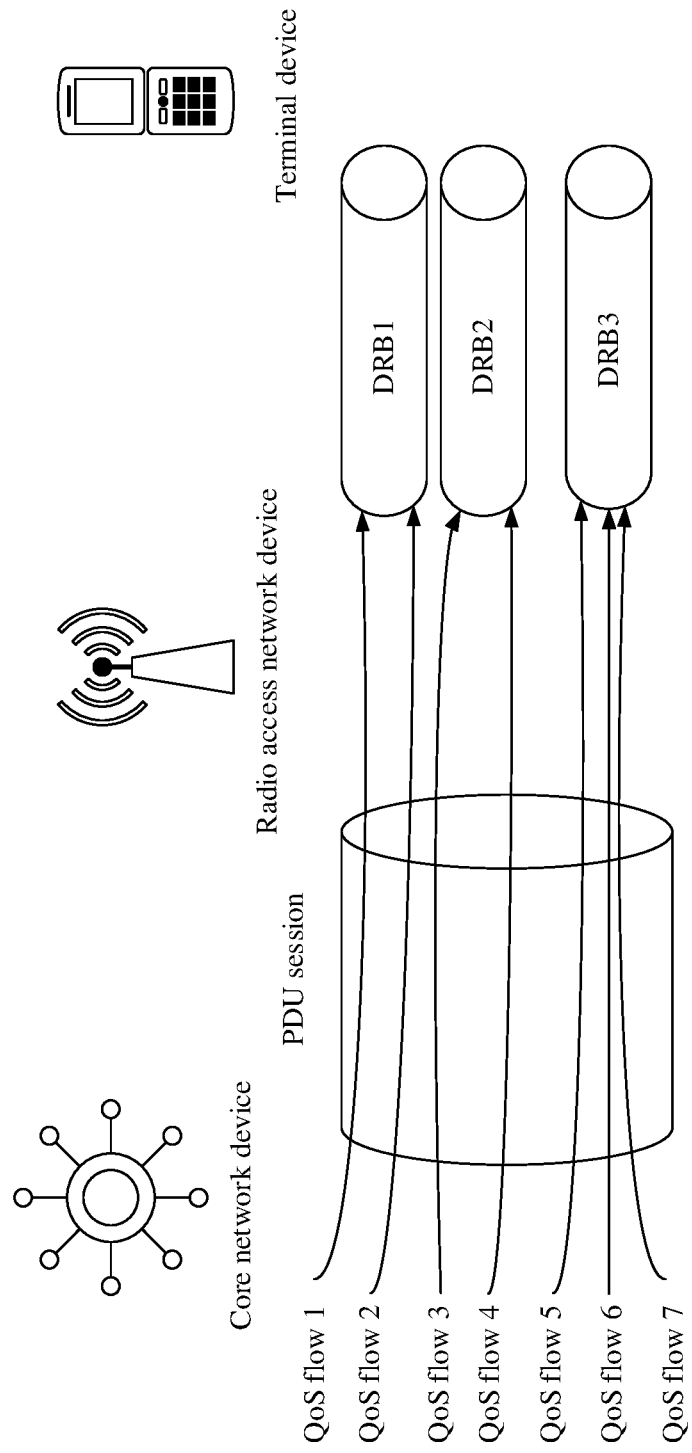
FIG. 2 is a schematic diagram of a PDU session.

In a 5G mobile communication technology, UE can set up more QoS flows and DRBs. A relationship between QoS flows and DRBs is not limited to one-to-one mapping. For example, one DRB may carry one QoS flow (that is, a ratio of a quantity of DRBs to a quantity of QoS flows is 1:1), and may carry a plurality of QoS flows (that is, a ratio of a quantity of DRBs to a quantity of QoS flows is 1:N, where N is a positive integer). For example, FIG. 2 is a schematic diagram of a PDU session. A PDU session between a core network and UE includes QoS flows 1 to 7 (a flow 1 to a flow 7), and there are seven QoS flows in total. The QoS flows 1 and 2 are carried on a DRB 1, the QoS flows 3 and 4 are carried on a DRB 2, and the QoS flows 5 to 7 are carried on a DRB 3.

Figure 3:
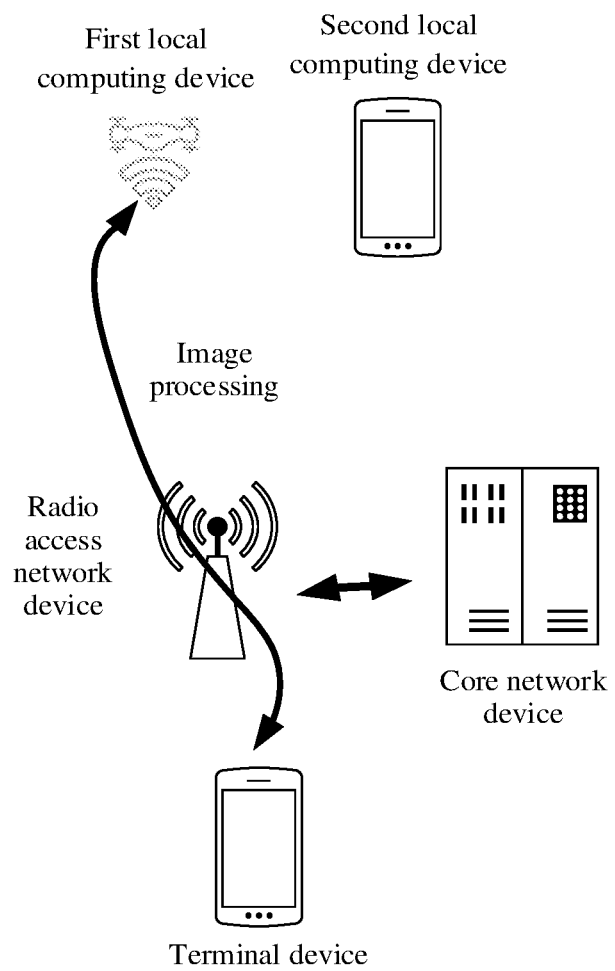
FIG. 3 is a schematic diagram of an application scenario according to an embodiment of this application.

The following describes an application scenario provided in embodiments of this application. FIG. 3 is a schematic diagram of an application scenario according to an embodiment of this application.

As shown in FIG. 3, an example in which a local computing device is a smartphone or an uncrewed aerial vehicle device and a terminal device is a smartphone is used for description. The terminal device sets up a PDU session with the local computing device through a radio access network device. Specifically, one or more local computing devices managed by the radio access network device may report local computing capability information to the radio access network device, for example, by including the local computing capability information in an uplink RRC message. For example, a first local computing device (an uncrewed aerial vehicle device) reports a supported image processing function, and a second local computing device (a smartphone) reports a supported voice recognition function.

Then, when the terminal device (the smartphone) performs an "image beautification" function in an application program "photo album", the terminal device sends a PDU session setup request message to a core network device through the radio access network device. The PDU session setup request message is a NAS message, for example, a "PDU session establishment request (PDU session setup request)" message.

The radio access network device forwards the PDU session setup request message in a first interface message. A first interface is an interface (for example, an NG interface) between the radio access network device and the core network device AMF, and the first interface message is a corresponding NGAP message. For example, the first interface message is an uplink NAS transport message on the NG interface. The core network device processes the PDU session setup request message, extracts an identifier of the PDU session corresponding to the PDU session setup request message, and further obtains a QoS flow included in the PDU session and a corresponding QoS parameter. Optionally, the PDU session setup request message carries a local computing service request indication. The core network device determines, based on the PDU session setup request message, the local computing capability information reported by the radio access network device, and optionally the local computing service request indication of the terminal device, whether the PDU session corresponding to the PDU session setup request message requires a local computing service. Alternatively, the core network device determines, based on the PDU session setup request message and local computing capability information reported by each radio access network device, whether a local computing device managed by the radio access network device can provide a local computing service for the PDU session. Alternatively, after receiving the PDU session setup request message of the UE, the core network device AMF performs matching based on a data network name (DNN) requested by the UE or user subscription information, routing information, service policy information, or the like provided by another network function of the core network such as a unified data management (UDM) or a policy control function (PCF), and finally determines to perform local computing on the PDU session in the radio access network device based on the local computing capability information reported by the radio access network device. Then, the core network device determines local computing request information corresponding to the PDU session. The local computing request information includes at least one of the following information: a local computing function, a local computing algorithm, microservice information, or a local computing time budget. The core network device sends the identifier of the PDU session and the local computing request information to the radio access network device in a second interface message. For example, the core network device includes the identifier of the PDU session and the local computing request information in an NG interface message, namely, a PDU session resource setup request message.

After receiving the second interface message, the radio access network device determines, based on the local computing request information included in the second interface message, a local computing device corresponding to the PDU session, for example, searches, based on the local computing request information, for a local computing device that matches the local computing capability information. For example, when the local computing function included in the local computing request information is an image processing function, after receiving the second interface message, the radio access network device determines that a local computing device that can provide a local computing service for the PDU session is a first local computing device that supports the image processing function. Alternatively, when the local computing function included in the local computing request information is an image processing function, and the local computing time budget is 0.1 s, the radio access network device determines, based on the local computing request information, a first local computing device that supports the image processing function and whose average processing delay is less than 0.1 s.

Then, the radio access network device sets up a PDU session between the first local computing device and the terminal device. The PDU session between the first local computing device and the terminal device includes a first DRB and a second DRB. The first DRB is a DRB between the first local computing device and the radio access network device, and the second DRB is a DRB between the terminal device and the radio access network device. User plane data between the first local computing device and the terminal device is transmitted in the PDU session (the first DRB and the second DRB). Specifically, the first local computing device provides a local computing service for the terminal device by using the PDU session. For example, the local computing device assists the terminal device in performing the "image beautification" function in the application program "photo album" by using the PDU session.

Another optional application scenario is similar to the scenario shown in FIG. 3. An example in which a local computing device is a smartphone or an uncrewed aerial vehicle device and a terminal device is a smartphone is used for description. The terminal device sets up a PDU session with the local computing device through a radio access network device. Specifically, one or more local computing devices managed by the radio access network device may report local computing capability information to the radio access network device. For example, a first local computing device (an uncrewed aerial vehicle device) reports a supported image processing function, and a second local computing device (a smartphone) reports a supported voice recognition function.

Then, when the terminal device (the smartphone) performs a "voice input" function in the application program "input method", the terminal device sends a PDU session setup request message to a core network device through the radio access network device.

The core network device determines, based on the PDU session setup request message and local computing capability information reported by each local computing device, whether the PDU session corresponding to the PDU session setup request message requires a local computing service, for example, whether a part of QoS flows of the PDU session require a local computing service. Alternatively, the core network device determines, based on the PDU session setup request message and local computing capability information reported by each local computing device, whether a local computing device managed by the radio access network device can provide a local computing service for the PDU session (the part of QoS flows). Alternatively, after receiving the PDU session setup request of the UE, the core network device AMF performs matching based on a data network name (DNN) requested by the UE or user subscription information, routing information, service policy information, or the like provided by another network function of the core network such as a unified data management (UDM) or a policy control function (PCF), and finally determines to perform local computing on the PDU session (the part of QoS flows) in the radio access network device based on the local computing capability information reported by the radio access network device.

When the terminal device (the smartphone) performs the "voice input" function in the application program "input method", a high requirement is imposed on timeliness of a task. Therefore, the radio access network device requires the local computing device to provide a voice recognition service. The radio access network device needs to offload the part of QoS flows in the PDU session (voice recognition service) to the local computing device. Each QoS flow in the part of QoS flows is referred to as a first QoS flow, and a set of first QoS flows is also referred to as a first QoS flow set. It should be noted that the first QoS flow set may be one or more QoS flows. In other words, in the PDU session that the terminal device requests to set up, only a part of QoS flows require a local computing service provided by the local computing device.

Then, the core network device sends an identifier of the PDU session, a QoS flow identifier of the first QoS flow, and corresponding local computing request information to the radio access network device in a second interface message.

After receiving the second interface message, the radio access network device determines, based on the second interface message, a local computing device corresponding to the PDU session setup request message, and sets up a PDU session between the local computing device and the terminal device. For example, when a local computing function included in the local computing request information is a voice recognition function, after receiving the second interface message, the radio access network device determines that a local computing device that can provide a local computing service for the PDU session is a second local computing device.

Then, the radio access network device sets up a PDU session between the second local computing device and the terminal device. User plane data between the second local computing device and the terminal device is transmitted in the PDU session. The PDU session carries at least one QoS flow in the first QoS flow set. Specifically, the second local computing device provides a local computing service for the terminal device by using the PDU session (at least one QoS flow in the first QoS flow set). For example, the local computing device assists the terminal device in performing the "voice input" function in the application program "input method" by using the PDU session (the at least one QoS flow in the first QoS flow set).

Figure 4:
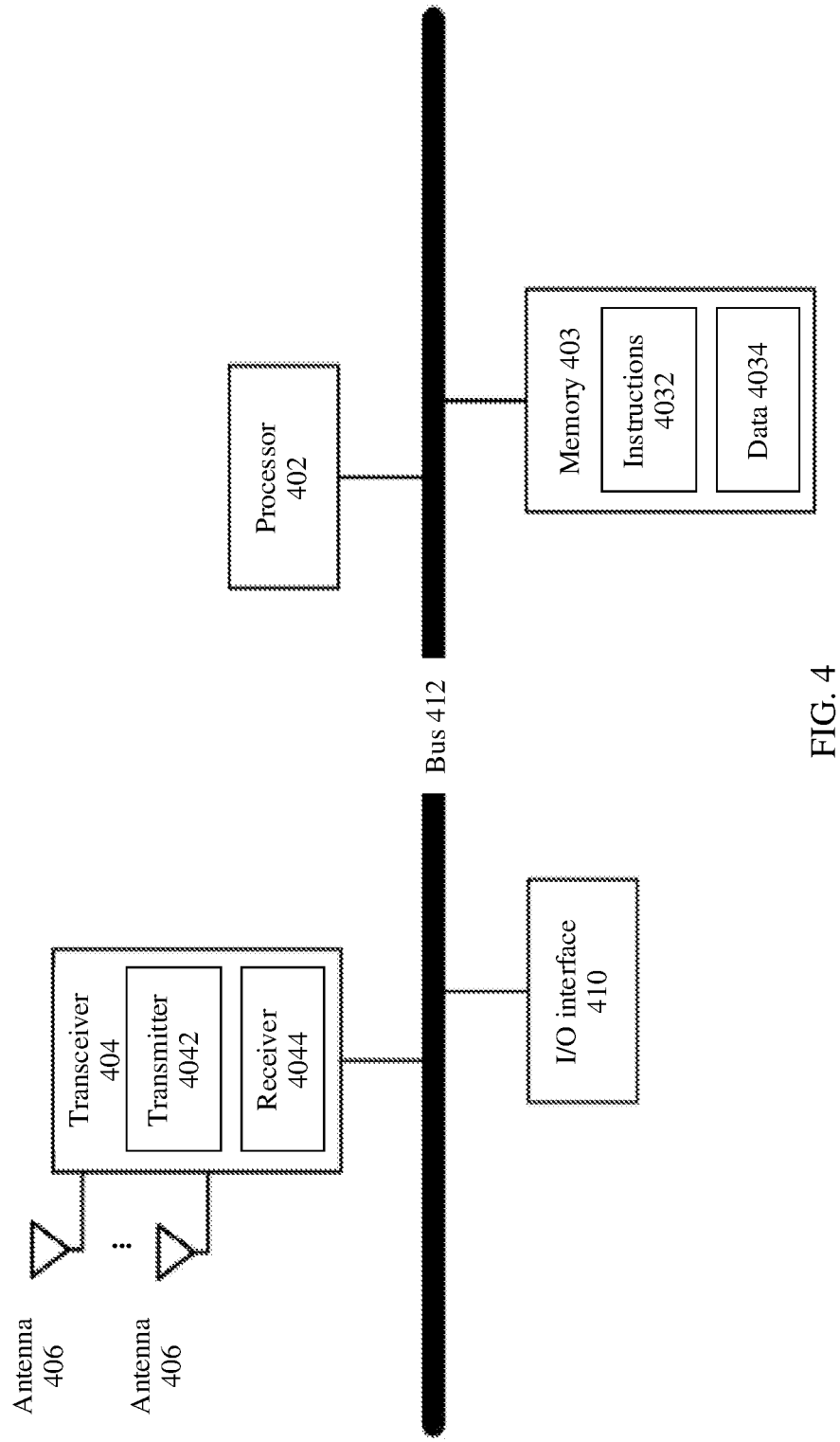
FIG. 4 is a schematic diagram of a hardware structure of a communication apparatus according to an embodiment of this application.

FIG. 4 is a schematic diagram of a hardware structure of a communication apparatus according to an embodiment of this application. The communication apparatus may be a terminal device, a local computing device, or a network device in embodiments of this application. The network device includes a core network device and a radio access network device. As shown in FIG. 4, the communication apparatus includes at least a processor 402, a memory 403, and a transceiver 404. The memory 403 is further configured to store instructions 4032 and data 4034. Optionally, the communication apparatus may further include antennas 406, an I/O (input/output, Input/Output) interface 410, and a bus 412. The transceiver 404 further includes a transmitter 4042 and a receiver 4044. In addition, the processor 402, the transceiver 404, the memory 403, and the I/O interface 410 are communicatively connected to each other by using the bus 412, and the antennas 406 are connected to the transceiver 404.

The processor 402 may be a general-purpose processor, for example without limitation to, a central processing unit (CPU), or may be a dedicated processor, for example without limitation to, a digital signal processor (DSP), an application-specific integrated circuit (ASIC), or a field programmable gate array (FPGA). In addition, the processor 402 may alternatively be a combination of a plurality of processors. Particularly, in the technical solutions provided in embodiments of this application, the processor 402 may be configured to perform related steps of a communication method in subsequent method embodiments. The processor 402 may be a processor that is specially designed to perform the foregoing steps and/or operations, or may be a processor that performs the foregoing steps and/or operations by reading and executing the instructions 4032 stored in the memory 403. The processor 402 may need to use the data 4034 in a process of performing the foregoing steps and/or operations.

The transceiver 404 includes the transmitter 4042 and the receiver 4044. In an optional implementation, the transmitter 4042 is configured to send a signal by using the antennas 406. The receiver 4044 is configured to receive a signal by using at least one of the antennas 406. Particularly, in the technical solutions provided in embodiments of this application, for example, the transmitter 4042 may be specifically configured to perform, by using at least one of the antennas 406, operations performed by a receiving module or a sending module in a terminal device, a local computing device, or a network device when a communication method in a subsequent method embodiment is applied to the terminal device, the local computing device, or the network device.

In this embodiment of this application, the transceiver 404 is configured to support the communication apparatus in performing the foregoing receiving function and sending function. A processor having a processing function is considered as the processor 402. The receiver 4044 may also be referred to as a receiver machine, an input port, a receiving circuit, or the like. The transmitter 4042 may also be referred to as a transmitter machine, a transmitting circuit, or the like.

The processor 402 may be configured to execute the instructions stored in the memory 403, to control the transceiver 404 to receive a message and/or send a message, to complete functions of the communication apparatus in the method embodiments of this application. In an implementation, it may be considered that a function of the transceiver 404 is implemented by using a transceiver circuit or a dedicated transceiver chip.

The memory 403 may be various types of storage media, for example, a random access memory (RAM), a read-only memory (Read Only Memory, ROM), or a non-volatile RAM (NVRAM), a programmable ROM (PROM), an erasable PROM (EPROM), an electrically erasable PROM (EEPROM), a flash memory, an optical memory, or a register. The memory 403 is specifically configured to store the instructions 4032 and the data 4034. The processor 402 may perform the steps and/or the operations in the method embodiments of this application by reading and executing the instructions 4032 stored in the memory 403. The data 4034 may need to be used in a process of performing the operations and/or the steps in the method embodiments of this application.

Optionally, the communication apparatus may further include the I/O interface 410. The I/O interface 410 is configured to receive instructions and/or data from a peripheral device, and output instructions and/or data to the peripheral device.

The method provided in embodiments of this application is described below. When a terminal device requires a local computing device to provide a local computing service, the local computing device may be determined by a radio access network device, or the local computing device may be determined by a core network device. The following separately provides descriptions with reference to the accompanying drawings.

Figure 5A:
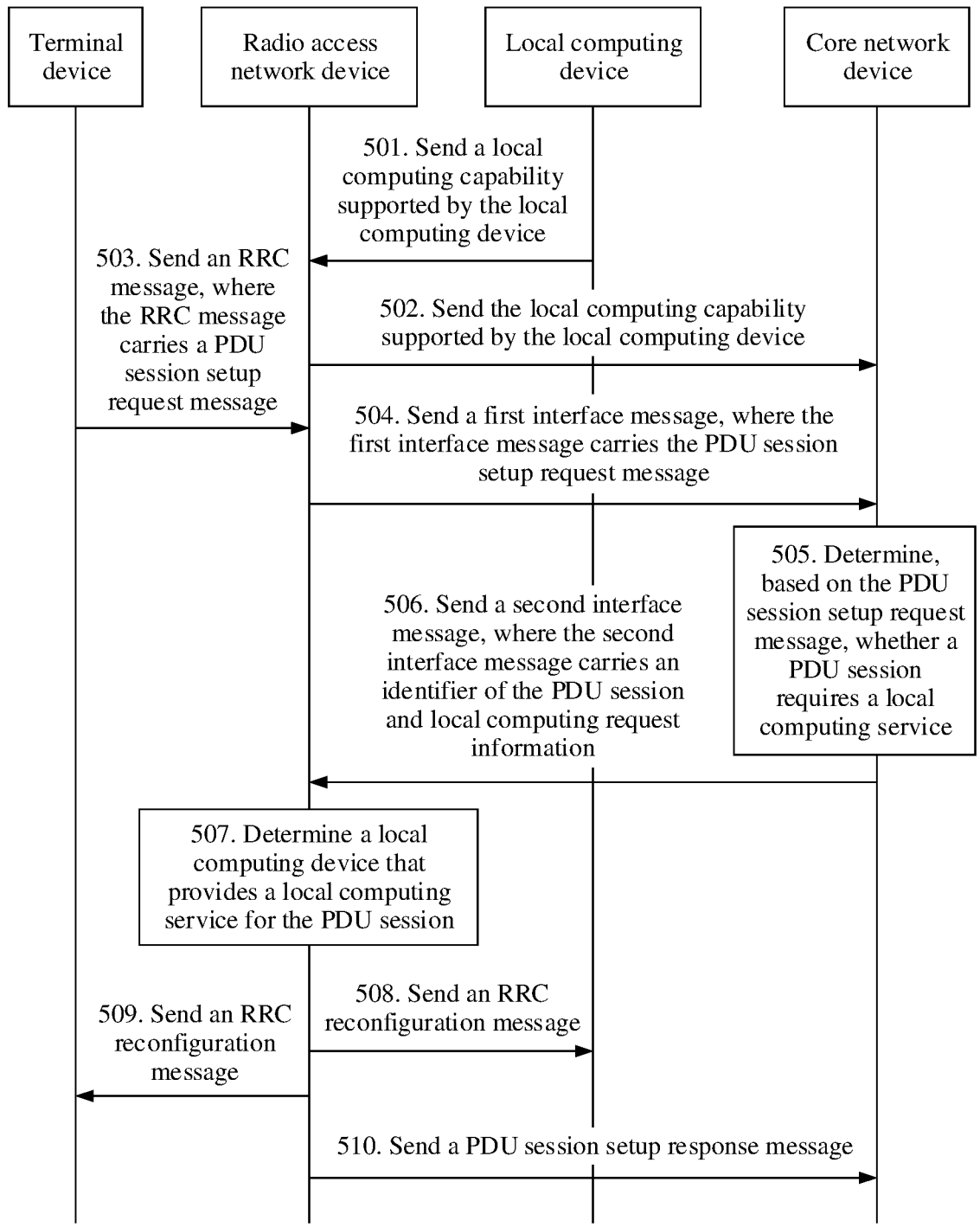
FIG. 5a is a schematic diagram of an embodiment of a mobile edge computing processing method according to an embodiment of this application.

FIG. 5a is a schematic diagram of an embodiment of a mobile edge computing processing method according to an embodiment of this application. The mobile edge computing processing method provided in this embodiment of this application includes the following steps.

501. A local computing device sends a local computing capability supported by the local computing device to a radio access network device.

In this embodiment, the local computing device sends local computing capability information to the radio access network device. The local computing capability information includes at least one of the following information: a local computing function supported by the local computing device, a local computing algorithm supported by the local computing device, microservice information supported by the local computing device, an average processing delay of the local computing device, or current processing load of the local computing device. The average processing delay of the local computing device may be one value, or may be a plurality of values. Each value corresponds to one or more local computing functions, corresponds to one or more local computing algorithms, or corresponds to one or more pieces of microservice information.

In step 501, that the local computing device sends local computing capability information to the radio access network device may be: The local computing device periodically sends the local computing capability information to the radio access network device, the local computing device reports the local computing capability information to the radio access network device when accessing the radio access network device, or the local computing device reports the local computing capability information to the radio access network device according to a capability request instruction of the radio access network device. This is not limited herein. Specifically, the local computing device may include the local computing capability information in an uplink RRC message sent to the radio access network device, where the uplink RRC message may be UE capability information.

For example, the local computing capability information sent by the local computing device to the radio access network device is shown in Table 1:

TABLE 1

| Local computing capability information-local computing device 1 | |
|---|---|
| Local computing function | Video decoding function, image processing function, and image recognition function |
| Identifier of a local computing algorithm | "CNN (convolutional neural network)", "H.265-HEVC (high efficiency video coding)", and "Dijkstra (Dijkstra)" |
| Identifier of microservice information | "Photo album (photo album)", "video (video)", or "map (map)" |
| Average processing delay | 5 milliseconds for "CNN", 6 milliseconds for "H.265-HEVC", and 7 milliseconds for "Dijkstra"; or 5 milliseconds for the video decoding function, 10 milliseconds for the image processing function, and 15 milliseconds for the image recognition function |
| Current processing load | 13% |

502. The radio access network device sends the local computing capability supported by the local computing device to a core network device.

In this embodiment, the radio access network device sends the local computing capability supported by the local computing device to the core network device (for example, an AMF).

In an optional implementation, each time after receiving local computing capability information reported by a local computing device, the radio access network device sends the local computing capability information and an identifier of the local computing device to the core network device (for example, the AMF).

The identifier of the local computing device may be "RAN UE-MEC NGAP ID (radio access network device-local computing device next-generation application protocol identifier)" or "AMF UE-MEC NGAP ID (access and mobility management function-local computing device next-generation application protocol identifier)". The "RAN UE-MEC NGAP ID" is allocated by the radio access network device to the local computing device, and uniquely identifies a local computing device on an NG interface on a radio access network device side. The identifier may alternatively be another identifier, for example, a media access control (MAC) address. This is not limited herein.

In another optional implementation, after receiving the local computing capability information reported by the local computing device, the radio access network device does not directly send the local computing capability information to the core network device (for example, the AMF). The radio access network device collects statistics on local computing capability information reported by the local computing device in a period of time, and sends a statistical result to the core network device (for example, the AMF). For example, the statistical result may be in a table form, for example, as shown in Table 2-1 and Table 2-2.

TABLE 2-1

| Local computing capability information | | Identifier of a local computing device |
|---|---|---|
| Local computing function | Video decoding function | Local computing device 1 and local computing device 2 |
| | Image processing function | Local computing device 1, local computing device 3, and local computing device 4 |
| | Route planning function | Local computing device 1, local computing device 2, and local computing device 4 |
| Local computing algorithm | Convolutional neural network | Local computing device 1, local computing device 3, and local computing device 4 |
| | High efficiency video coding algorithm | Local computing device 1 and local computing device 2 |
| | Dijkstra (Dijkstra) algorithm | Local computing device 1, local computing device 2, and local computing device 4 |

TABLE 2-2

| | Local computing capability information | Identifier of a local computing device |
|---|---|---|
| Average processing delay | Video decoding function: 5 milliseconds/ Image processing function: 6 milliseconds/ Route planning function: 7 milliseconds | Local computing device 1 |
| | Video decoding function: 8 milliseconds/ Route planning function: 15 milliseconds | Local computing device 2 |
| | Image processing function: 20 milliseconds | Local computing device 3 |
| | Image processing function: 15 milliseconds/ Route planning function: 31 milliseconds | Local computing device 4 |
| Current processing load | 13% | Local computing device 1 |
| | 28% | Local computing device 2 |
| | 60% | Local computing device 3 |
| | 25% | Local computing device 4 |

Table 2-1 and Table 2-2 are used as an example. Optionally, the radio access network device sends the statistical result to the core network device (for example, the AMF), and may send only the local computing capability information to the core network device (but does not send the identifier of the local computing device). For example, the radio access network device sends the "video decoding function", the "image processing function", and the "route planning function" to the core network device (for example, the AMF), to indicate a local computing device currently managed by the local computing device, where the local computing device includes the foregoing local computing function.

503. A terminal device sends an uplink RRC message to the radio access network device, where the uplink RRC message carries a PDU session setup request message.

In this embodiment, the terminal device sends the radio resource control (RRC) message to the radio access network device, where the uplink RRC message carries the PDU session setup request message.

Specifically, the PDU session setup request message is a non-access stratum (NAS) message. The uplink RRC message sent by the terminal device to the radio access network device carries the NAS message (the PDU session setup request message).

504. The radio access network device sends a first interface message to the core network device, where the first interface message carries the PDU session setup request message.

In this embodiment, after receiving the RRC message from the terminal device, the radio access network device sends the first interface message to the core network device (for example, the AMF) based on the PDU session setup request message carried in the RRC message, where the first interface message carries the PDU session setup request message.

Specifically, the first interface message may be an NG interface message, for example, an NG uplink non-access stratum transport (Uplink NAS Transport) message. After receiving the RRC message from the terminal device, the radio access network device first extracts the NAS message (namely, the PDU session setup request message) in the RRC message. Then, the radio access network device encapsulates the NAS message in the NG interface message, and sends the NG interface message to the core network device (for example, the AMF).

505. The core network device determines, based on the PDU session setup request message, whether a PDU session requires a local computing service.

In this embodiment, after receiving the first interface message, the core network device (for example, the AMF) determines, based on the PDU session setup request message carried in the first interface message, whether the PDU session corresponding to the PDU session setup request message requires a local computing service. Optionally, the PDU session setup request message carries a local computing service request indication. The core network device (for example, the AMF) determines, based on the local computing service request indication and other information, whether the PDU session (all or a part of QoS flows) requires a local computing service. If the PDU session requires a local computing service, step 506 is performed: The core network device (for example, the AMF) sends local computing request information to the radio access network device. If the PDU session does not require a local computing service, the core network device (for example, the AMF) assists, based on an existing conventional procedure, in setting up a PDU session among a core network device UPF, the radio access network device, and the terminal device.

In an implementation, when the PDU session (all or a part of QoS flows included in the entire PDU session) requires a local computing service, the core network device (for example, the AMF) determines, based on the PDU session setup request message, the local computing request information corresponding to the PDU session. The local computing request information includes at least one of the following information: a local computing function, a local computing algorithm, microservice information, or a local computing time budget.

For example, a PDU session 1 is used as an example. Local computing request information corresponding to the PDU session 1 is shown in Table 3.

TABLE 3

| PDU session 1 | |
| --- | --- |
| Local computing function | Video decoding function |
| Local computing algorithm | "H.265-HEVC" |
| Microservice information | "Video" |
| Local computing time budget | 10 milliseconds |

In another implementation, when a part of QoS flows (one QoS flow or a plurality of QoS flows) in the PDU session require a local computing service, the QoS flows that require the local computing service are referred to as a first QoS flow set, and the first QoS flow set includes one or more first QoS flows. The core network device (for example, the AMF) determines, based on the PDU session setup request message, local computing request information corresponding to each QoS flow in the first QoS flow set in the PDU session.

For example, that the first QoS flow set includes a QoS flow 1 (where the first QoS flow is the QoS flow 1) is used as an example. Local computing request information corresponding to the first QoS flow is shown in Table 4.

TABLE 4

| PDU session 1 QoS flow 1 | |
| --- | --- |
| Local computing function | Path planning function |
| Local computing algorithm | "H.265-HEVC" |
| Microservice information | "Video" |
| Local computing time budget | 10 milliseconds |

For example, the first QoS flow set includes a QoS flow 1 and a QoS flow 2 (where the first QoS flow is the QoS flow 1, or the first QoS flow may be the QoS flow 2). Local computing request information corresponding to each QoS flow in the first QoS flow set is shown in Table 5-1 or Table 5-2.

TABLE 5-1

| PDU session 1 QoS flow 1 | |
| --- | --- |
| Local computing function | Video decoding function |
| Local computing algorithm | "H.265-HEVC" |
| Microservice information | "Video" |
| Local computing time budget | 10 milliseconds |
| QoS flow 2 | |
| Local computing function | Route planning function |
| Local computing algorithm | "Dijkstra" |
| Microservice information | "Map" |
| Local computing time budget | 15 milliseconds |

TABLE 5-2

| PDU session 1 QoS flow 1 and QoS flow 2 | |
| --- | --- |
| Local computing function | Video decoding function |
| Local computing algorithm | "H.265-HEVC" |
| Microservice information | "Video" |
| Local computing time budget | 10 milliseconds |

As shown in Table 5-1, a plurality of QoS flows in the PDU session may correspond to different local computing request information. As shown in Table 5-2, different QoS flows in the PDU session correspond to same local computing request information.

506. The core network device sends a second interface message to the radio access network device, where the second interface message carries an identifier of the PDU session and the local computing request information.

In this embodiment, the core network device (for example, the AMF) sends the second interface message to the radio access network device, where the second interface message carries the identifier of the PDU session and the local computing request information.

Specifically, the core network device (for example, the AMF) determines the local computing request information corresponding to the PDU session or the local computing request information corresponding to each QoS flow in the first QoS flow set. The core network device (for example, the AMF) sends the identifier of the PDU session and the local computing request information to the radio access network device in an NG interface message. The NG interface message may be an NG application protocol (NGAP) message, for example, a PDU session resource setup request message. The PDU session resource setup request message carries the identifier of the PDU session and the local computing request information corresponding to the PDU session. Alternatively, the PDU session resource setup request message carries the identifier of the PDU session, a QoS flow identifier, and local computing request information corresponding to the QoS flow identifier.

Optionally, the second interface message further carries uplink transport network layer (TNL) information provided by the core network device (for example, the AMF). A transport network layer is also referred to as a transport layer. The uplink TNL information includes an Internet Protocol (IP) address on the core network device UPF side and a tunnel endpoint identity (TEID) on the core network device UPF side. After the radio access network device receives the uplink TNL information, the radio access network device returns, to the core network device (for example, the AMF), downlink TNL information corresponding to the uplink TNL information. The downlink TNL information includes an IP address on the radio access network device side and a TEID on the radio access network device side. The radio access network device and the core network device (for example, the AMF) exchange the uplink TNL information and the downlink TNL information, to establish a user plane tunnel between the radio access network device and the core network device UPF for the PDU session of the terminal device. If the second interface message does not include the TNL information, the user plane tunnel is not established, or the user plane tunnel is established but is not used.

Optionally, local computing capability information of a local computing device that is reported by the radio access network device carries an identifier of the local computing device. The second interface information may carry an identifier of a local computing device that is found by the core network device for the PDU session through matching or an identifier of a local computing device that is found for a QoS flow in the PDU session through matching.

For example, when the PDU session requires a local computing service, the second interface message may be:
">PDU session identifier (PDU session ID): PDU-2
  >Local computing request information
    >>Local computing algorithm identifier (MEC algorithm ID): "CNN"/Microservice identifier (microserver ID): "Photo album"
    >>Processing time budget: 20 milliseconds (ms)"

For example, when a part of QoS flows in the PDU session require a local computing service, the second interface message may be:
">PDU session identifier (PDU session ID): PDU-2
  >QoS flow setup request list
    >>QoS flow identifier: QFI-1
    >>Local computing request information
      >>>Local computing algorithm identifier (MEC algorithm ID): "CNN"/Microservice identifier (microserver ID): "Photo album"
      >>>Processing time budget (Processing delay budget): 20 milliseconds (ms)"

507. The radio access network device determines a local computing device that provides a local computing service for the PDU session.

In this embodiment, after receiving the second interface message, the radio access network device determines the local computing device that provides the local computing service for the PDU session.

In an optional implementation, the radio access network device determines, based on the local computing capability information reported by the local computing device and the local computing request information in the second interface message, the local computing device that provides the local computing service for the PDU session (or each QoS flow in the first QoS flow set in the PDU session). Specifically, one or more local computing devices that have a highest matching degree with the local computing request information among local computing devices that report local computing capability information are determined based on the local computing request information.

In another optional implementation, the second interface message carries the identifier of the local computing device that is found by the core network device (for example, the AMF) for the PDU session (or each QoS flow in the first QoS flow set in the PDU session) through matching. In this case, the radio access network device determines, based on the identifier of the local computing device, a local computing device that provides a local computing service for the PDU session (or each QoS flow in the first QoS flow set in the PDU session).

After determining the local computing device, the radio access network device determines a mapping relationship between each QoS flow in the PDU session and a data radio bearer (DRB), that is, determines a specific DRB to which a specific QoS flow is mapped. The DRB includes a DRB between the local computing device and the radio access network device and a DRB between the terminal device and the radio access network device. In this embodiment of this application, the first DRB is a DRB that is between the local computing device and the radio access network device and to which a QoS flow requiring a local computing service in the PDU session is mapped, and the second DRB is a DRB that is between the terminal device and the radio access network device and to which a QoS flow requiring a local computing service in the PDU session is mapped. The first DRB may be one DRB, or may be a plurality of DRBs. The second DRB may be one DRB, or may be a plurality of DRBs. One DRB may include one or more QoS flows. Specifically, the radio access network device determines a mapping relationship between a QoS flow and a DRB based on a QoS flow parameter of the QoS flow. For example, several QoS flows with similar QoS flow parameters form one DRB. For example, the mapping relationship is shown in Table 6:

TABLE 6

| QoS flow | DRB between a terminal device and a radio access network device | DRB between a radio access network device and a local computing device |
|---|---|---|
| QoS-1 | UE1-DRB1 | UE-MEC1-DRB1 |
| QoS-2 and QoS-3 | UE1-DRB2 | UE-MEC1-DRB3 |
| QoS-4 | UE1-DRB3 and UE1-DRB4 | UE-MEC1-DRB3 |

In an optional implementation, the DRB between the radio access network device and the local computing device may be a DRB that has been set up between the radio access network device and the local computing device.

In another optional implementation, the DRB between the radio access network device and the local computing device may be a new DRB configured by the radio network device for the local computing device.

There are a plurality of mapping relationships between the DRB between the terminal device and the radio access network device and the DRB between the radio access network device and the local computing device. Descriptions are separately provided below.

In a fixed mapping mode, for example, a mapping relationship exists between a UE1-DRB1 and a UE-MEC1-DRB1, and the mapping relationship is determined. After the radio access network device receives data from a terminal device 1 (UE1) by using the UE1-DRB1, the radio access network device determines a local computing device 1 (MEC1), and sends the data to the MEC1 by using the MEC1-DRB1.

Figure 5B:
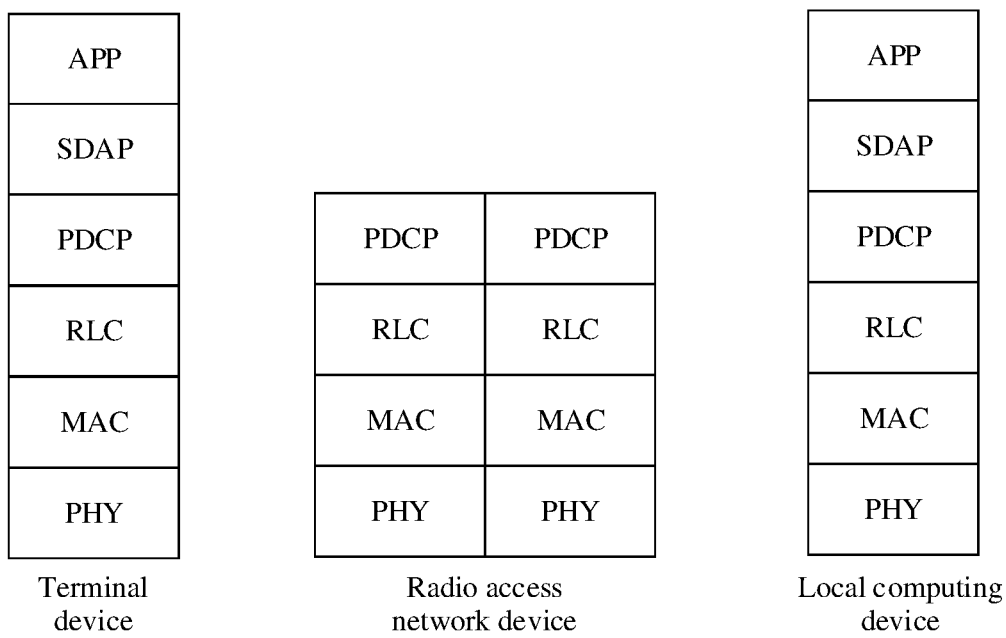
FIG. 5b is a schematic diagram of a user plane protocol stack according to an embodiment of this application.

In an optional implementation, an embodiment of this application provides a user plane protocol stack. As shown in FIG. 5b, when a DRB is in the fixed mapping mode, in a connection between the terminal device and the radio access network device, the terminal device includes an application (APP) layer, a packet data convergence protocol (PDCP) layer, a radio link control (RLC) layer, a media access control (MAC) layer, and a physical (PHY) layer. Optionally, the terminal device further includes a service data adaptation protocol (SDAP) layer. The SDAP layer is located between the APP layer and the PDCP layer. In the connection between the radio access network device and the terminal device, the radio access network device includes a PDCP layer, an RLC layer, a MAC layer, and a PHY layer. In a connection between the radio access network device and the local computing device, the radio access network device includes a PDCP layer, an RLC layer, a MAC layer, and a PHY layer. In a connection between local computing devices, the local computing devices each include an APP layer, or an APP layer and an SDAP layer.

Application layer: The terminal device (or the local computing device) generates data at the application layer, where the data includes a packet header and a payload. The data generated by the terminal device (or the local computing device) is processed at the SDAP layer, the PDCP layer, the RLC layer, the MAC layer, and the PHY layer, and then is sent to the radio access network device through a radio channel.

PDCP layer: The PDCP layer mainly processes an RRC message from a control plane and an IP packet from a data plane. Functions of the PDCP layer include header compression and decompression, encryption/decryption, integrity protection, transmission of user data and control plane data, reordering, retransmission, and the like.

SDAP layer: The SDAP layer is configured to map a QoS flow to a DRB, and is responsible for adding an SDAP header to a packet.

RLC layer: The RLC layer is mainly responsible for segmenting/concatenating and reassembling RLC service data units (SDU), performing error correction by using an automatic repeat request (ARQ), performing reordering and duplicate packet detection on RLC protocol data units (PDUs), re-segmenting RLC PDUs, and the like.

MAC layer: The MAC layer is mainly responsible for matching a logical channel and a transport channel, multiplexing a plurality of MAC SDUs that belong to one logical channel or belong to different logical channels into a same MAC PDU, sending the MAC PDUs to a PHY layer, and performing error correction, scheduling, logical channel priority processing, scheduling information reporting, random access process processing, or the like by using a hybrid automatic repeat request (HARQ).

PHY layer: The PHY layer specifies that mechanical, electronic, functional, and procedural characteristics are provided to create, maintain, and delete a physical link required for data transmission. In brief, the PHY layer ensures that original data can be transmitted over a variety of physical media.

In a non-fixed mapping mode, for example, a mapping relationship exists between a UE1-DRB1 and a MEC1-DRB1, and a mapping relationship exists between a UE2-DRB1 and a MEC1-DRB1. After the radio access network device receives data from a terminal device 1 (UE1) by using the UE1-DRB, the radio access network device determines a local computing device 1 (MEC1), and sends the data to the MEC1 by using the MEC1-DRB1. However, after receiving the data from the MEC1 by using the MEC1-DRB1, the radio access network device cannot determine a terminal device (the UE1 or UE2) to which the data is to be sent.

Figure 5C:
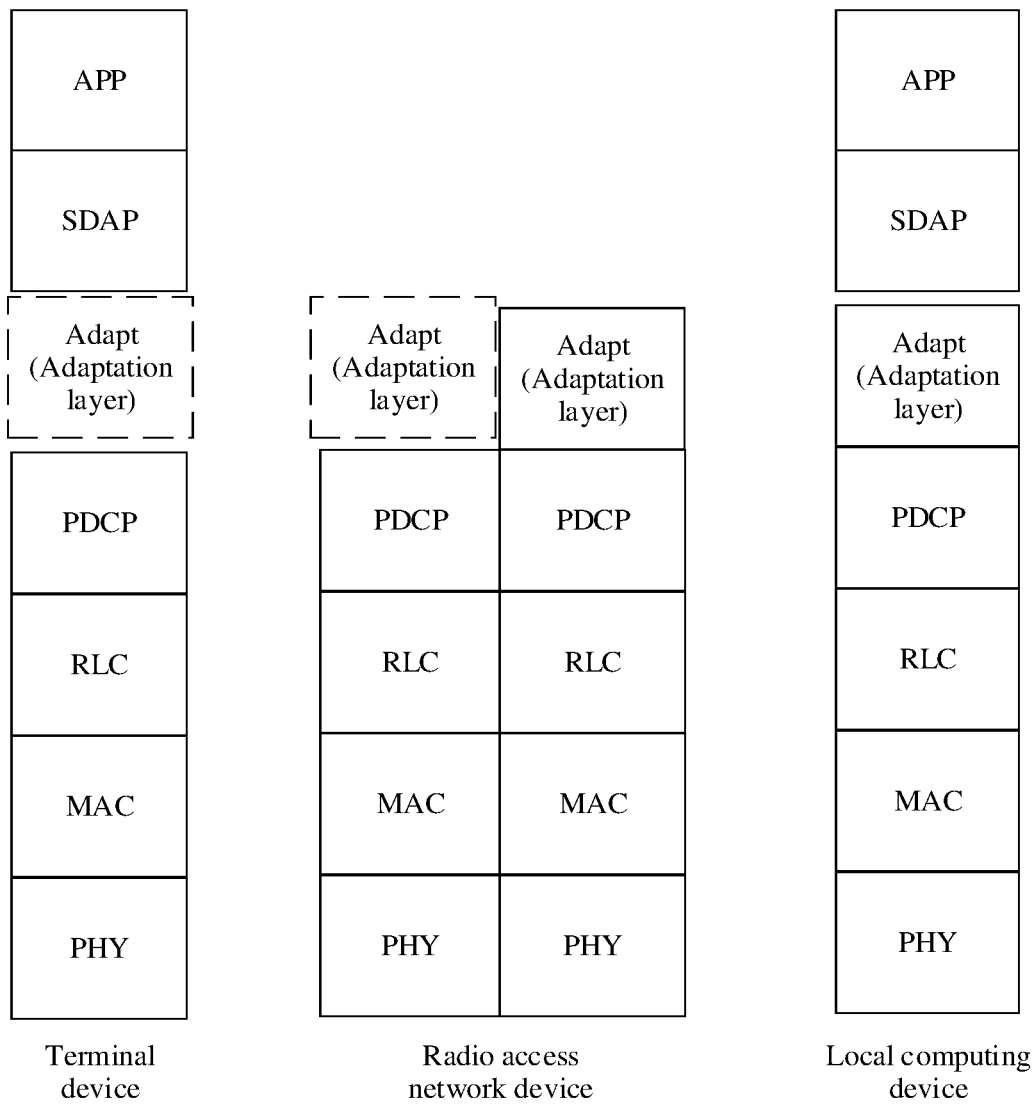
FIG. 5c is a schematic diagram of a user plane protocol stack according to an embodiment of this application.
Figure 6A:
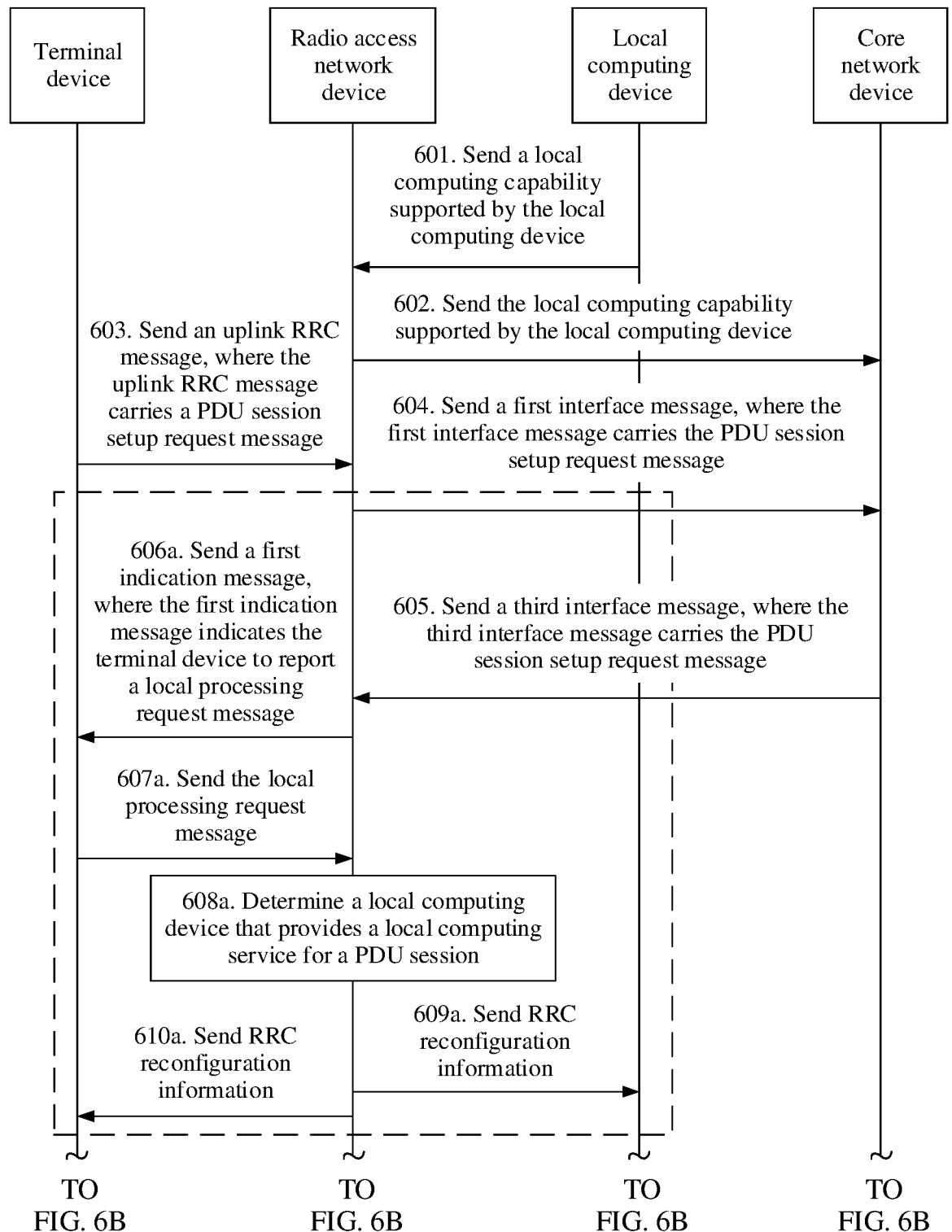
FIG. 6A and FIG. 6B are a schematic diagram of an embodiment of another mobile edge computing processing method according to an embodiment of this application.
Figure 6B:
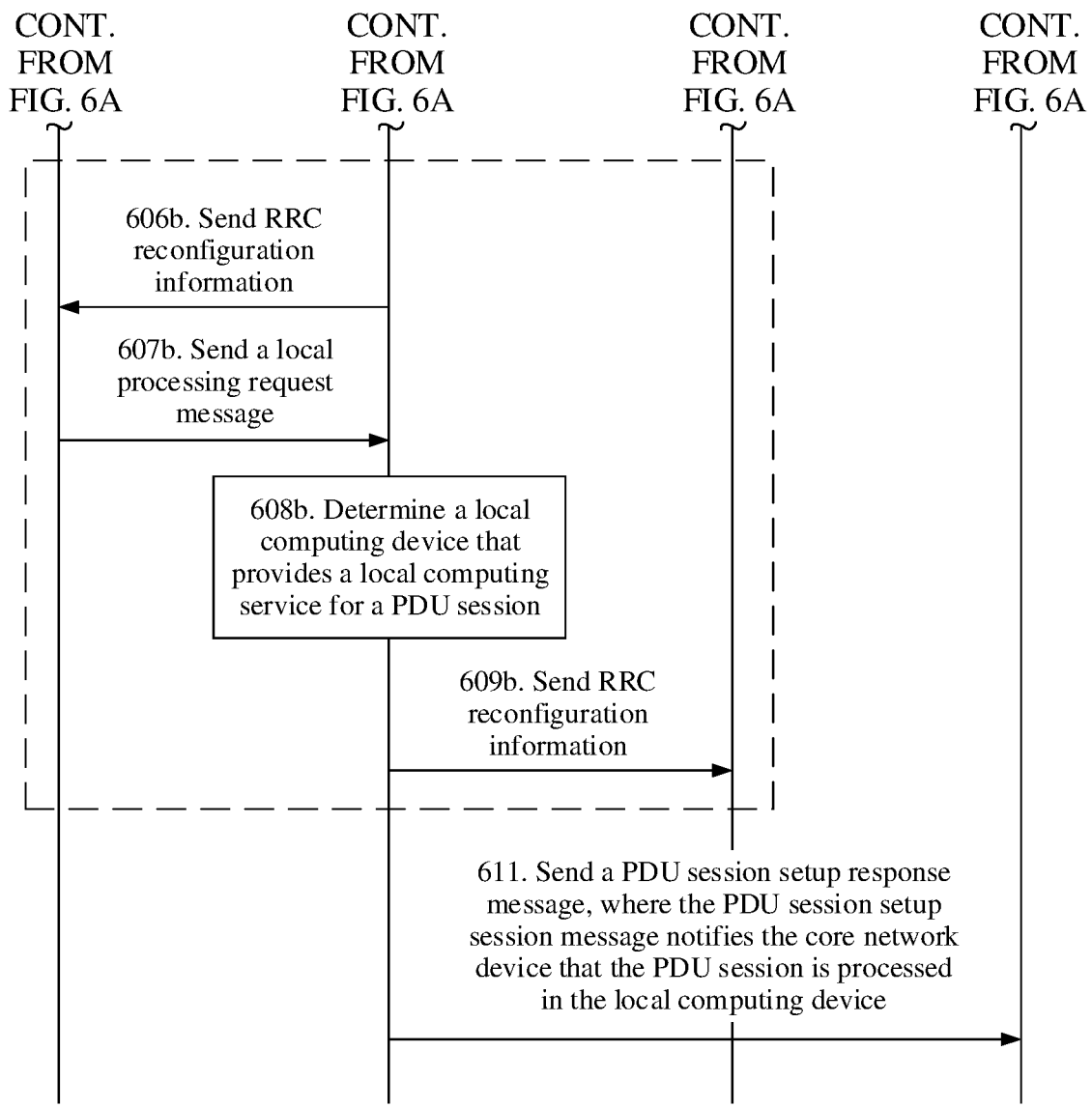

Based on this, an embodiment of this application provides an application layer protocol stack. As shown in FIG. 5c, when a DRB is in the non-fixed mapping mode, to ensure that data from the local computing device in a radio access network device can be effectively transmitted to a target terminal device, in the connection between the radio access network device and the local computing device, an adaptation (Adapt) layer is added to both the local computing device and the radio access network device. The adaptation layer in the local computing device is peer to the adaptation layer in the radio access network device, and a wireless communication interface technology between the local computing device and the radio access network device is used between the two adaptation layers.

The adaptation layer is responsible for carrying an identifier of the terminal device, carrying an identifier of the terminal device and a logical channel identifier (LCID) between the terminal device and the radio access network device, or carrying an identifier of the terminal device and an identifier of a data radio bearer DRB of the terminal device. In this way, after receiving the data from the local computing device, the radio access network device can determine, based on the identifier of the terminal device in the adaptation layer, or the identifier of the terminal device and the identifier of the DRB/LCID, a specific DRB of a specific terminal device to which the data is to be forwarded.

Optionally, in the connection between the terminal device and the radio access network device, an adaptation layer may be added to both the terminal device and the radio access network device. The adaptation layer is responsible for carrying an identifier of the local computing device, a logical channel identifier of a sidelink between the local computing device and the radio access network device, or an identifier of a data radio bearer of the local computing device. In this way, after receiving the data from the terminal, the radio access network device can determine, based on the identifier of the local computing device in the adaptation layer, or the identifier of the local computing device and the identifier of the DRB, a specific DRB of a specific local computing device to which the data is to be forwarded.

508. The radio access network device sends an RRC reconfiguration message to the local computing device.

In this embodiment, after determining the local computing device that provides the local computing service for the PDU session, the radio access network device sends the RRC reconfiguration message to the local computing device.

Specifically, the RRC reconfiguration message includes a mapping relationship between the first DRB and a corresponding QoS flow, and optionally, further includes a QoS parameter corresponding to the QoS flow.

Optionally, the RRC reconfiguration message sent by the radio access network device to the local computing device may further carry the identifier of the terminal device, for example, a cell radio network temporary identifier (cell-radio network temporary identifier, C-RNTI). Alternatively, the identifier may be an identifier that is negotiated by another radio access network device and the local computing device and that is for identifying the terminal device. Alternatively, the identifier may be another identifier allocated by the radio access network device to the terminal device, for example, "UE NGAP ID (terminal device next-generation application protocol identifier)", or may be another identifier that can be used by a gNB or an AMF to identify the UE. This is not limited herein. The message may further carry a logical channel identifier (LCID) between the terminal device and the radio access network device or an identifier of the second DRB between the terminal device and the radio access network device.

509. The radio access network device sends an RRC reconfiguration message to the terminal device.

In this embodiment, the radio access network device sends the RRC reconfiguration message to the terminal device.

Specifically, the RRC reconfiguration message includes a mapping relationship between the second DRB and a QoS flow.

Optionally, the radio access network device includes a NAS message in the RRC reconfiguration message, where the NAS message includes a QoS parameter of the QoS flow. The NAS message is from the core network device AMF.

510. The radio access network device sends a PDU session setup response message to the core network device.

In this embodiment, after steps 508 and 509, the radio access network device sends a PDU session setup response message to the core network device (for example, the AMF).

The terminal device sets up the first DRB and the second DRB with the local computing device based on the RRC reconfiguration messages received in steps 508 and 509 respectively, so that the terminal device and the local computing device set up the PDU session. The PDU session corresponds to the PDU session setup request message sent by the terminal device to the radio access network device in step 503. User plane data may be transmitted between the terminal device and the local computing device by using the PDU session (that is, the first DRB and the second DRB).

In this embodiment of this application, the radio access network device determines the matched local computing device based on the PDU session setup request message (the second interface message) sent by the core network device (for example, the AMF) for the terminal device and the local computing capability information of the local computing device. Then, the radio access network device sets up the PDU session between the local computing device and the terminal device. A network device (the radio access network device and the core network device) uses the local computing device as a computing resource of a network, and the network device controls communication and interaction between the UE and the local computing device. A complex architecture between the UE and the MEC is simplified, and MEC deployment is simplified. In this way, a local computing device can be flexibly deployed and enabled, a capability of an operator to control a local computing service is improved, and network performance is improved.

Based on the embodiment shown in FIG. 5a to FIG. 5c, FIG. 6A and FIG. 6B are a schematic diagram of an embodiment of another mobile edge computing processing method according to an embodiment of this application. The another mobile edge computing processing method provided in this embodiment of this application includes the following steps.

601. A local computing device sends a local computing capability supported by the local computing device to a radio access network device.

In this embodiment, the local computing device sends local computing capability information supported by the local computing device to the radio access network device.

Specifically, step 601 is similar to step 501. Details are not described herein again.

602. The radio access network device sends the local computing capability supported by the local computing device to a core network device.

In this embodiment, the radio access network device sends the local computing capability, received in step 601, supported by the local computing device to the core network device (for example, an AMF).

Specifically, step 602 is similar to step 502. Details are not described herein again.

603. A terminal device sends an uplink RRC message to the radio access network device, where the uplink RRC message carries a PDU session setup request message.

In this embodiment, the terminal device sends the uplink RRC message to the radio access network device, where the uplink RRC message carries the PDU session setup request message.

Specifically, step 603 is similar to step 503. Details are not described herein again.

604. The radio access network device sends a first interface message to the core network device, where the first interface message carries the PDU session setup request message.

In this embodiment, after receiving the RRC message from the terminal device, the radio access network device sends the first interface message to the core network device (for example, the AMF) based on the PDU session setup request message carried in the RRC message, where the first interface message carries the PDU session setup request message from the terminal device.

Specifically, step 604 is similar to step 504. Details are not described herein again.

605. The core network device sends a third interface message to the radio access network device, where the third interface message carries the PDU session setup request message.

In this embodiment, the core network device (for example, the AMF) generates the third interface message based on the first interface message. The third interface message is the PDU session setup request message.

Specifically, the third interface message is an NG interface message. The NG interface message may be an NG application protocol (NGAP) message, for example, a PDU session resource setup request message. The PDU session resource setup request message carries an identifier of a PDU session.

After step 605, there are two optional implementation solutions, which correspond to step 606a to step 610a and step 606b to step 609b respectively. Descriptions are separately provided below.

Step 606a to step 610a are as follows:

Step 606a. The radio access network device sends a first indication message to the terminal device.

In this embodiment, after receiving the third interface message from the core network device, the radio access network device sends the first indication message to the terminal device, where the first indication message indicates the terminal device to report a local processing request message.

Specifically, after receiving the third interface message from the core network device, the radio access network device sends the first indication message (for example, an RRC message) to the terminal device. The RRC message carries a NAS message (also referred to as a NAS container) from the core network device, and the NAS message includes a QoS flow identifier and a corresponding QoS parameter.

Optionally, the first indication message carries an indication identifier. The indication identifier may be in the RRC message, or may be in the NAS message. The indication identifier indicates the terminal device to report the local processing request message.

607a. The terminal device sends the local processing request message to the radio access network device.

In this embodiment, after receiving the first indication message, the terminal device sends the local processing request message to the radio access network device.

Specifically, the terminal device sends the local processing request message to the radio access network device in an uplink RRC message. First, the terminal device determines which DRBs corresponding to the PDU session require a local computing service, or determines which QoS flows included in the PDU session require a local computing service. Second, the local processing request message sent by the terminal device to the radio access network device carries an identifier of a PDU session that requires a local computing service, and may further include an identifier of a DRB that requires a local computing service, or carries an identifier of a QoS flow that requires a local computing service.

The local processing request message carries local computing request information corresponding to the PDU session, local computing request information corresponding to a first QoS flow in the PDU session, local computing request information corresponding to a DRB related to the PDU session, the identifier of the PDU session, a flow identifier of the first QoS flow, or a DRB identifier.

608a. The radio access network device determines a local computing device that provides a local computing service for the PDU session.

In this embodiment, after receiving the local processing request message from the terminal device, the radio access network device determines, based on the local processing request message, the local computing device that provides the local computing service for the PDU session (or the DRB or the first QoS flow). A specific process of determining the local computing device is similar to step 507. Details are not described herein again.

609a. The radio access network device sends RRC reconfiguration information to the local computing device.

In this embodiment, after determining the local computing device that provides the local computing service for the PDU session (or the DRB or the QoS flow), the radio access network device sends the RRC reconfiguration message to the local computing device. The RRC reconfiguration message is similar to step 508. Details are not described herein again.

610a. The radio access network device sends RRC reconfiguration information to the terminal device.

In this embodiment, the radio access network device sends the RRC reconfiguration message to the terminal device.

Specifically, step 610a is similar to step 509. Details are not described herein again.

Step 606b to step 609b are as follows:

606b. The radio access network device sends RRC reconfiguration information to the terminal device.

In this embodiment, the radio access network device sends the RRC reconfiguration message to the terminal device. The RRC reconfiguration message includes a mapping relationship between a DRB and a QoS flow. The RRC reconfiguration message may further include a NAS message sent by the core network device (for example, the AMF) to the terminal device, where the NAS message includes a QoS parameter corresponding to each QoS flow in the PDU session.

607b. The terminal device sends a local processing request message to the radio access network device.

In this embodiment, after the terminal device receives the mapping relationship between a DRB and a QoS flow in step 606b, the terminal device determines specific DRBs or specific QoS flows that require a local computing service, for example, determines, based on the QoS parameter of each QoS flow obtained in step 606b, whether a local computing service is required. Then, the terminal device sends the local processing request message to the radio access network device. The local processing request message carries local computing request information corresponding to the PDU session, local computing request information corresponding to a first QoS flow in the PDU session, local computing request information corresponding to a DRB related to the PDU session, the identifier of the PDU session, a flow identifier of the first QoS flow, or an identifier of a DRB that requires a local computing service. It should be noted that the DRB that requires a local computing service may be one DRB, or may be a plurality of DRBs. This is not limited herein.

608b. The radio access network device determines a local computing device that provides a local computing service for the PDU session.

In this embodiment, after receiving the local processing request message from the terminal device, the radio access network device determines, based on the local processing request message, the local computing device that provides the local computing service for the PDU session (or a DRB or a QoS flow). A specific process of determining the local computing device is similar to step 507. Details are not described herein again.

609b. The radio access network device sends RRC reconfiguration information to the local computing device.

In this embodiment, after determining the local computing device that provides the local computing service for the PDU session (or the DRB or the QoS flow), the radio access network device sends the RRC reconfiguration message to the local computing device.

Specifically, step 609 is similar to step 509. Details are not described herein again.

611. The radio access network device sends a PDU session setup response message to the core network device, where the PDU session setup response message notifies the core network device that the PDU session is processed in the local computing device.

In this embodiment, after step 610a or step 609b, the radio access network device sends the PDU session setup response message to the core network device. The terminal device and the local computing device set up the PDU session based on the RRC reconfiguration messages received in steps 609 and 610, where the PDU session corresponds to the PDU session setup request message sent by the terminal device to the radio access network device in step 603.

In this embodiment of this application, a network device (the radio access network device and the core network device) uses the local computing device as a computing resource of a network, and the network device controls communication and interaction between the UE and the local computing device. A complex architecture between the UE and the MEC is simplified, and MEC deployment is simplified. In this way, a local computing device can be flexibly deployed and enabled, a capability of an operator to control a local computing service is improved, and network performance is improved. The terminal device determines specific DRBs in the requested PDU session that require a local computing service. In the network device, the radio access network device determines the local computing device that provides the local computing service for the PDU session, to improve implementation flexibility of the solution.

Based on the embodiments shown in FIG. 5a to FIG. 6B, an embodiment of this application further provides a mobile edge computing processing method. A core network device determines, based on local computing capability information reported by a radio access network device and a PDU session setup request, a local computing device that provides a service for a PDU session. A specific procedure is similar to that in the foregoing embodiments. Details are not described herein again.

Based on the embodiments shown in FIG. 5a to FIG. 6B, an embodiment of this application further provides a mobile edge computing processing method. A local computing device and a terminal device set up a second PDU session. When the local computing device cannot provide a local computing service for the terminal device due to movement or insufficient computing resources, the local computing device may set up a first PDU session with a core network device, where the PDU session is for transmitting a context of the second PDU session that is related to the terminal device and that is in the local computing device. This ensures normal running of the terminal device when being subsequently connected to the core network. This context migration is also referred to as virtual machine migration.

Figure 7A:
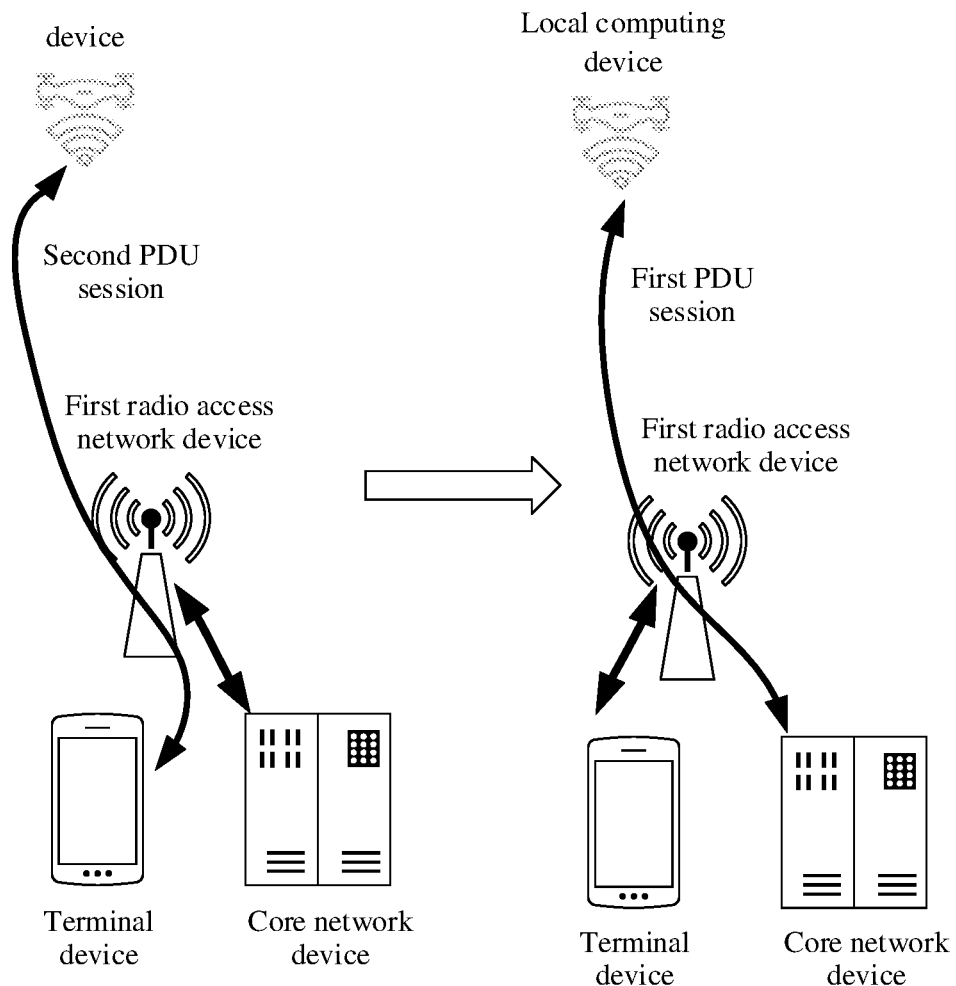
FIG. 7a is a schematic diagram of another application scenario according to an embodiment of this application.

In an optional implementation, for example, FIG. 7*a* is a schematic diagram of another application scenario according to an embodiment of this application. The local computing device may complete the foregoing context migration procedure through a first radio access network device, where the first radio access network device is a radio access network device accessed by the local computing device when the local computing device provides a local computing service for the terminal device. The first radio access network device may be referred to as a source radio access network device.

Figure 7B:
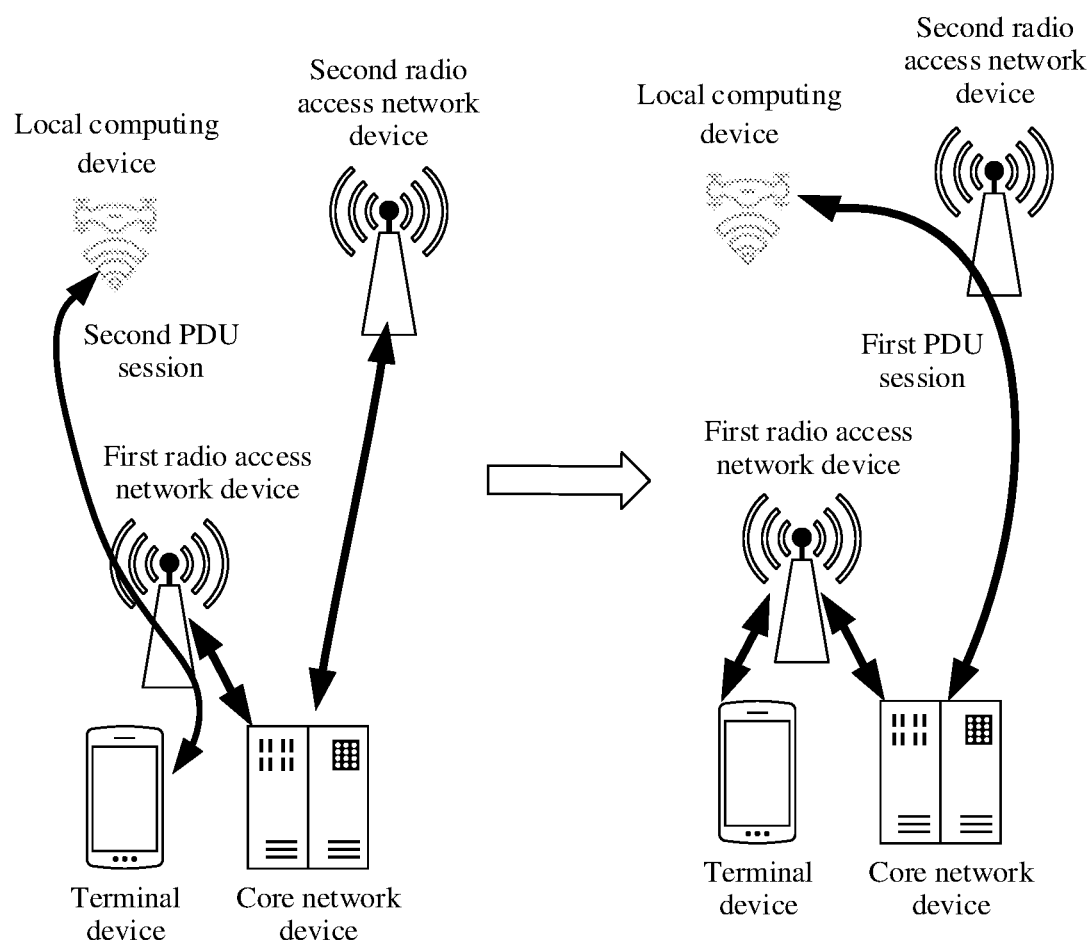
FIG. 7b is a schematic diagram of another application scenario according to an embodiment of this application.

In another optional implementation, for example, FIG. 7*b* is a schematic diagram of another application scenario according to an embodiment of this application. The local computing device may complete the foregoing context migration procedure through a second radio access network device, where the second radio access network device is a radio access network device currently accessed by the local computing device. The second radio access network device is inconsistent with the first radio access network device. The second radio access network device is also referred to as a target radio access network device.

The following separately provides descriptions with reference to the accompanying drawings.

Figures 1, 7C:
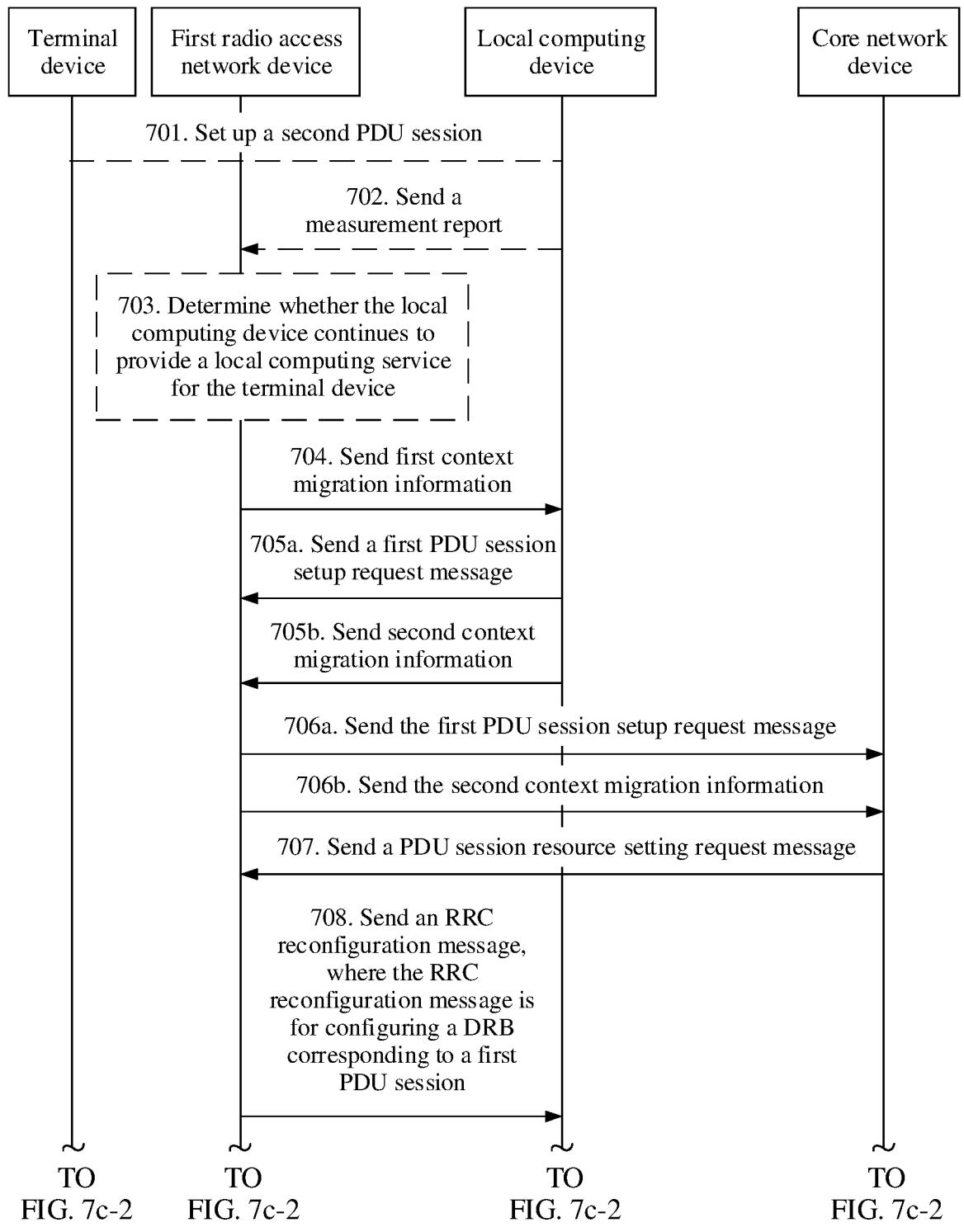
Figures 2, 7C:
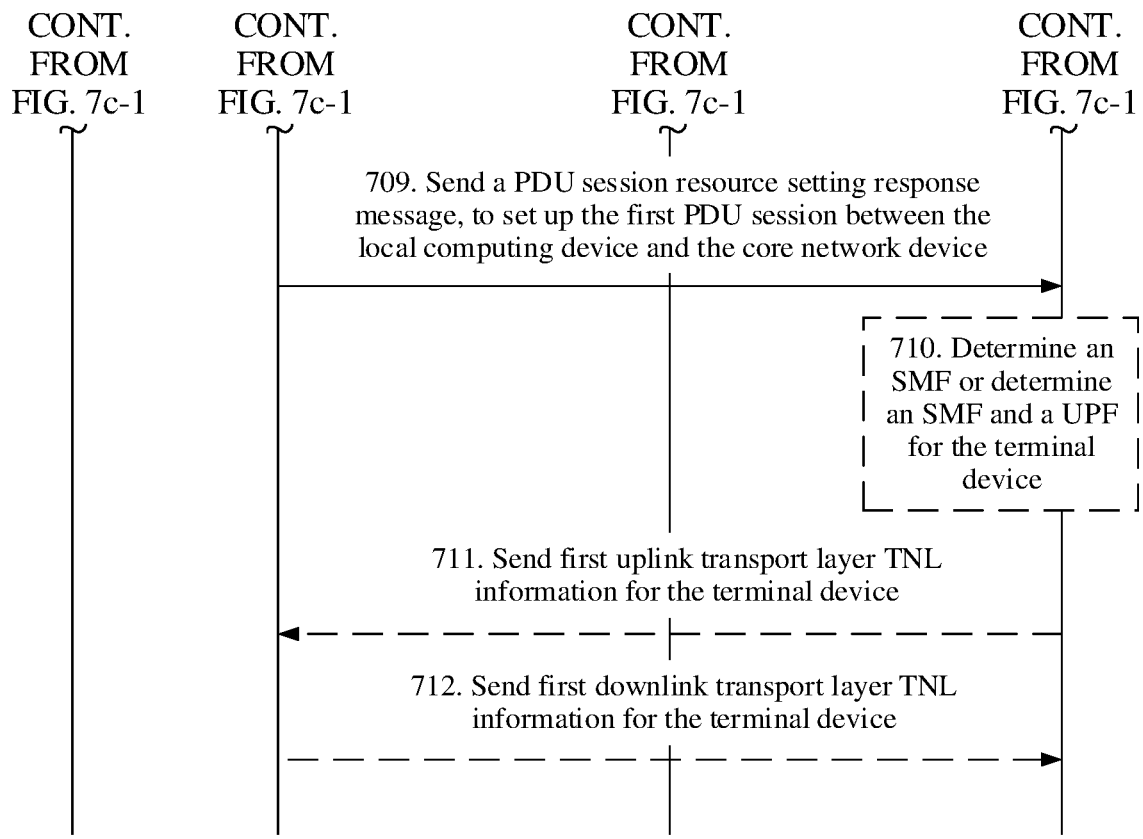

FIG. 7*c*-1 and FIG. 7*c*-2 are a schematic diagram of an embodiment of another mobile edge computing processing method according to an embodiment of this application. A local computing device completes a context migration procedure through a first radio access network device. The another mobile edge computing processing method provided in this embodiment of this application includes the following steps.

701. Set up a second PDU session.

In this embodiment, the second PDU session is set up between a terminal device and the local computing device. Specifically, the second PDU session may be set up by using a related procedure in the mobile edge computing processing method shown in FIG. 5*a* or FIG. 6B. The terminal device exchanges user plane data with the local computing device by using the second PDU session. Alternatively, the second PDU session may be set up in another manner. This is not limited herein. The second PDU session includes a third DRB and a fourth DRB. The third DRB is a DRB between the local computing device and a radio access network device, and the fourth DRB is a DRB between the terminal device and the radio access network device.

702. The local computing device sends a measurement report to the first radio access network device.

In this embodiment, the local computing device sends the measurement report to the first radio access network device.

In an optional implementation, the local computing device periodically detects quality of communication between the local computing device and the first radio access network device. When the local computing device detects that current communication quality is lower than or equal to a threshold, or the local computing device detects that current quality of communication with the first radio access network device is lower than quality of communication with another radio access network device, the local computing device sends the measurement report to the first radio access network device. For example, the measurement report records an event A3.

In another optional implementation, when the local computing device cannot continue to provide a local computing service for the terminal device, the local computing device sends a second indication message to the first radio access network device, where the second indication message indicates that the local computing device cannot continue to provide the local computing service for the terminal device, and the second indication message carries an identifier of the local computing device. For example, that the local computing device cannot continue to provide the local computing service for the terminal device may be: A battery power of the local computing device is lower than a threshold, or an average processing delay of the local computing device is greater than a threshold.

Optionally, the measurement report may further carry another identifier, to notify the first radio access network device that the local computing device cannot continue to provide the local computing service for the terminal device. This is not limited herein.

It should be noted that the first radio access network device may not determine, based on the measurement report, whether the local computing device continues to provide a local computing service for the terminal device.

703. The first radio access network device determines whether the local computing device continues to provide a local computing service for the terminal device.

In this embodiment, optionally, the first radio access network device determines, based on the measurement report, whether the local computing device continues to provide a local computing service for the terminal device.

For example, when the event A3 is recorded in the measurement report, the first radio access network device determines that the local computing device cannot continue to provide a local computing service for the terminal device.

In another optional implementation, when the first radio access network device receives the second indication message, the first radio access network device determines that the local computing device cannot continue to provide a local computing service for the terminal device.

In another optional implementation, the first radio access network device may not determine, based on the measurement report, whether the local computing device continues to provide a local computing service for the terminal device. For example, an example in which the local computing device (MEC1) provides an image processing service for the terminal device is used. An average processing delay for the image processing function of the MEC1 is 25 milliseconds. When a plurality of local computing devices managed by the first radio access network device include a local computing device (MEC2) that also provides an image processing function, and an average processing delay for the image processing function of the MEC2 is lower than that of the MEC1, for example, the average processing delay for the image processing function of the MEC2 is 15 milliseconds, the first radio access network device determines that the MEC1 does not continue to provide a local computing service for the terminal device. Then, the first radio access network device notifies the MEC2 to set up a PDU session with the terminal device. A specific procedure is not described herein again.

It should be noted that step 701 to step 703 are optional steps.

704. The first radio access network device sends first context migration information to the local computing device.

In this embodiment, when the first radio access network device determines that the local computing device cannot continue to provide a local computing service for the terminal device, the first radio access network device sends the first context migration information to the local computing device. When the local computing device provides a local computing service for a plurality of terminal devices, the first context migration information may further include an identifier of the terminal device.

Specifically, the first radio access network device sends the first context migration information to the local computing device in an RRC reconfiguration message.

In an optional implementation, the first context migration information includes an identifier of a DRB, where the DRB is a third DRB included in the second PDU session, and the third DRB is the DRB between the local computing device and the radio access network device in the second PDU session.

In another optional implementation, the first context migration information further includes the identifier of the terminal device or an identifier of the second PDU session.

In another optional implementation, the first context migration information further includes a context migration indication, and the context migration indication indicates that the first context migration information is for performing context migration through the local computing device. The context migration indication is referred to as an "MEC context migration indication".

For example, the first context migration information may be:
">DRB list
>>DRB ID: DRB-3
>>MEC context migration indication"

When one DRB in the local computing device is mapped to a plurality of DRBs of a plurality of terminal devices (or one DRB in the local computing device is mapped to a plurality of DRBs of one terminal device), for example, the first context migration information may be:
">DRB list (>
>DRB ID: DRB-3
>>UE ID list (terminal device identifier list)>
>>UE ID (terminal device identifier): UE-1
>>>PDU session ID (identifier of the second PDU session): PDU-2
>>>MEC context migration indication"

In another optional implementation, the first context migration information includes only an identifier of a third DRB. An identifier of the second PDU session and an identifier of the terminal device are independent of the first context migration information, and are sent to the local computing device in RRC reconfiguration messages different from that for sending the first context migration information.

705a. The local computing device sends a first PDU session setup request message to the first radio access network device.

In this embodiment, after receiving the first context migration information, the local computing device sends the first PDU session setup request message to the first radio access network device.

705b. The local computing device sends second context migration information to the first radio access network device.

In this embodiment, after receiving the first context migration information, the local computing device sends the second context migration information to the first radio access network device.

Specifically, after the local computing device receives the first context migration information sent by the radio access network device in the RRC reconfiguration message, an RRC layer of the local computing device sends first indication information to a NAS layer, where the first indication information indicates to perform context migration. The first indication information may include the first context migration information. After receiving the first indication information, the NAS layer of the local computing device generates a PDU session setup request message of the NAS layer. The first PDU session setup request message is similar to the PDU session setup request message in the foregoing embodiment. The NAS message (the first PDU session setup request message) is encapsulated in an uplink RRC message sent by the local computing device to the radio access network device.

The second context migration information is similar to the first context migration information. For example, the second context migration information may include the identifier of the terminal device, the identifier of the second PDU session, or the context migration indication. Details are not described herein again.

In an optional implementation, the uplink RRC message in which the NAS message (the first PDU session setup request message) is encapsulated further carries the second context migration information. The second context migration information and the first PDU session setup request message are independent of each other. For example, the uplink RRC message may be a "UL RRC message (NAS message, UE ID, PDU session ID, a MEC context migration indication)".

In another optional implementation, the first PDU session setup request message further includes the second context migration information, that is, the second context migration information is encapsulated in the NAS message, namely, the first PDU session setup request message.

In another optional implementation, the first PDU session setup request message and the second context migration information are independent of each other, and the local computing device separately sends the first PDU session setup request message and the second context migration information to the first radio access network device in different messages. For example, different uplink RRC messages may be for sending. For example, step 705a is performed first, and then step 705b is performed.

706a. The first radio access network device sends the first PDU session setup request message to the core network device.

In this embodiment, the first radio access network device sends the first PDU session setup request message from the local computing device to the core network device (for example, an AMF).

706b. The first radio access network device sends the second context migration information to the core network device.

In this embodiment, the first radio access network device sends the second context migration information to the core network device (for example, the AMF).

Specifically, after the first radio access network device receives the first PDU session setup request message and second context migration information from the local computing device, the first radio access network device forwards the first PDU session setup request message and the second context migration information to the core network device (for example, the AMF) in an interface message. The interface message is, for example, an NG interface message.

In an optional implementation, the first radio access network device forwards the first PDU session setup request message and the second context migration information from the local computing device in an NG interface message. For example, the first PDU session setup request message and the second context migration information included in the NG interface message are consistent with a first PDU session setup request message and second context migration information included in an uplink RRC message from the local computing device.

Optionally, the NG interface message includes a NAS message, the NAS message is the first PDU session setup request message, and the first PDU session setup request message includes the second context migration information.

Optionally, the NG interface message includes a NAS message and the second context migration information, and the NAS message is the first PDU session setup request message.

In another optional implementation, after processing the first PDU session setup request message and the second context migration information that are from the local computing device, the first radio access network device sends processed information to the core network device in an NG interface message. Specifically, an identifier (for example, a C-RNTI) of the terminal device in the first PDU session setup request message and the second context migration information from the local computing device is replaced with an identifier of the terminal device on a radio access network device side, for example, "gNB UE NGAP ID (base station-terminal device next-generation application protocol identifier)" or "AMF UE NGAP ID (access and mobility management function-terminal device next-generation application protocol identifier)".

It should be noted that the first radio access network device may send the first PDU session setup request message and the second context migration information to the core network device (for example, the AMF) in a same interface message or in different interface messages. This is not limited herein. For example, step 706a is performed first, and then step 706b is performed.

707. The core network device sends a PDU session resource setup request message to the first radio access network device.

In this embodiment, after receiving the first PDU session setup request message and the second context migration information, the core network device (for example, the AMF) sends the PDU session resource setup request message to the first radio access network device.

Specifically, the core network device sends the PDU session resource setup request message to the first radio access network device, to trigger a PDU session resource setup procedure. The procedure is for setting up a first PDU session between the local computing device and the core network device.

708. The first radio access network device sends an RRC reconfiguration message to the local computing device, where the RRC reconfiguration message is for configuring a DRB corresponding to the first PDU session.

In this embodiment, the first radio access network device sends the RRC reconfiguration message to the local computing device based on the PDU session resource setup request message. The RRC reconfiguration message is for configuring, for the local computing device, the DRB corresponding to the first PDU session, and includes a QoS flow identifier corresponding to the DRB.

709. The first radio access network device sends a PDU session resource setup response message to the core network device, to set up the first PDU session between the local computing device and the core network device.

In this embodiment, after step 708, the first radio access network device sends the PDU session resource setup response message to the core network device (for example, the AMF). The PDU session resource setup response message is for setting up the first PDU session between the local computing device and the core network device (for example, a UPF).

710. The core network device determines an SMF or determines an SMF and a UPF for the terminal device.

In this embodiment, the core network device (for example, the AMF) determines a corresponding SMF or determines a corresponding SMF and UPF for the UE based on the obtained identifier of the terminal device, the identifier of the second PDU session, the QoS parameter corresponding to the second PDU session, a target data network (data network, DN), user subscription information, routing information, the service policy information, or the like. The terminal device establishes a communication connection to the core network device through the SMF or through the SMF and the UPF.

711. The core network device sends first uplink transport layer TNL information for the terminal device to the radio access network device.

In this embodiment, the core network device (for example, the AMF) sends the first uplink transport layer TNL information for the UE to the radio access network device, where the first uplink transport layer information includes an Internet Protocol (internet protocol, IP) address of a core network device UPF and a tunnel endpoint address TEID of the core network device.

In an optional implementation, the core network device (for example, the AMF) sends, to the radio access network device in an independent message, the first uplink TNL information and a terminal device identifier corresponding to the first uplink TNL information.

In another optional implementation, the core network device (for example, the AMF) sends a PDU session resource modification request message to the first radio access network device. The message includes a terminal device identifier, a PDU session identifier, and the corresponding first uplink TNL information.

712. The first radio access network device sends first downlink transport layer TNL information for the terminal device to the core network device.

In this embodiment, after receiving the first uplink TNL information from the core network device (for example, the AMF), the first radio access network device determines the terminal device based on the terminal device identifier corresponding to the first uplink TNL information, and sends the first downlink TNL information for the terminal device to the core network device (for example, the AMF). The first downlink TNL information includes an IP address on the first radio access network device side and a TEID on the first radio access network device side.

In an optional implementation, the first radio access network device sends the first downlink TNL information to the core network device (for example, the AMF) in a PDU session resource modification response message.

In an optional implementation, the core network device (for example, the AMF) receives the first downlink TNL information from the first radio access network device, and the first radio access network device receives the first uplink TNL information from the core network device. The terminal device establishes a first user plane tunnel with the core network device based on the first uplink TNL information and the first downlink TNL information. The first user plane tunnel is for bearing communication between the terminal device and the core network device.

It should be noted that steps 710 to 712 are optional steps. For example, in the foregoing step 506, the core network device sends uplink TNL information (second uplink TNL information) to the radio access network device (the first radio access network device) in a second interface message; and the radio access network device (the first radio access network device) sends downlink TNL information (second downlink TNL information) to the core network device in a third interface message. The first radio access network device establishes a user plane tunnel with the core network device based on the second uplink TNL information and the second downlink TNL information. For ease of differentiation, the user plane tunnel is referred to as a second user plane tunnel. The core network device determines an SMF or determines an SMF and a UPF for the terminal device. After step 709, steps 710 to 712 are not performed, and the second user plane tunnel is used for communication between the terminal device and the core network device.

In this embodiment of this application, after the local computing device sets up the second PDU session with the terminal device, when the local computing device cannot continue to provide a local computing service for the terminal device, the local computing device sets up the first PDU session with the core network device through a first radio access network device, where the first PDU session is for transmitting the context related to the second PDU session. The core network device (for example, an AMF) may continue to allocate a processing device to the context of the second PDU session, for example, the first radio access network device, another local computing device, or a local processing device in a core network, without affecting normal connection between the terminal device and the first radio access network device. For the terminal device, the foregoing procedure is transparent, and normal running of the terminal device can be effectively ensured.

Figure 8A:
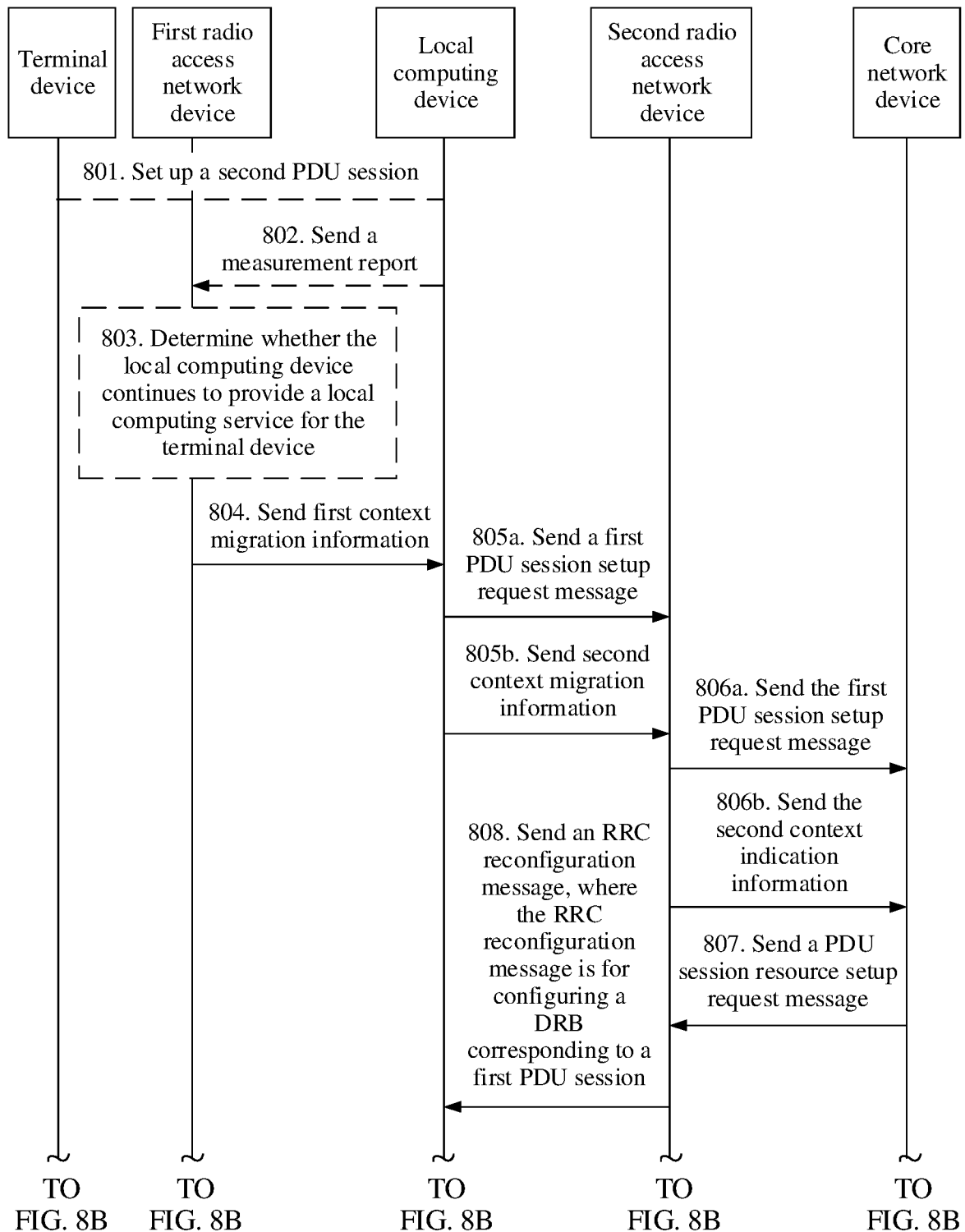
FIG. 8A and FIG. 8B are a schematic diagram of an embodiment of another mobile edge computing processing method according to an embodiment of this application.
Figure 8B:
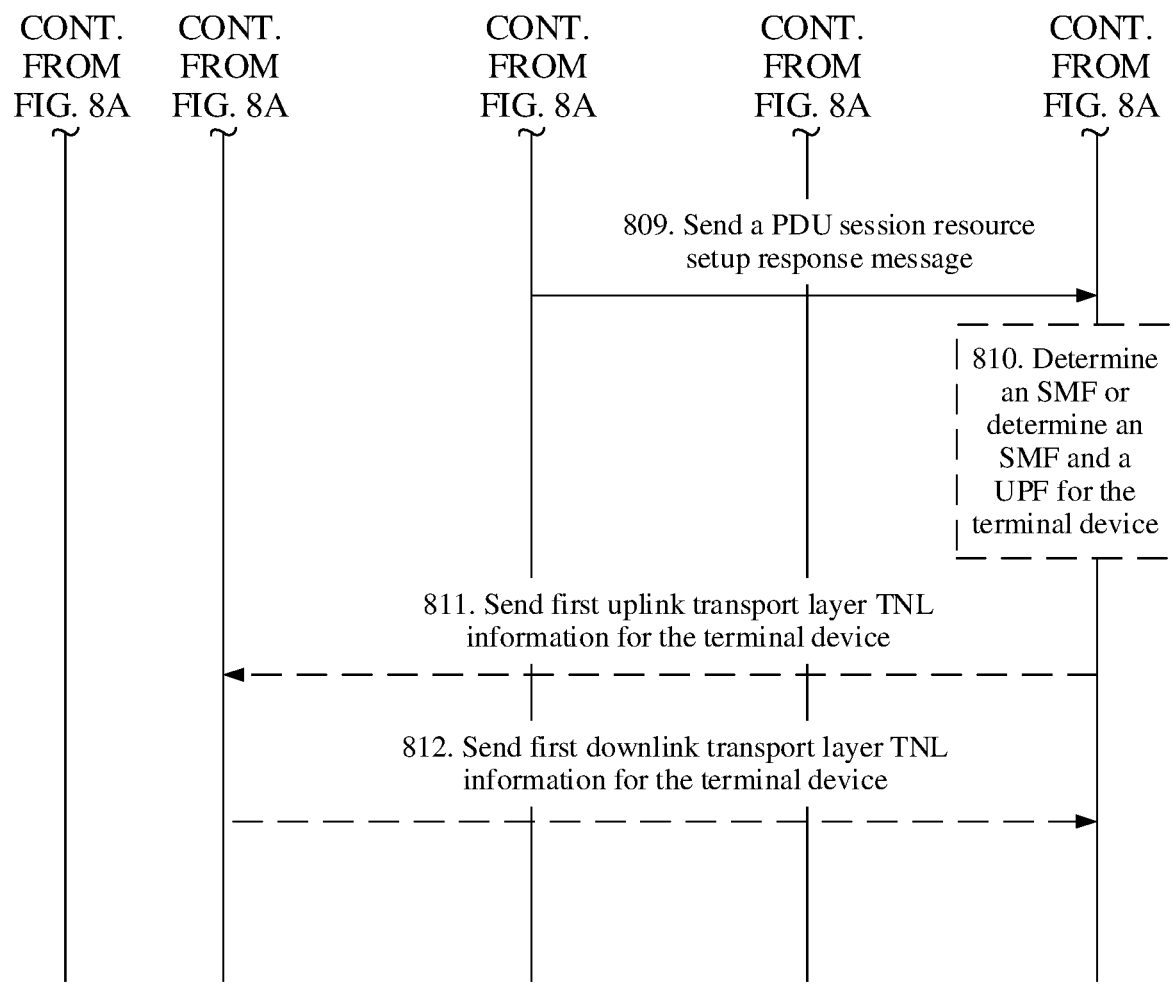

FIG. 8A and FIG. 8B are a schematic diagram of an embodiment of another mobile edge computing processing method according to an embodiment of this application. A local computing device completes a context migration procedure through a second radio access network device. The another mobile edge computing processing method provided in this embodiment of this application includes the following steps.

801. Set up a second PDU session.

In this embodiment, the second PDU session is set up between a terminal device and the local computing device. For example, the second PDU session may be set up by using a related procedure in the mobile edge computing processing method shown in FIG. 5a or FIG. 6B. The terminal device exchanges user plane data with the local computing device by using the second PDU session.

802. The local computing device sends a measurement report to a first radio access network device.

In this embodiment, the local computing device sends the measurement report to the first radio access network device.

803. The first radio access network device determines whether the local computing device continues to provide a local computing service for the terminal device.

In this embodiment, the first radio access network device determines, based on the measurement report, whether the local computing device continues to provide a local computing service for the terminal device.

Specifically, step 801 to step 803 are similar to step 701 to step 703. Details are not described herein again.

804. The first radio access network device sends first context migration information to the local computing device, where the first context migration information includes an identifier of the terminal device.

In this embodiment, when the first radio access network device determines that the local computing device cannot continue to provide a local computing service for the terminal device, the first radio access network device sends the first context migration information to the local computing device, where the first context migration information includes the identifier of the terminal device.

In another optional implementation, after the first radio access network device determines that the local computing device cannot continue to provide a local computing service for the terminal device, the first radio access network device sends second indication information to a core network device (for example, an AMF), to notify that the local computing device cannot continue to provide a local computing service for the terminal device. The second indication information carries an identifier of the terminal device that sets up the second PDU session with the local computing device, and optionally, further includes an identifier of the second PDU session. The core network device (for example, the AMF) determines, based on the second indication information, a radio access network device that currently has better quality of communication with the local computing device, for example, a second radio access network device currently accessed by the local computing device. The core network device (for example, the AMF) sends third indication information to the second radio access network device. The second indication information may include an identifier of the first radio access network device, an identifier of the local computing device, a context migration indication, and the like. After the local computing device accesses the second radio access network device, the second radio access network device sends the first context migration information to the local computing device. The third indication information may include the context migration indication, the identifier of the terminal device, the identifier of the second PDU session, and the like.

Specifically, the first context migration information is similar to the first context migration information in step 704. Details are not described herein again.

805a. The local computing device sends a first PDU session setup request message to the second radio access network device.

In this embodiment, after receiving the first context migration information, the local computing device sends the first PDU session setup request message to the second radio access network device.

805b. The local computing device sends second context migration information to the second radio access network device.

In this embodiment, after receiving the first context migration information, the local computing device sends the second context migration information to the second radio access network device. The second context migration information includes the identifier of the terminal device, and may further include the identifier of the second PDU session, and the like.

Specifically, except for including the identifier of the terminal device, the second context migration information is similar to the second context migration information in step 705b. Details are not described herein again. The first PDU session setup request message is similar to the first PDU session setup request message in step 705a. Details are not described herein again.

806a. The second radio access network device sends the first PDU session setup request message and the second context migration information to the core network device.

In this embodiment, after receiving the first PDU session setup request message and the second context migration information, the second radio access network device sends the first PDU session setup request message and the second context migration information to the core network device (for example, the AMF).

806b. The second radio access network device sends the second context migration information to the core network device.

In this embodiment, after receiving the first PDU session setup request message and the second context migration information, the second radio access network device sends the second context migration information to the core network device (for example, the AMF).

Specifically, steps 806a and 806b are similar to the foregoing steps 706a and 706b. Details are not described herein again.

It should be noted that, in another optional implementation, in addition to sending the first PDU session setup request message and the second context migration information to the core network device (for example, the AMF), the second radio access network device may further send the identifier of the first radio access network device to the core network device (for example, the AMF). The identifier of the first radio access network device may be an NR cell global identifier (NR CGI), a global radio access network node identifier (Global RAN Node ID), a global gNB identifier (Global gNB ID), or the like. In this way, the core network device (for example, the AMF) determines, based on the identifier of the first radio access network device and the second context migration information, a terminal device associated with the PDU session in which a context needs to be migrated.

807. The core network device sends a PDU session resource setup request message to the second radio access network device.

In this embodiment, after receiving the first PDU session setup request message and the second context migration information (or the identifier of the first radio access network device), the core network device (for example, the AMF) triggers a PDU session resource setup procedure, where the procedure is for setting up a first PDU session between the local computing device and the core network device.

Specifically, the core network device (for example, the AMF) sends the PDU session resource setup request message to the second radio access network device.

808. The second radio access network device sends an RRC reconfiguration message to the local computing device, where the RRC reconfiguration message is for configuring a DRB corresponding to the first PDU session.

In this embodiment, after receiving the PDU session resource setup request message from the core network device (for example, the AMF), the second radio access network device sends the RRC reconfiguration message to the local computing device. The RRC reconfiguration message is for configuring, for the local computing device, the DRB corresponding to the first PDP session and a QoS flow corresponding to the DRB.

809. The second radio access network device sends a PDU session resource setup response message to the core network device.

In this embodiment, after the second radio access network device sends the RRC reconfiguration message to the local computing device, the second radio access network device sends the PDU session resource setup response message to the core network device (for example, the AMF). The PDU session resource setup response message indicates that the first PDU session is set up between the local computing device and the core network device. The first PDU session includes the DRB, configured in step 808, between the local computing device and the second radio access network device and a user plane tunnel between the local computing device and the second radio access network device.

810. The core network device determines an SMF or determines an SMF and a UPF for the terminal device.

811. The core network device sends first uplink transport layer TNL information for the terminal device to the radio access network device.

812. The first radio access network device sends first downlink transport layer TNL information for the terminal device to the core network device.

Step 810 to step 812 are similar to step 710 to step 712. Details are not described herein again.

In this embodiment of this application, after the local computing device sets up the second PDU session with the terminal device, when the local computing device cannot continue to provide a local computing service for the terminal device, the local computing device sets up the first PDU session with the core network device through the second radio access network device, where the first PDU session is for transmitting a context related to the second PDU session. The core network device may continue to allocate a processing device to the context of the second PDU session, for example, the first radio access network device, another local computing device, or another processing device in a core network, without affecting normal connection between the terminal device and the first radio access network device. For the terminal device, the foregoing procedure is transparent, and normal running of the terminal device can be effectively ensured.

Based on the embodiments shown in FIG. 7a to FIG. 8B, an embodiment of this application further provides a mobile edge computing processing method. A local computing device and a terminal device set up a second PDU session. When the local computing device cannot provide a local computing service for the terminal device due to movement of the terminal device or another reason, the local computing device may set up a first PDU session with a core network device, where the PDU session is for transmitting a context of the second PDU session that is related to the terminal device and that is in the local computing device. This ensures normal running of the terminal device.

Figure 9A:
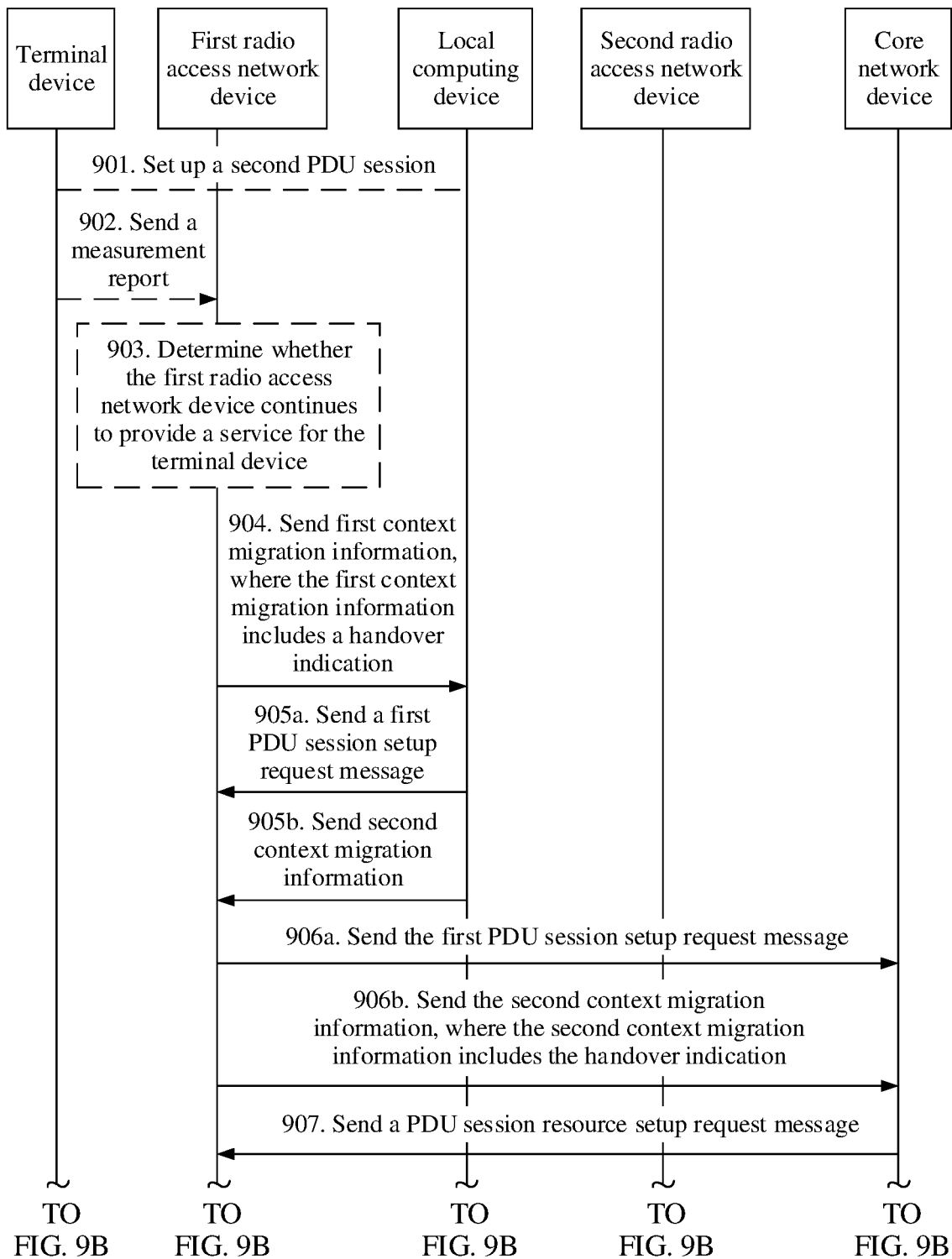
FIG. 9A and FIG. 9B are a schematic diagram of an embodiment of another mobile edge computing processing method according to an embodiment of this application.
Figure 9B:
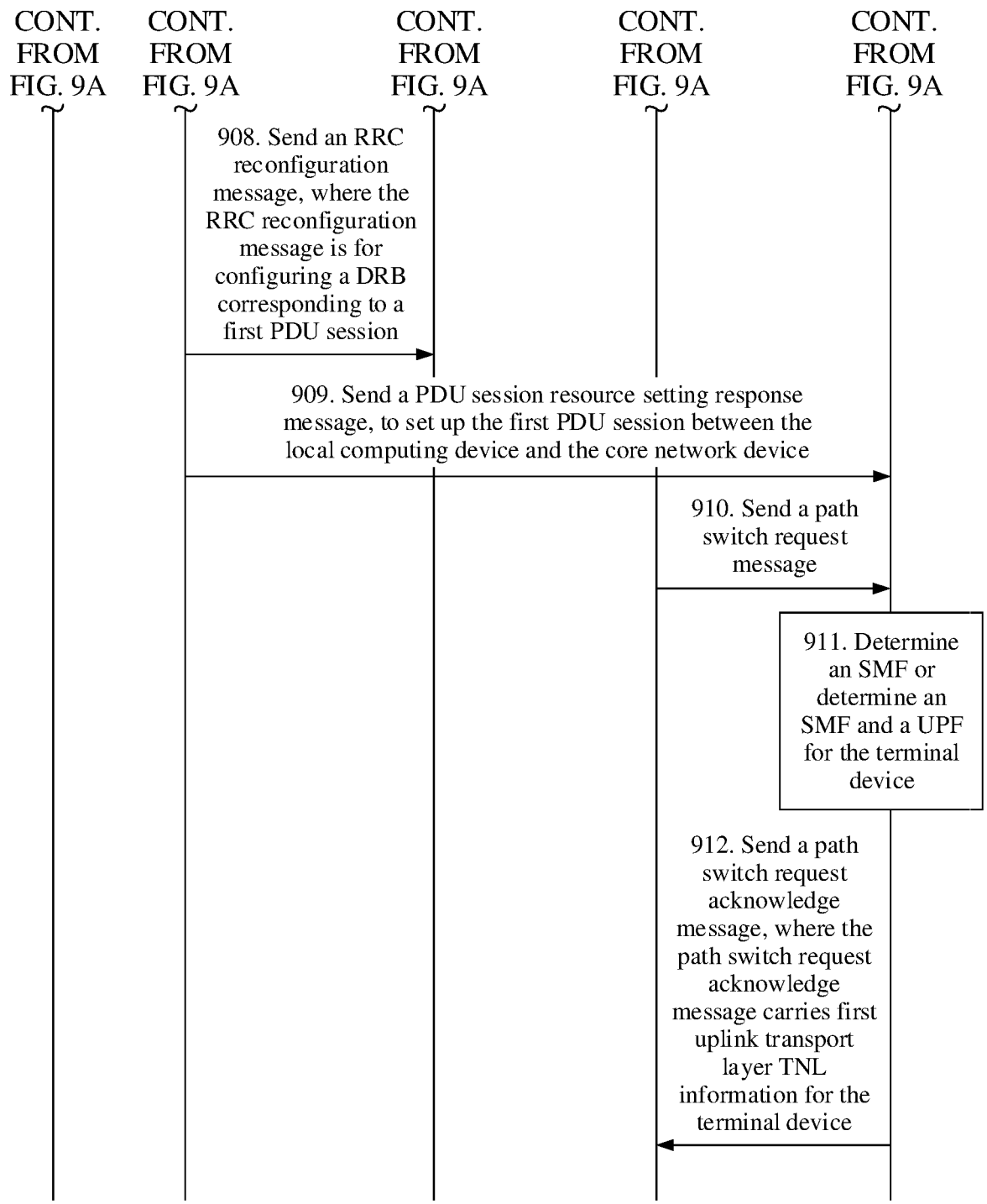

Specifically, FIG. 9A and FIG. 9B are a schematic diagram of an embodiment of another mobile edge computing processing method according to an embodiment of this application. The another mobile edge computing processing method provided in this embodiment of this application includes the following steps.

901. Set up a second PDU session.

In this embodiment, step 901 is similar to step 701. Details are not described herein again.

902. A terminal device sends a measurement report to a first access network device.

In this embodiment, the terminal device sends the measurement report to the first radio access network device.

Specifically, the terminal device periodically detects quality of communication between the terminal device and the first radio access network device. When the terminal device detects that current communication quality is lower than or equal to a threshold, or the terminal device detects that current quality of communication with the first radio access network device is lower than quality of communication with another radio access network device, the terminal device sends the measurement report to the first access network device. For example, the measurement report records an event A3.

It should be noted that the measurement report may further carry another identifier, to notify the first radio access network device that the terminal device cannot continue to use a local computing service provided by a local computing device. This is not limited herein.

903. The first radio access network device determines whether the first radio access network device continues to provide a service for the terminal device.

In this embodiment, the first radio access network device determines, based on the measurement report, whether the first radio access network device continues to provide a service for the terminal device. For example, when the event A3 is recorded in the measurement report, the first radio access network device determines that the first radio access network device cannot continue to provide a service for the terminal device.

It should be noted that steps 901 to 903 are optional steps.

904. The first radio access network device sends first context migration information to the local computing device, where the first context migration information includes a handover indication.

In this embodiment, step 904 is similar to step 804. A difference lies in that in step 904, in addition to the first context migration information sent by the first radio access network device to the local computing device, the first radio access network device further sends the handover indication (handover indication, HO indication) to the local computing device. The handover indication is for notifying the local computing device that a current context migration procedure is triggered by the terminal device.

In an optional implementation, the first context migration information includes the handover indication.

In another optional implementation, the first radio access network device separately sends the first context migration information and the handover indication to the local computing device in different signaling. In other words, the first context migration information and the handover indication are independent of each other.

Optionally, the first local computing device may further use other indication information to replace the handover indication.

905a. The local computing device sends a first PDU session setup request message to the first radio access network device.

In this embodiment, the local computing device sends the first PDU session setup request message and second context migration information to the first radio access network device, where the second context migration information includes an identifier of the terminal device.

905b. The local computing device sends the second context migration information to the first radio access network device.

In this embodiment, the local computing device sends the second context migration information to the first radio access network device. The second context migration information includes the identifier of the terminal device.

Specifically, steps 905a and 905b are similar to the foregoing steps 705a and 705b. Details are not described herein again.

906a. The first radio access network device sends the first PDU session setup request message to a core network device.

906b. The first radio access network device sends the second context migration information to the core network device, where the second context migration information includes the handover indication.

Specifically, steps 906a and 906b are similar to the foregoing steps 706a and 706b. Details are not described herein again.

In this embodiment, the first radio access network device sends the first PDU session setup request message, the second context migration information, and the handover indication to the core network device (for example, an AMF).

907. The core network device sends a PDU session resource setup request message to the first radio access network device.

In this embodiment, the core network device (for example, the AMF) sends the PDU session resource setup request message to the first radio access network device.

908. The first radio access network device sends an RRC reconfiguration message to the local computing device, where the RRC reconfiguration message is for configuring a DRB corresponding to a first PDU session.

In this embodiment, the first radio access network device sends the RRC reconfiguration message to the local computing device, where the RRC reconfiguration message is for configuring the DRB corresponding to the first PDU session.

909. The first radio access network device sends a PDU session resource setup response message to the core network device, to set up the first PDU session between the local computing device and the core network device.

In this embodiment, the first radio access network device sends the PDU session resource setup response message to the core network device (for example, the AMF), to set up the first PDU session between the local computing device and the core network device (for example, the AMF).

It should be noted that step 905 to step 909 are similar to step 705 to step 709. Details are not described herein again.

910. A second radio access network device sends a path switch request message to the core network device.

In this embodiment, after the terminal device accesses the second radio access network device, the second radio access network device sends the path switch request message to the core network device (for example, the AMF). The path switch request message may include third downlink TNL information for the terminal device. The third downlink TNL information includes an IP address of the second radio access network device and a TEID of the second radio access network device.

911. The core network device determines an SMF or determines an SMF and a UPF for the terminal device.

In this embodiment, based on the path switch request message, the core network device (for example, the AMF) determines the SMF or determines the SMF and the UPF for the terminal device. The terminal device establishes a communication connection to the core network device through the SMF or through the SMF and the UPF.

912. The core network device sends a path switch request acknowledge message to the second radio access network device, where the path switch request acknowledge message carries first uplink transport layer TNL information for the terminal device.

In this embodiment, the core network device (for example, the AMF) sends a path switch request acknowledge message to the second radio access network device based on the path switch request message, where the path switch request acknowledge message carries the first uplink transport layer TNL information for the terminal device. The first uplink transport layer information includes an Internet Protocol (IP) address of the core network device (for example, the AMF) and a tunnel endpoint address TEID of the core network device (for example, the AMF).

The core network device (for example, the AMF) receives the third downlink TNL information from the second radio access network device, and the second radio access network device receives the first uplink TNL information from the core network device (for example, the AMF). The terminal device establishes a third user plane tunnel with the core network device (for example, the AMF) based on the first uplink TNL information and the third downlink TNL information. The third user plane tunnel is for bearing communication between the terminal device and the core network device (for example, the AMF).

In this embodiment of this application, after the local computing device and the terminal device set up the second PDU session, when the local computing device cannot provide a local computing service for the terminal device due to movement of the terminal device or another reason, the local computing device sets up the first PDU session with the core network device through the first radio access network device, where the first PDU session is for transmitting a context related to the second PDU session. In addition, a user plane tunnel is established between the second radio access network device and the core network device, to effectively ensure normal running of the terminal device.

The network device in the foregoing embodiments may alternatively be a chip used in the network device, or another combined device, component, or the like that can implement a function of the network device. The receiving module and the sending module may be a transceiver. The transceiver may include an antenna, a radio frequency circuit, and the like. The processing module may be a processor, for example, a baseband chip. When the network device is a component having a function of the network device, the receiving module and the sending module may be radio frequency units, and the processing module may be a processor. When the network device is a chip system, the receiving module may be an input port of the chip system, the sending module may be an output interface of the chip system, and the processing module may be a processor of the chip system, for example, a central processing unit (CPU).

The local computing device in the foregoing embodiments may alternatively be a chip used in the local computing device, or another combined device, component, or the like that can implement a function of the local computing device. The receiving module and the sending module may be a transceiver. The transceiver may include an antenna, a radio frequency circuit, and the like. The processing module may be a processor, for example, a baseband chip. When the local computing device is a component having a function of the local computing device, the receiving module and the sending module may be radio frequency units, and the processing module may be a processor. When the local computing device is a chip system, the receiving module may be an input port of the chip system, the sending module may be an output interface of the chip system, and the processing module may be a processor of the chip system, for example, a central processing unit.

Figure 10:
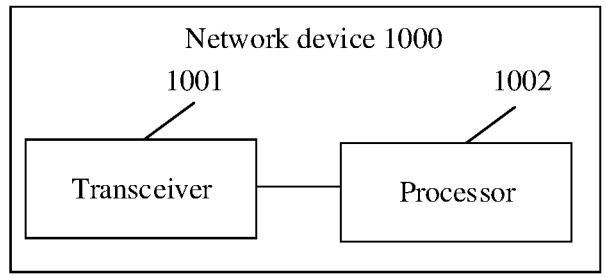
FIG. 10 is a schematic diagram of an embodiment of a network device according to an embodiment of this application.

In embodiments of this application, the memory included in the network device or the local computing device is mainly configured to store a software program and data, for example, store the local computing capability information described in the foregoing embodiments. The network device or the local computing device further has the following functions:

The following describes in detail a network device or a local computing device in this application. FIG. 10 is a schematic diagram of an embodiment of a network device according to an embodiment of this application. The network device 1000 includes:

a transceiver 1001, configured to receive a radio resource control RRC message sent by a terminal device UE, where the RRC message carries a protocol data unit PDU session setup request message, and the PDU session setup request message is a non-access stratum NAS message, where the transceiver 1001 is further configured to send a first interface message to a core network device, where the first interface message carries the PDU session setup request message; and the transceiver 1001 is further configured to send a second interface message to a radio access network device, where the second interface message carries an identifier of a PDU session and local computing request information, and the local computing request information includes at least one of the following information: a local computing function, a local computing algorithm, microservice information, or a local computing time budget; and a processor 1002, configured to set up the PDU session between a local computing device and the UE.

In some optional embodiments of this application, the second interface message further includes a flow identifier of a first quality of service QoS flow, where the local computing request information corresponds to the first QoS flow.

In some optional embodiments of this application, the PDU session includes a first data radio bearer DRB and a second DRB, where the first DRB is a DRB between the local computing device and the radio access network device, and the second DRB is a DRB between the UE and the radio access network device.

In some optional embodiments of this application, the transceiver 1001 is further configured to receive local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

The radio access network device reports the local computing capability information to the core network device.

In some optional embodiments of this application, the local computing device is determined by the radio access network device based on the local computing request information and the local computing capability information.

Figure 11:
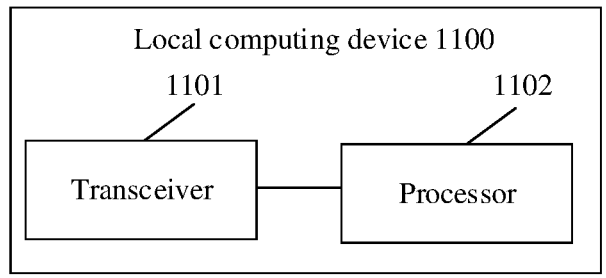
FIG. 11 is a schematic diagram of an embodiment of a local computing device according to an embodiment of this application.

FIG. 11 is a schematic diagram of an embodiment of a local computing device according to an embodiment of this application. The local computing device 1100 includes:

a transceiver 1101, configured to send local computing capability information to a radio access network device, where the local computing capability information includes at least one of the following information: a local computing function supported by the local computing device 1100, a local computing algorithm supported by the local computing device 1100, microservice information supported by the local computing device 1100, an average processing delay of the local computing device 1100, or current processing load of the local computing device 1100; and a processor 1102, configured to set up a PDU session with a terminal device UE, where the PDU session corresponds to a PDU session setup request message sent by the UE to the radio access network device.

In some optional embodiments of this application, the transceiver 1101 is further configured to receive configuration information of a first data radio bearer DRB that is sent by the radio access network device; and the processor 1102 is further configured to set up the first DRB. The PDU session includes the first DRB and a second DRB, where the first DRB is a DRB between the local computing device 1100 and the radio access network device, and the second DRB is a DRB between the UE and the radio access network device.

In some optional embodiments of this application, the PDU session carries a first quality of service QoS flow, where the first QoS flow is determined by a core network device based on the PDU session setup request message forwarded by the radio access network device.

Figure 12:
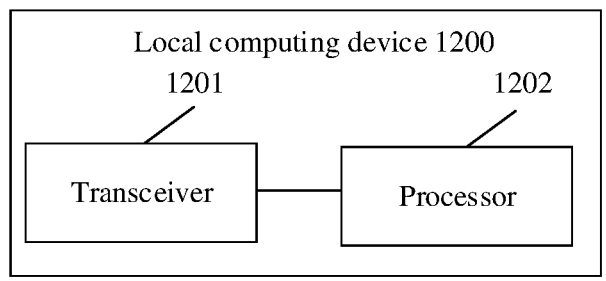
FIG. 12 is a schematic diagram of another embodiment of a local computing device according to an embodiment of this application.

FIG. 12 is a schematic diagram of another embodiment of a local computing device according to an embodiment of this application. The local computing device 1200 includes:

a transceiver 1201, configured to receive first context migration information sent by a radio access network device, where the transceiver 1201 is further configured to send a first PDU session setup request message to a core network device, where the first PDU session setup request message is a non-access stratum NAS message;

the first PDU session setup request message is for triggering setup of a first PDU session, and the first PDU session is for migrating a context of a second PDU session; and the second PDU session is a PDU session set up between the local computing device 1200 and a terminal device UE; and a processor 1202, configured to set up the first PDU session with the core network device.

In some optional embodiments of this application, the first context migration information includes an identifier of a third data radio bearer DRB, where the second PDU session includes the third DRB, and the third DRB is a DRB between the local computing device 1200 and the radio access network device.

In some optional embodiments of this application, the first context migration information further includes at least one of the following information: an identifier of the UE or an identifier of the second PDU session.

In some optional embodiments of this application, the first PDU session setup request message includes second context migration information; and the second context migration information includes at least one of the following information: the identifier of the UE, the identifier of the second PDU session, or a context migration indication.

Figure 13:
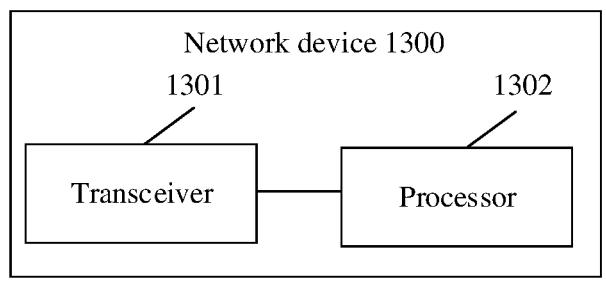
FIG. 13 is a schematic diagram of another embodiment of a network device according to an embodiment of this application.

FIG. 13 is a schematic diagram of another embodiment of a network device according to an embodiment of this application. The network device 1300 includes:

a transceiver 1301, configured to send first context migration information to a local computing device, where the transceiver 1301 is further configured to receive a first PDU session setup request message sent by the local computing device, where the first PDU session setup request message is a non-access stratum NAS message, the first PDU session setup request message is for setting up a first PDU session between the local computing device and a core network device, and the first PDU session is for migrating a context of a second PDU session; and the second PDU session is a PDU session set up between the local computing device and a terminal device UE; and a processor 1302, configured to set up the first PDU session with the local computing device.

In some optional embodiments of this application, the first context migration information includes an identifier of a third data radio bearer DRB, where the second PDU session includes the third DRB, and the third DRB is a DRB between the local computing device and the radio access network device.

In some optional embodiments of this application, the first context migration information further includes at least one of the following information: an identifier of the UE or an identifier of the second PDU session.

In some optional embodiments of this application, the transceiver 1301 is further configured to receive the first PDU session setup request message sent by the local computing device.

The transceiver 1301 is further configured to forward the first PDU session setup request message and second context migration information to the core network device, where the second context migration information includes at least one of the following information: the identifier of the UE, the identifier of the second PDU session, or a context migration indication.

In some optional embodiments of this application, the first PDU session setup request message includes second context migration information; and the second context migration information includes at least one of the following information: the identifier of the UE, the identifier of the second PDU session, or a context migration indication.

In some optional embodiments of this application, the transceiver 1301 is further configured to send first uplink transport layer TNL information for the UE to the radio access network device, where the first uplink transport layer information includes an Internet Protocol IP address of the core network device and a tunnel endpoint address TEID of the core network device; and the transceiver 1301 is further configured to send first downlink TNL information to the core network device, where the first downlink TNL information includes an IP address of the radio access network device and a TEID of the radio access network device.

The first uplink TNL information and the first downlink TNL information are for establishing a first user plane tunnel, and the first user plane tunnel is for bearing communication between the UE and the core network device.

The foregoing mainly describes the solutions provided in embodiments of this application from the perspective of the methods. It may be understood that, to implement the foregoing functions, the network device or the local computing device includes corresponding hardware structures and/or software modules for performing the functions. A person of ordinary skill in the art should easily be aware that, in combination with the examples described in embodiments disclosed in this specification, modules, algorithms and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the local computing device may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

The network device includes:
a transceiver module, configured to receive a radio resource control RRC message sent by a terminal device UE, where the RRC message carries a protocol data unit PDU session setup request message, and the PDU session setup request message is a non-access stratum NAS message, where
the transceiver module is further configured to send a first interface message to a core network device, where the first interface message carries the PDU session setup request message; and
the transceiver module is further configured to send a second interface message to a radio access network device, where the second interface message carries an identifier of a PDU session and local computing request information, and the local computing request information includes at least one of the following information: a local computing function, a local computing algorithm, microservice information, or a local computing time budget; and
a processing module, configured to set up the PDU session between a local computing device and the UE.

In some optional embodiments of this application, the second interface message further includes: a flow identifier of a first quality of service QoS flow, where the local computing request information corresponds to the first QoS flow.

In some optional embodiments of this application, the PDU session includes the first data radio bearer DRB and a second DRB, where the first DRB is a DRB between the local computing device and the radio access network device, and the second DRB is a DRB between the UE and the radio access network device.

In some optional embodiments of this application, the transceiver module is further configured to receive local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

The radio access network device reports the local computing capability information to the core network device.

In some optional embodiments of this application, the local computing device is determined by the radio access network device based on the local computing request information and the local computing capability information.

The local computing device includes:
a transceiver module, configured to send local computing capability information to a radio access network device, where the local computing capability information includes at least one of the following information: a local computing function supported by the local computing device, a local computing algorithm supported by the local computing device, microservice information supported by the local computing device, an average processing delay of the local computing device, or current processing load of the local computing device; and
a processing module, configured to set up a PDU session with a terminal device UE, where the PDU session corresponds to a PDU session setup request message sent by the UE to the radio access network device.

In some optional embodiments of this application,
the transceiver module is further configured to receive configuration information of a first data radio bearer DRB that is sent by the radio access network device; and
the processing module is further configured to set up the first DRB. The PDU session includes the first DRB and a second DRB, where the first DRB is a DRB between the local computing device and the radio access network device, and the second DRB is a DRB between the UE and the radio access network device.

In some optional embodiments of this application, the PDU session carries a first quality of service QoS flow, where the first QoS flow is determined by a core network device based on the PDU session setup request message forwarded by the radio access network device.

The local computing device includes:
a transceiver module, configured to receive first context migration information sent by a radio access network device, where
the transceiver module is further configured to send a first PDU session setup request message to a core network device, where the first PDU session setup request message is a non-access stratum NAS message;
the first PDU session setup request message is for triggering setup of a first PDU session, and the first PDU session is for migrating a context of a second PDU session; and
the second PDU session is a PDU session set up between the local computing device and a terminal device UE; and
a processing module, configured to set up the first PDU session with the core network device.

In some optional embodiments of this application, the first context migration information includes an identifier of a third data radio bearer DRB, where the second PDU session includes the third DRB, and the third DRB is a DRB between the local computing device and the radio access network device.

In some optional embodiments of this application, the first context migration information further includes at least one of the following information: an identifier of the UE or an identifier of the second PDU session.

In some optional embodiments of this application, the first PDU session setup request message includes second context migration information; and the second context migration information includes at least one of the following information: the identifier of the UE, the identifier of the second PDU session, or a context migration indication.

The network device includes:
a transceiver module, configured to send first context migration information to a local computing device, where
the transceiver module is further configured to receive a first PDU session setup request message sent by the local computing device, where the first PDU session setup request message is a non-access stratum NAS message, the first PDU session setup request message is for setting up a first PDU session between the local computing device and a core network device, and the first PDU session is for migrating a context of a second PDU session; and
the second PDU session is a PDU session set up between the local computing device and a terminal device UE; and
a processing module, configured to set up the first PDU session with the local computing device.

In some optional embodiments of this application, the first context migration information includes an identifier of a third data radio bearer DRB, where the second PDU session includes the third DRB, and the third DRB is a DRB between the local computing device and the radio access network device.

In some optional embodiments of this application, the first context migration information further includes at least one of the following information: an identifier of the UE or an identifier of the second PDU session.

In some optional embodiments of this application,
the transceiver module is further configured to receive the first PDU session setup request message sent by the local computing device; and
the transceiver module is further configured to forward the first PDU session setup request message and second context migration information to the core network device, where the second context migration information includes at least one of the following information: the identifier of the UE, the identifier of the second PDU session, or a context migration indication.

In some optional embodiments of this application,
the first PDU session setup request message includes second context migration information; and
the second context migration information includes at least one of the following information: the identifier of the UE, the identifier of the second PDU session, or a context migration indication.

In some optional embodiments of this application,
the transceiver module is further configured to send first uplink transport layer TNL information for the UE to the radio access network device, where the first uplink transport layer information includes an Internet Protocol IP address of the core network device and a tunnel endpoint address TEID of the core network device; and
the transceiver module is further configured to send first downlink TNL information to the core network device, where the first downlink TNL information includes an IP address of the radio access network device and a TEID of the radio access network device.

The first uplink TNL information and the first downlink TNL information are for establishing a first user plane tunnel, and the first user plane tunnel is for bearing communication between the UE and the core network device.

Figure 14:
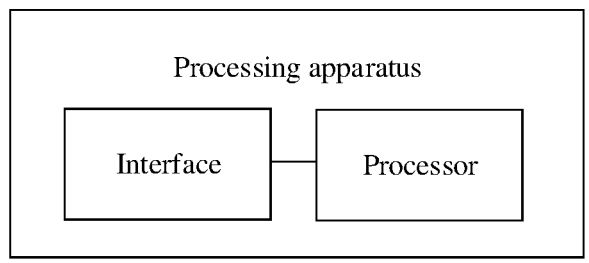
FIG. 14 is a schematic diagram of a processing apparatus according to an embodiment of this application.

An embodiment of this application further provides a processing apparatus. FIG. 14 is a schematic diagram of a processing apparatus according to an embodiment of this application. The processing apparatus includes a processor and an interface. The processor is configured to perform the mobile edge computing processing method in any one of the foregoing method embodiments.

It should be understood that the processing apparatus may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Herein, "implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an application-specific integrated circuit (ASIC) or a programmable logic device (PLD). The PLD may further include a field programmable gate array (FPGA), a complex programmable logic device (CPLD), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system-on-a programmable chip, system-on-a-programmable-chip).

This application further provides a communication system, including a network device and a local computing device.

An embodiment of this application further provides a computer-readable storage medium, including instructions. When the instructions are run on a computer, the computer is enabled to perform the following steps:

Step A: A radio access network device receives a radio resource control RRC message sent by a terminal device UE, where the RRC message carries a protocol data unit PDU session setup request message, and the PDU session setup request message is a non-access stratum NAS message.

Step B: The radio access network device sends a first interface message to a core network device, where the first interface message carries the PDU session setup request message.

Step C: The core network device sends a second interface message to the radio access network device, where the second interface message carries an identifier of a PDU session and local computing request information, and the local computing request information includes at least one of the following information: a local computing function, a local computing algorithm, microservice information, or a local computing time budget.

Step D: The radio access network device sets up the PDU session between the local computing device and the UE.

Step E: The second interface message further includes:
a flow identifier of a first quality of service QoS flow, where the local computing request information corresponds to the first QoS flow.

Step F: The PDU session includes the first data radio bearer DRB and a second DRB, where the first DRB is a DRB between the local computing device and the radio access network device, and the second DRB is a DRB between the UE and the radio access network device.

Step G: The radio access network device receives local computing capability information from at least one local computing device, where the at least one local computing device includes the local computing device, and the local computing capability information includes at least one of the following information: a local computing function supported by the local computing device, a local computing algorithm supported by the local computing device, microservice information supported by the local computing device, an average processing delay of the local computing device, or current processing load of the local computing device.

Step H: The radio access network device reports the local computing capability information to the core network device.

Step I: The local computing device is determined by the radio access network device based on the local computing request information and the local computing capability information.

Alternatively, the computer is enabled to perform the following steps:

Step J: A local computing device sends local computing capability information to a radio access network device, where the local computing capability information includes at least one of the following information: a local computing function supported by the local computing device, a local computing algorithm supported by the local computing device, microservice information supported by the local computing device, an average processing delay of the local computing device, or current processing load of the local computing device.

Step K: The local computing device sets up a PDU session with a terminal device UE, where the PDU session corresponds to a PDU session setup request message sent by the UE to the radio access network device.

Step L: The local computing device receives configuration information of a first data radio bearer DRB that is sent by the radio access network device.

Step M: The local computing device sets up the first DRB, where
the PDU session includes the first DRB and a second DRB, where the first DRB is a DRB between the local computing device and the radio access network device, and the second DRB is a DRB between the UE and the radio access network device.

Step N: The PDU session carries a first quality of service QoS flow, where the first QoS flow is determined by a core network device based on the PDU session setup request message forwarded by the radio access network device.

Alternatively, the computer is enabled to perform the following steps:

Step O: A local computing device receives first context migration information sent by a radio access network device.

Step P: The local computing device sends a first PDU session setup request message to a core network device, where the first PDU session setup request message is a non-access stratum NAS message.

Step Q: The first PDU session setup request message is for triggering setup of a first PDU session, the first PDU session for migrating a context of a second PDU session, and the second PDU session is a PDU session set up by the local computing device and a terminal device UE.

Step R: The local computing device sets up the first PDU session with the core network device.

Step S: The first context migration information includes an identifier of a third data radio bearer DRB, where the second PDU session includes the third DRB, and the third DRB is a DRB between the local computing device and the radio access network device.

Step T: The first context migration information further includes at least one of the following information: an identifier of the UE or an identifier of the second PDU session.

Step U: The first PDU session setup request message includes second context migration information, and the second context migration information includes at least one of the following information: an identifier of the UE, an identifier of the second PDU session, or a context migration indication.

Alternatively, the computer is enabled to perform the following steps:

Step V: A radio access network device sends first context migration information to a local computing device.

Step W: A core network device receives a first PDU session setup request message sent by the local computing device, where the first PDU session setup request message is a non-access stratum NAS message, the first PDU session setup request message is for setting up a first PDU session between the local computing device and the core network device, and the first PDU session is for migrating a context of a second PDU session.

Step X: The second PDU session is a PDU session set up between the local computing device and a terminal device UE.

Step Y: The core network device sets up the first PDU session with the local computing device.

Step Z: The first context migration information includes an identifier of a third data radio bearer DRB, where the second PDU session includes the third DRB, and the third DRB is a DRB between the local computing device and the radio access network device.

Step AA: The first context migration information further includes at least one of the following information: an identifier of the UE or an identifier of the second PDU session.

Step AB: The radio access network device receives the first PDU session setup request message sent by the local computing device.

Step AC: The radio access network device forwards the first PDU session setup request message and second context migration information to the core network device, where the second context migration information includes at least one of the following information: the identifier of the UE, the identifier of the second PDU session, or a context migration indication.

Step AD: The first PDU session setup request message includes the second context migration information; and the second context migration information includes at least one of the following information: the identifier of the UE, the identifier of the second PDU session, or a context migration indication.

Step AE: The core network device sends first uplink transport layer TNL information for the UE to the radio access network device, where the first uplink transport layer information includes an Internet Protocol IP address of the core network device and a tunnel endpoint address TEID of the core network device.

Step AF: The radio access network device sends first downlink TNL information to the core network device, where the first downlink TNL information includes an IP address of the radio access network device and a TEID of the radio access network device.

Step AG: The first uplink TNL information and the first downlink TNL information are for establishing a first user plane tunnel, and the first user plane tunnel is for bearing communication between the UE and the core network device.

An embodiment of this application further provides a computer program product. The computer program product includes computer program code. When the computer program code is run on a computer, the computer is enabled to perform step A to step I, step J to step N, step O to step U, and/or step V to step AG.

An embodiment of this application further provides a chip, including a memory and a processor. The memory is configured to store a computer program, and the processor is configured to invoke the computer program from the memory and run the computer program, so that the chip performs step A to step I, step J to step N, step O to step U, and/or step V to step AG.

An embodiment of this application further provides a chip, including a processor. The processor is configured to invoke and run a computer program, so that the chip performs step A to step I, step J to step N, step O to step U, and/or step V to step AG.

In addition, it should be noted that the described apparatus embodiment is merely an example. The units described as separate parts may or may not be physically separate, and parts displayed as units may or may not be physical units, and may be located in one position, or may be distributed on a plurality of network units. Some or all the modules may be selected based on actual requirements to achieve the objectives of the solutions of embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, network device, local computing device, computing device, or data center to another website, computer, network device, local computing device, computing device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a network device, a local computing device, or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Drive, SSD)), or the like.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing in the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined according to A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the method described in embodiments of this application.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method comprising:
    periodically sending, by a local computing device, local computing capability information to a radio access network device, wherein the local computing capability information comprises at least one of following information: a local computing function supported by the local computing device, a local computing algorithm supported by the local computing device, microservice information supported by the local computing device, an average processing delay of the local computing device, or current processing load of the local computing device;
    receiving, by the local computing device from the radio access network device, signaling for setting up a protocol data unit (PDU) session with a terminal device, the PDU session corresponding to a PDU session setup request message sent by the terminal device to the radio access network device, and the signaling being received based on the local computing capability information of the local computing device being matched to the PDU session setup request message; and
    setting up, by the local computing device, the PDU session with the terminal device.

2. The method according to claim 1, wherein before setting up the PDU session with the terminal device, the method further comprises:
    receiving, by the local computing device from the radio access network device, configuration information of a first data radio bearer (DRB); and
    setting up, by the local computing device, the first DRB, wherein
    the PDU session comprises the first DRB and a second DRB, wherein the first DRB is between the local computing device and the radio access network device, and the second DRB is between the terminal device and the radio access network device.

3. The method according to claim 1, wherein the PDU session carries a first quality of service (QOS) flow, and the first QoS flow is determined by a core network device based on the PDU session setup request message.

4. A method comprising:
    receiving, by a radio access network device, local computing capability information of each of at least one local computing device, wherein the local computing capability information of each of the at least one local computing device comprises at least one of following information: a local computing function supported by the respective local computing device, a local computing algorithm supported by the respective local computing device, microservice information supported by the respective local computing device, an average processing delay of the respective local computing device, or current processing load of the respective local computing device;
    reporting, by the radio access network device, the local computing capability information of the at least one local computing device to a core network device;
    receiving, by the radio access network device, a radio resource control (RRC) message sent by a terminal device, wherein the RRC message carries a protocol data unit (PDU) session setup request message requesting setting up a PDU session, and the PDU session setup request message is a non-access stratum (NAS) message;
    sending, by the radio access network device, a first message to the core network device, wherein the first message carries the PDU session setup request message;
    receiving, by the radio access network device from the core network device, a second message, wherein the second message carries an identifier of the PDU session and local computing request information, and the local computing request information comprises at least one of following information: a local computing function, a local computing algorithm, microservice information, or a local computing time budget;

determining, by the radio access network device based on the second message, a first local computing device of the at least one local computing device; and setting up, by the radio access network device, the PDU session between the first local computing device and the terminal device.

5. The method according to claim 4, wherein the second message further comprises:

a flow identifier of a first quality of service (QOS) flow, the local computing request information corresponding to the first QoS flow.

6. The method according to claim 4, wherein the PDU session comprises a first data radio bearer (DRB) and a second DRB, wherein the first DRB is between the first local computing device and the radio access network device, and the second DRB is between the terminal device and the radio access network device.

7. A local computing device, comprising:
a transceiver, configured to:
periodically send local computing capability information to a radio access network device, wherein the local computing capability information comprises at least one of following information: a local computing function supported by the local computing device, a local computing algorithm supported by the local computing device, microservice information supported by the local computing device, an average processing delay of the local computing device, or current processing load of the local computing device; and
receive, from the radio access network device, signaling for setting up a protocol data unit (PDU) session with a terminal device, the PDU session corresponding to a PDU session setup request message sent by the terminal device to the radio access network device, and the signaling being received based on the local computing capability information of the local computing device being matched to the PDU session setup request message; and
at least one processor, configured to set up the PDU session with the terminal device.

8. The local computing device according to claim 7, wherein the transceiver is further configured to receive, from the radio access network device, configuration information of a first data radio bearer (DRB); and
the processor is further configured to set up the first DRB, wherein the PDU session comprises the first DRB and a second DRB, the first DRB is between the local computing device and the radio access network device, and the second DRB is between the terminal device and the radio access network device.

9. The local computing device according to claim 7, wherein the PDU session carries a first quality of service (QOS) flow, and the first QoS flow is determined by a core network device based on the PDU session setup request message.

10. The method according to claim 4, wherein the local computing capability information of the local computing device comprises the local computing function supported by the local computing device.

11. The method according to claim 4, wherein the local computing capability information of the local computing device comprises the local computing algorithm supported by the local computing device.

12. The method according to claim 4, wherein the local computing capability information of the local computing device comprises the microservice information supported by the local computing device.

13. The method according to claim 4, wherein the local computing capability information of the local computing device comprises the average processing delay of the local computing device.

14. The method according to claim 4, wherein the local computing capability information of the local computing device comprises the current processing load of the local computing device.

15. The method according to claim 1, further comprising:
receiving, by the radio access network device, the local computing capability information; and
reporting, by the radio access network device, the local computing capability information to a core network device.

16. A system comprising:
the local computing device according to claim 7; and
the radio access network device;
wherein the radio access network device is configured to:
receive the local computing capability information; and
report the local computing capability information to a core network device.

17. The local computing device according to claim 7, wherein the local computing capability information of the local computing device comprises the local computing function supported by the local computing device.

18. The local computing device according to claim 7, wherein the local computing capability information of the local computing device comprises the local computing algorithm supported by the local computing device.

19. The local computing device according to claim 7, wherein the local computing capability information of the local computing device comprises the microservice information supported by the local computing device.

20. The local computing device according to claim 7, wherein the local computing capability information of the local computing device comprises the average processing delay of the local computing device.

* * * * *